United States Patent [19]

Stubbs

[11] Patent Number: 5,327,358
[45] Date of Patent: Jul. 5, 1994

[54] APPARATUS AND METHOD FOR DAMAGE DETECTION

[75] Inventor: Norris Stubbs, College Station, Tex.

[73] Assignee: The Texas A&M University System, College Station, Tex.

[21] Appl. No.: 741,871

[22] Filed: Aug. 7, 1991

[51] Int. Cl.⁵ .............................................. G06G 7/68
[52] U.S. Cl. .................................... 364/507; 364/550; 364/508; 73/577
[58] Field of Search ................... 364/550, 551.01, 507, 364/508; 73/577, 592, 600

[56] References Cited

U.S. PATENT DOCUMENTS

| | | | |
|---|---|---|---|
| 4,747,309 | 5/1988 | Weir | 73/655 |
| 4,751,657 | 6/1988 | Imam et al. | 364/508 |
| 4,754,763 | 7/1988 | Doemland | 128/739 |
| 4,771,792 | 9/1988 | Seale | 128/774 |
| 4,805,457 | 2/1989 | Oates et al. | 73/572 |
| 4,806,809 | 5/1988 | Wu et al. | 73/161 |
| 4,979,125 | 12/1990 | Kwon et al. | 364/507 |
| 5,159,563 | 10/1992 | Miller et al. | 364/507 |

OTHER PUBLICATIONS

"Global Non-Destructive Damage Evaluation in Solids", *The International Journal of Analytical and Experimental Model Analysis*, vol. 5, No. 2, Apr. 1990 pp. 67-79.

"Nondestructive Construction Error Detection in Large Space Structures", *AIAA Journal*, vol. 28, No. 1, Apr. 1988 pp. 146-152 by N. Stubbs, et al.

"Global Nondestructive Flow Detection", *Chemical Processing*, vol. 53, No. 7, May 1990, pp. 35, 38-39 by N. Stubbs.

"Global Damage Detection in Solids-Experimental Verification", *The International Journal of Analytical and Experimental Model Analysis*, vol. 5, No. 2, Apr. 1990, pp. 81-97 by N. Stubbs.

*Damage Mechanics & Continuum Modeling* (New York: ASCE, 1985) edited by N. Stubbs, et al. Oct. 1985.

"A General Theory of Non-Destructive Damage Detections in Structures", *Structural Control*, (Netherlands: Martinus Nijhoff Publishers), pp. 694-713 by N. Stubbs.

"Nondestructive Evaluation of Damage in Periodic Structures" *3rd International Conference on Space Structures* (London: Elsevier Scientific Publi., '84), pp. 332-337, N. Stubbs.

"Nondestructive Evaluation of Damage in Multi-Story Structures", *4th International Conference on Structural Safety and Reliability*, (Japan: Shinto Publi.), pp. 517-522 by N. Stubbs, et al.

*Primary Examiner*—Kevin J. Teska
*Assistant Examiner*—Jae H. Choi
*Attorney, Agent, or Firm*—Baker & Botts

[57] ABSTRACT

A method for detecting damage in the structure includes a plurality of steps. These steps include determining first data indicative of pre-damage modal parameters of the structure, determining second data indicative of post-damage modal parameters of the structure, and identifying at least one location of the damage based upon first and second data applied to an indicator function. The damage detection method is capable of localizing damage in the structure, and subsequently estimating the magnitude of such damage, using limited modal information.

94 Claims, 25 Drawing Sheets

APPARATUS AND METHOD FOR DAMAGE DETECTION

TECHNICAL FIELD OF THE INVENTION

This invention relates in general to structural testing, and in particular to a method and apparatus for damage detection.

BACKGROUND OF THE INVENTION

Structures constructed of various materials are critical in many applications such as large space structures, oil rig platforms, industrial piers, microwave towers, marine structures, bridges, buildings, aircraft, spacecraft, turbine hubs and rotors, chemical manufacturing systems, power poles, and biomedical structures as used for example in monitoring the strength of bones and joints. Damage in these structures may cause severe economic consequences and possibly loss of human life. Moreover, the design characteristics of a passive or an active controller depend upon the mechanical properties of the structure to be controlled. If a change in mechanical properties occurs at any point in the structure, a corresponding adjustment should be made in the control system if the original control objectives are to be continually satisfied. Therefore, it is desirable to non-destructively monitor changes in the mechanical properties of structures. The locations and magnitudes of changes in mechanical properties may provide the basis for decisions regarding repairs or future uses of a structure.

To allow continued use of a tested structure, non-destructive damage detection (NDD) approaches are utilized. Many techniques of NDD are currently available, including but not limited to X-radiography, ultrasound, neutron radiography, eddy currents, optical holography, acoustic holography, and thermography. These techniques have been incorporated in various prior art approaches to NDD applied to large scale structural systems. However, the prior art approaches have several shortcomings. First, the prior art approaches are local (spanning at most only a few feet at a time) rather than global (spanning the entire structure) in their scope of damage detection. Second, the prior art approaches require the application of additional theoretical analysis (i.e., fracture mechanics or continuum damage theory) to define and assess identified damage. Third, they can only be applied to accessible portions of a structure. Fourth, the prior art approaches are extremely costly when applied to large scale structural systems.

Structural damage may be defined as deviations of geometric or material properties of a structure that may cause unwanted displacements, distortions or vibrations in the structure. One such measure of damage is stiffness loss at one or more locations in a structure. Stiffness loss may be detected by non-destructive vibration measurement techniques. Vibration techniques may locate flaws and defects that might otherwise allude other methods such as ultrasonics or visual inspection. Furthermore, vibrational techniques may increase the efficiency of overall inspection by first localizing areas of distress for more detailed examination by local methods.

For any structure, the natural modes of vibration depend only upon the mechanical characteristics of the structure and not upon the excitation. In many instances, the required modal vibration responses can be obtained by measuring the modal responses at only a single point on the structure. Using this method, operators may be alerted to handle life-threatening structural conditions or to confirm possible structural damage.

It is established that changes in the modal vibration response of a structure may reflect deterioration in that structure. However, there is considerable debate among practitioners regarding how to interpret the changes in the modal response to yield information on the location and magnitude of damage. Practitioners of vibration measurement have long been aware that decreases in the vibrational response frequencies of a structure indicate damage to the structure. However, prior art approaches incorporating vibration measurement techniques fail to accurately relate changes in vibrational response frequencies to the specific locations and severity of damage to the structure. Instead, many prior art approaches only detect the existence of damage in the structure. Recent approaches incorporating vibration measurement techniques have successfully related changes in vibrational response frequencies of a structure to the specific locations and severity of damage to the structure. However, even these approaches may be inaccurate or impractical in many instances, as for example when damage is extensive or when complex structures are analyzed.

Therefore, a need has arisen for an accurate and practical method and apparatus for damage detection.

SUMMARY OF THE INVENTION

According to one aspect of the invention, a method for detecting damage in the structure comprises the following steps. First data indicative of pre-damage modal parameters of the structure are determined. Second, second data indicative of post-damage modal parameters of the structure are determined. Finally, at least one location of the damage is identified based on the first and second data as applied to an indicator function.

According to a further aspect of the invention, the first data indicates pre-damage modal parameters of the structure by measuring a pre-damage vibration frequency response thereof, and the second data are post-damage modal parameters obtained by measuring the post-damage vibration frequency response.

According to yet another aspect of the invention, a further step in the method comprises identifying at least one location of the damage based upon the first and second data. Then, a magnitude of the damage at this identified location can be subsequently ascertained.

According to a still further aspect of the invention, a stiffness matrix of the structure is generated based on one or more material and geometric properties of the structure. A plurality of $N \times 1$ matrices of modal parameters are extracted from the pre-damage and post-damage frequency response data. The parameters include fractional changes in damped eigenvalue frequencies $Z_d$, fractional changes in modal masses $Z_m$, fractional changes in modal damping ratios $Z_{damp}$, and fractional changes in the room of mode shapes $Z_{modes}$, N being selected as a number of the vibrational modes. Using the stiffness matrix and the pre-damage frequency response data, an $N \times B$ pre-damage sensitivity matrix $F_0$ is computed which relates changes in the modal parameters to the stiffness of one or more elements of the structure, where B is selected as a number of the elements. The stiffness matrix and post-damage frequency response data are used to compute an $N \times B$ sensitivity change matrix $\Delta F$, which accounts for changes in the sensitivity matrix $F_0$ resulting from damage to the structure. Then, $\alpha$ is solved from the equation $Z_d + Z_m + Z_{damp} + Z_{modes} = (F_0 + \Delta F)\alpha$, $\alpha$ being a $B \times 1$ matrix containing the fractional change in stiffness of each said element.

Technical advantages of the method include a) the ability to examine an entire structure at once—i.e., the method is global; b) the ability to simultaneously identify both the damage location(s) and the severity of damage a structure has incurred; c) the ability to use the same method regardless of what materials were used to make the structure; d) the ability to use the method regardless of the topology and size of the structure; e) the ability to use the initial frequency response functions obtained in applying the method to serve as the basis for future evaluations of the structure (deterministic or probalistic); f) the ability to use the damage parameters obtained using the method in conjunction with existing approaches to damage assessment such as a fracture mechanics and continuum damage theory; g) the ability to simply and easily collect the frequency response data needed to analyze an entire structure from accessible portions of the structure; h) the ability to use structure-specific inputs such as the "sensitivity-matrix" in future evaluations of a structure; i) the ability to use the method in conjunction with local methods to drastically reduce the cost and increase the accuracy of non-destructive damage detection in large scale structures; and j) the ability to enable the user to select the level of detail at which the structure is to be evaluated, explicitly trading time and cost considerations against the detail level of the resulting damage predictions.

BRIEF DESCRIPTION OF THE DRAWINGS

For a more complete understanding of the present invention, and the advantages thereof, reference is now made to the following descriptions taken in conjunction with the accompanying drawings, in which:

FIGS. 10a-j is a plot of diagram sensitivity matrices, mode shapes, and a plot of an indicator function for the space shuttle body flap;

DETAILED DESCRIPTION OF THE INVENTION

The preferred embodiment of the present invention and its advantages are best understood by referring to FIGS. 1-23 of the drawings, like numerals being used for like and corresponding parts of the various drawings.

Figure 1:
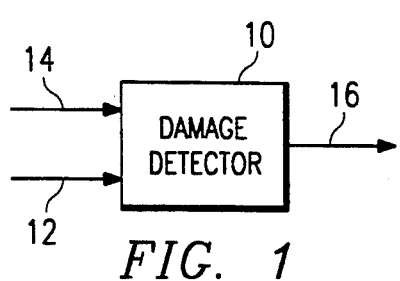
FIG. 1 is a schematic diagram of a basic approach utilized in the preferred embodiment.

FIG. 1 illustrates a basic approach utilized in the preferred embodiment. Damage detector 10 inputs data 12 indicative of pre-damage modal properties of a structure. Damage detector 10 also inputs data 14 indicative of post-damage modal properties of the same structure. Based on data 12 and 14, damage detector 10 outputs data 16 indicating the locations and severity of damage in the structure.

Figure 2:
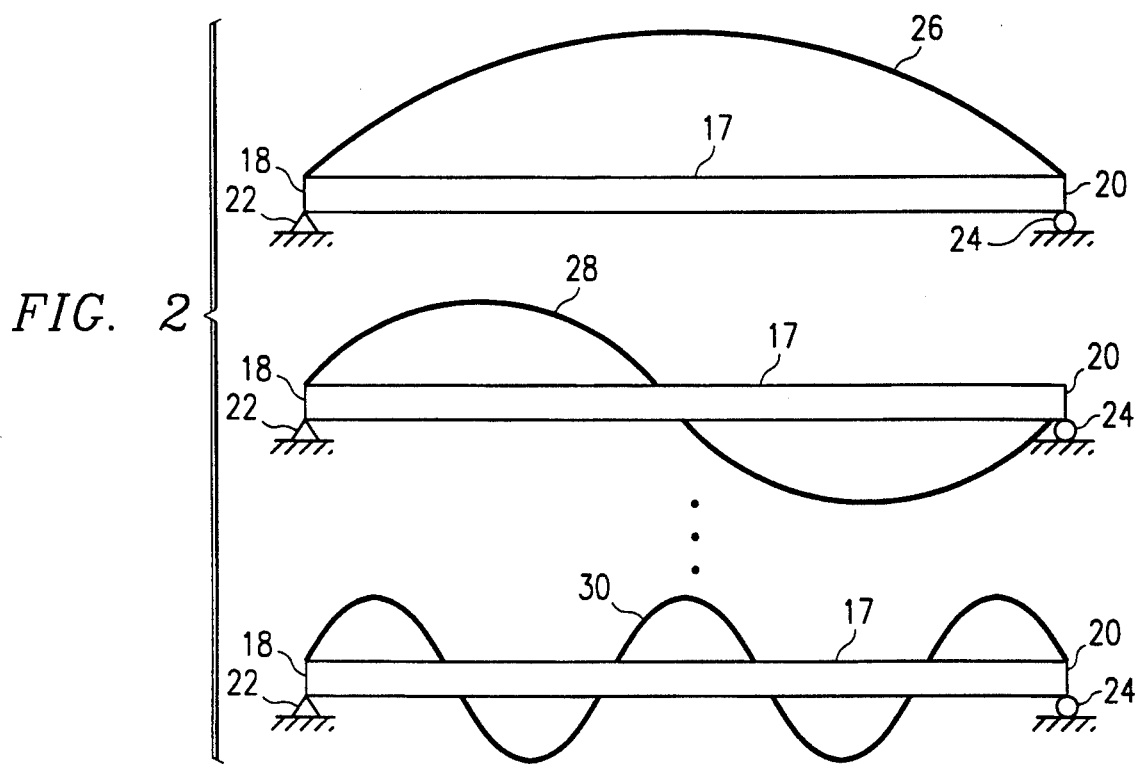
FIG. 2 is a diagram of mode shape modal properties of a simple beam.

FIG. 2 illustrates mode shape modal properties of a simple beam 17 having ends 18 and 20 attached to supports 22 and 24, respectively. Mode shapes 26, 28 and 30 are shown in FIG. 2 in an exaggerated manner generally indicating directions of maximum deflection amplitude at various points along beam 17. The number of mode shapes of a structure is equal to the number of degrees of freedom of the same structure. In the case of the undamped beam 17, several mode shapes are possible, as shown in FIG. 2. For example, mode shape 26 results when all points along beam 17 vibrate in phase. When points along beam 17 vibrate with different phases, other mode shapes are produced, such as mode shapes 28 and 30 in FIG. 2. As the resonant frequency of beam 17 increases, the relative phases of points along beam 17 change more rapidly, thereby producing more complex mode shapes such as mode shape 30. Hence, mode shape 30 occurs at a higher vibration frequency than does mode shape 28. Similarly, mode shape 28 occurs at a higher vibration frequency than does mode shape 26. For a particular mode shape, the ratios between maximum deflection amplitudes of points along beam 17 remain constant.

Figure 3:
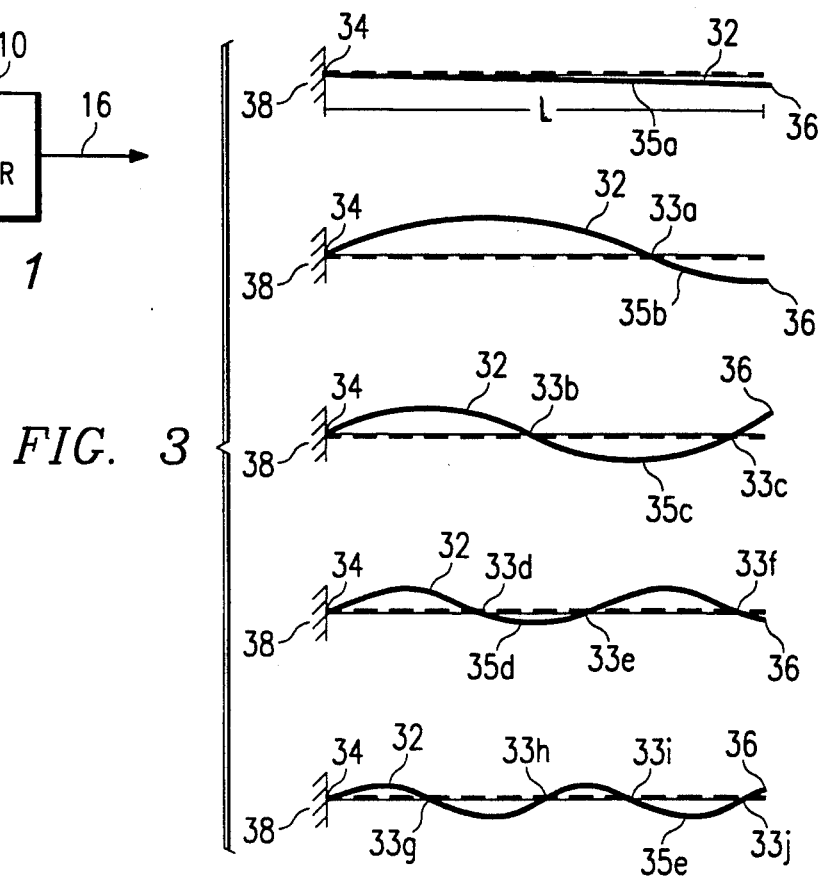
FIG. 3 is a diagram of mode shapes for an undamped elastic cantilever beam.

FIG. 3 illustrates the first five normal mode shapes for an undamped elastic cantilever beam 32 having ends 34 and 36, with end 34 being fixed to wall 38 in such a manner that no displacement or rotation occurs at end 34. Beam 32 has a length L. In mode 35a, all points along length L of beam 32 vibrate in phase as they deviate from the static position of beam 32. In mode 35b, the points along beam 32 from wall 38 through point 33a (0.774L) vibrate in phase, opposite the vibration phase of points from point 33a through end 36. Similarly, in mode 35c, phase delineation occurs at point 33b (0.501L) and at point 33c (0.868L). In mode 35d, phase delineation occurs at point 33d (0.356L), at point 33e (0.644L) and at point 33f (0.906L). In mode 5, phase delineation occurs at point 33g (0.279L), at point 33h (0.5L), at point 33i (0.723)L and at point 33j (0.926L).

Undamped natural frequencies of cantilever beam 32 are given by the expression $$\omega_n = C_n \sqrt{\frac{EI}{mL^4}} \qquad \text{(Eq. 1)}$$

where n is the mode number, E is Young's modulus of elasticity or stiffness, I is the second moment of area, and m is mass density (mass/volume). $C_n$ is given by the expression $C_n = (a_n L)^2$ (Eq. 2), where an is the eigenvalue for mode n.

Mode shapes of the undamped cantilever beam 32 are given by the expression $$\phi_n(x) = (\cosh a_n x - \cos a_n x) - \sigma_n(\sinh a_n x - \sin a_n x) \qquad \text{(Eq. 3)}$$

where $\sigma_n$ is given by the expression $$\sigma_n = \frac{\cos a_n L + \cosh a_n L}{\sin a_n L + \sinh a_n L} \qquad \text{(Eq. 4)}$$

The eigenvalues $a_n$ are obtained from a characteristic equation of the system which results from the imposition of boundary conditions on Equation (3). Table 1 lists values for Mode Number, $C_n$ and $\sigma_n$ for cantilever beam 32 of FIG. 3.

TABLE 1

| Values for Mode Numbers | | |
|---|---|---|
| Mode Number (n) | $C_n$ | $\sigma_n$ |
| 1 | 15.4118 | 1.000777 |
| 2 | 49.9648 | 1.000001 |
| 3 | 104.2477 | 1.000000 |
| 4 | 178.2697 | 1.000000 |
| 5 | 272.0309 | 1.000000 |

For general materials with arbitrary damping characteristics, mode shapes may be complex.

Figure 4B:
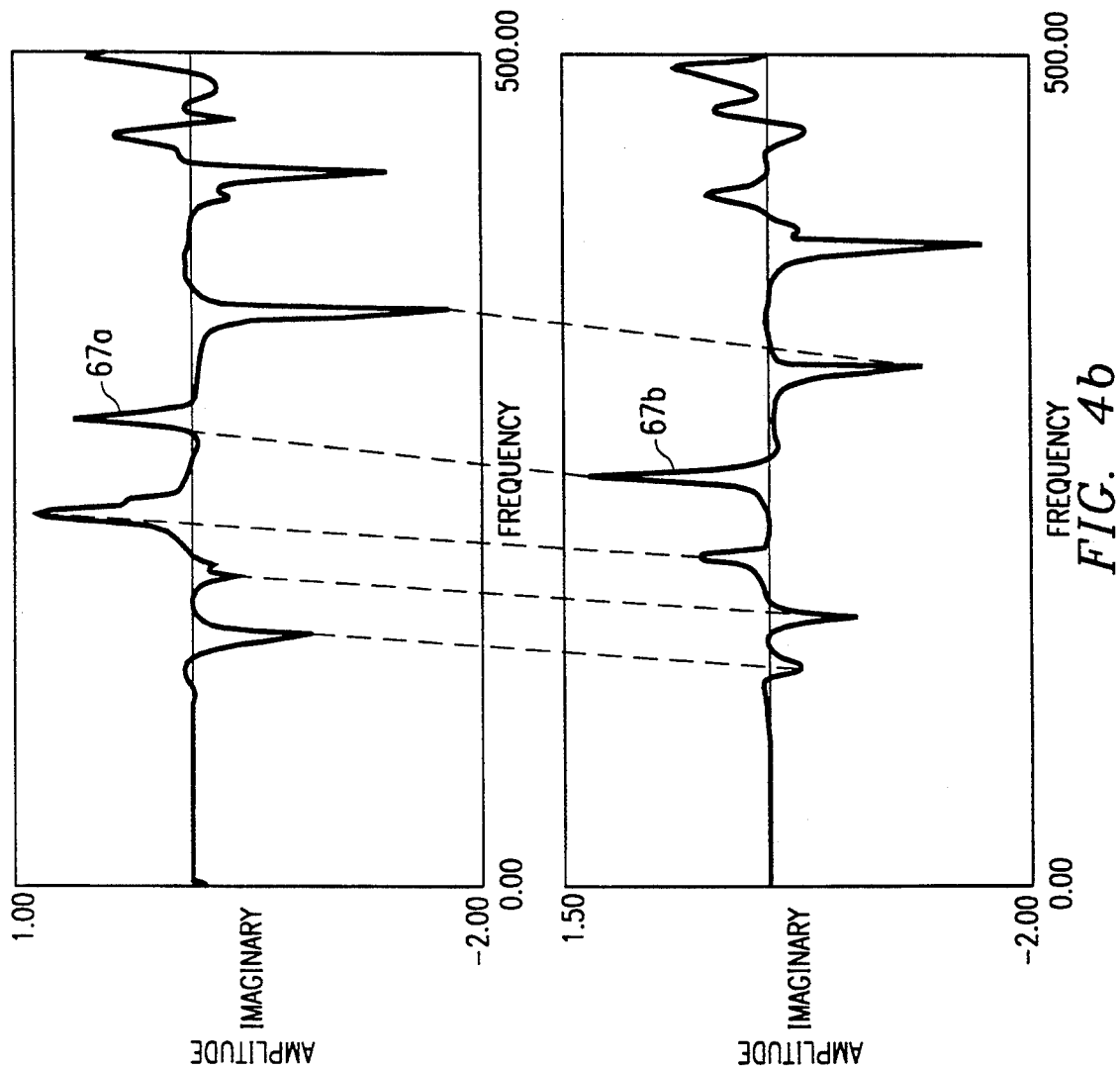
FIGS. 4a-b is a block diagram of an apparatus for measuring modal properties of a test structure, along with sample plots capable of being produced by the apparatus.
Figure 4A:
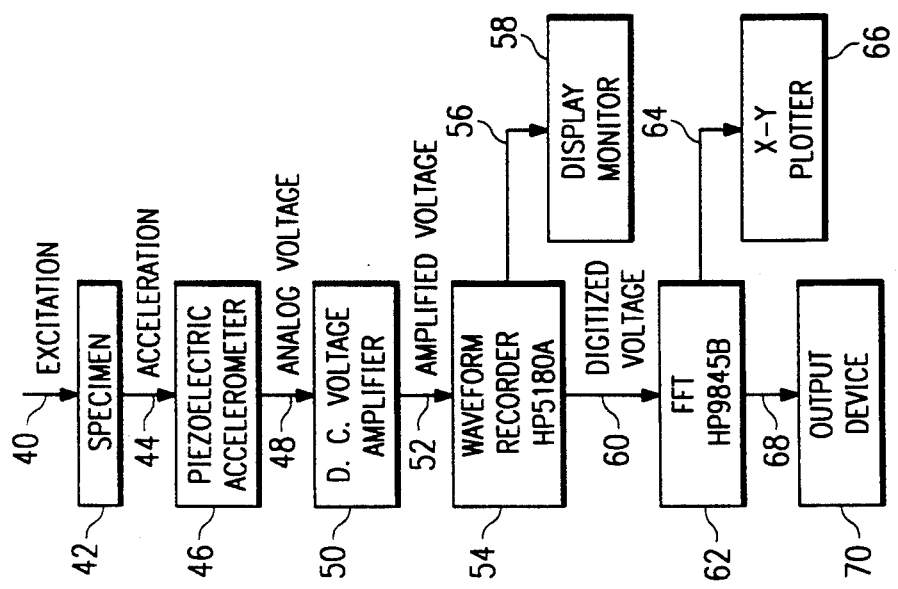

FIG. 4a illustrates a block diagram of an apparatus for measuring modal properties of a test structure, and is illustrative of how modal properties may be ascertained for a real structure. Specimen 42 receives physical excitation force 40 from an impact hammer (PCB 086B01) (not shown) having a maximum frequency range of 10 KHz. Specimen 42 provides acceleration 44 to a miniature 5 mV/g PCB 309A piezoelectric accelerometer 46 attached to specimen 42. Analog signals 48 from accelerometer 46 and from the impact hammer are conditioned by two PCB Model 480D06 signal conditioner power unit D.C. voltage amplifiers 50. Amplified analog voltage signals 52 from amplifiers 50 are then passed to HP Model 5180A waveform recorder 54 which performs an analog to digital conversion and stores the resulting digitized voltage data. Aliasing effects are eliminated or minimized at this stage by sampling analog voltage signals 52 at a rate at least twice the Nyquist frequency of the impact hammer. Digitized voltage data 56 are passed from waveform recorder 54 to display monitor 58, which displays the voltage-time signal represented by digitized voltage data 56. Digitized voltage data 60 are also passed to an HP-9845B microcomputer 62 which performs a Fast Fourier Transform (FFT) on the voltage-time signal represented by digitized voltage data 60. The resonances of the FFT correspond to the damped eigenvalue frequencies ("eigenfrequencies"), $\omega_{dr}$, of specimen 42. Microcomputer 62 outputs FFT data 64 to x-y plotter 66. Microcomputer 62 also provides FFT data 68 to output device 70. Output device 70 may store FFT data 68 on a floppy storage device or may provide real-time or subsequent display of FFT data 68.

In another exemplary embodiment, excitation force 40 may be induced on specimen 42 by slightly displacing and then releasing a portion of specimen 42. Further details regarding the apparatus of FIG. 4a and its applications may be found in "Global Damage Detection in Solids—Experimental Verification", *The International Journal of Analytical and Experimental Modal Analysis*, April 1990, pages 81–97, which is hereby incorporated by reference herein.

FIG. 4b illustrates sample plots 67a and 67b capable of being produced by x-y plotter 66 of FIG. 4a. As shown in FIG. 4b, FFT data 64 (FIG. 4a) represents the vibration frequency response of specimen 42 in the frequency domain rather than in the time domain. Hence, plots 67a-b shown in FIG. 4b illustrate amplitude versus frequency within the range of 0 to 500 hertz. Each of the peak amplitude frequencies shown in plots 67a-b of FIG. 4b denotes a resonant eigenfrequency of specimen 42. Rather than applying a single frequency to vibrate specimen 42, the hammer excitation technique provides an impulse to specimen 42, thereby inducing a vibration frequency response for specimen 42 simultaneously over a range of frequencies. Hence, it is unnecessary to first vibrate specimen 42 at a single frequency, to then measure the amplitudes of vibration at that frequency, and to then vibrate specimen 42 at subsequent discrete frequencies individually, in a technique commonly referred to as "scanning". Consequently, the vibration frequency characteristics of specimen 42 may be readily analyzed within the specified frequency range from plots 67a-b of FIG. 4b to determine a multiplicity of mode shapes, their associated resonant eigenfrequencies and the amount of damping at each resonant eigenfrequency. In an alternative embodiment, the mode shapes, associated resonant eigenfrequencies, and damping may be determined by optically scanning the vibrating structure with a laser.

The response functions illustrated in plots 67a-b are functions of the ratio of the output vibration frequency response of the structure versus the input force and duration of excitation applied to the structure. Since this ratio of output vibration frequency response versus input excitation is constant for a linear structure at a particular output frequency for all excitation forces applied to the same structure, the response functions illustrated in plots 67a-b are unaffected by variations in the input force and duration of excitation applied to the structure.

Plot 67a illustrates the vibration frequency characteristics of specimen 42 in a pre-damage state. Plot 67b illustrates vibration frequency characteristics of specimen 42 in a post-damage state. As FIG. 4b illustrates, the vibration frequency characteristics differ between the undamaged and subsequently damaged specimen 42. Specifically, resonant frequencies in plot 67b are lower than corresponding resonant eigenfrequencies in plot 67a, which may result from reduced stiffness or from increased mass of the structure. Moreover, vibration amplitudes at the resonant eigenfrequencies of plot 67a are different from vibration amplitudes at the resonant eigenfrequencies of plot 67b. Each resonant eigenfrequency and its associated amplitude correspond to a single mode shape of specimen 42. In the preferred embodiment, shifts in resonant eigenfrequencies and their associated mode shapes and damping characteristics are measured and analyzed to determine locations and severity of damage to a structure.

Generally, suppose an undamaged structure with N degrees of freedom, N modes, and B elements has spatial properties of mass, damping and stiffness given by matrices M, C, and K, respectively. The free-vibration response of this structure may also be characterized by the following modal quantities: damped natural frequencies ($\omega_{di}$) (i=1, ... N), undamped natural frequencies ($\omega_{oi}$), mode shape vectors ($\phi_i$) and modal damping ($\xi_i$). Similarly, if the structure is damaged or modified, the spatial properties are $M+\Delta M$, $C+\Delta C$, and $K+\Delta K$, while the modal properties are $\omega^*_{di}=\omega_{di}+\Delta\omega_{di}$, $\omega^*_{oi}=\omega_{oi}+\Delta\omega_{oi}$, $\phi^*_i=\phi_i+\Delta\phi_i$, and $\xi^*_i=\xi_i+\Delta\xi_i$, where $\Delta M$, $\Delta C$, $\Delta K$, $\Delta\omega_{di}$, $\Delta\omega_{oi}$, $\Delta\phi_i$ and $\Delta\xi_i$ represent changes in the properties resulting from damage to the structure.

Modal mass, modal damping, and modal stiffness are respectively given by $$M_i=\phi_i^T[M]\phi_i,$$

$$C_i=\phi_i^T[C]\phi_i.$$

and $$K_i=\phi_i^T[K]\phi_i,$$

where superscript T represents the transpose of the matrix.

In the absence of damping, $(K-\lambda M)\phi=0$, and consequently $\lambda_i=K_i/M_i$ for the undamaged structure, where $\lambda_i$ is the eigenvalue for mode i. After damage, $\lambda_i+\Delta\lambda_i=(K_i+\Delta K_i)/(M_i+\Delta M_i)$. If modal equations are written for the pre-damage and post-damage states of the structure and the equations are combined, the result is a system of N linear equations in B unknowns of the form:

$$Z_d+Z_m+Z_{damp}+Z_{modes}=(F_o+\Delta F)\alpha \quad (Eq. 5)$$

In which, $Z_d$, $Z_m$, $Z_{damp}$, and $Z_{modes}$ are $N \times 1$ matrices containing, respectively, fractional changes in the damped eigenvalue frequencies, fractional changes in the modal masses, fractional changes in the modal damping ratios, and fractional changes in a norm of the mode shapes; $\alpha$ is a $B \times 1$ matrix containing the fractional loss in stiffness of each element; $F_o$ is an $N \times B$ sensitivity matrix relating changes in modal parameters to changes in element stiffness; and $\Delta F$ is the change in the sensitivity matrix due to changes in mode shapes resulting from the damage. For undamped structures, $Z_{damp}$ is disregarded.

Matrix $Z_d$ is represented as $$Z_d = \begin{bmatrix} Z_{d1} \\ Z_{d2} \\ \cdot \\ \cdot \\ Z_{dN} \end{bmatrix},$$

where $Z_{di} = \dfrac{\Delta\lambda_{di}}{\lambda_{di}}\left(1+\dfrac{\Delta M_i}{M_i}\right)$ where $\lambda_{di}$ is a damped natural frequency for mode i of a damped structure, and $\Delta\lambda_{di}$ is the change in $\lambda_{di}$ resulting from damage to the structure.

Matrix $Z_m$ is represented as $$Z_m = \begin{bmatrix} Z_{m1} \\ Z_{m2} \\ \cdot \\ \cdot \\ Z_{mN} \end{bmatrix},$$

where $Z_{mi} = \dfrac{\phi^{*T}_i \Delta[M]\phi^*_i}{M_i} + \dfrac{\Delta\phi_i^T[M]\Delta\phi_i}{M_i}$ Matrix $Z_{damp}$ is represented as $$Z_{damp} = \begin{bmatrix} Z_{damp1} \\ Z_{damp2} \\ \cdot \\ \cdot \\ Z_{dampN} \end{bmatrix},$$

where $Z_{dampi} = f(\Delta\xi) = \dfrac{\Delta\xi_i^2}{1-\xi_i^2}\left(1+\dfrac{\Delta M_i}{M_i}\right)$ Matrix $Z_{modes}$ is represented as $$Z_{modes} = \begin{bmatrix} Z_{modes1} \\ Z_{modes2} \\ \cdot \\ \cdot \\ Z_{modesN} \end{bmatrix},$$

where $Z_{modesi} = \dfrac{\Delta\phi_i^T[K]\Delta\phi_i}{K_i}$, and where $\Delta\phi_i$ is the change in mode shape i resulting from the damage.

Matrix $\alpha$ is represented as $$\alpha = \begin{bmatrix} \alpha_1 \\ \alpha_2 \\ \cdot \\ \cdot \\ \alpha_B \end{bmatrix},$$

where $a_j = \Delta k_j/k_j$, $k_j$ is the stiffness measure for element j, and $\Delta k_j$ is the change in stiffness resulting from damage to the structure.

Matrix $F_o$ is represented as $$F_o = \begin{bmatrix} F_{11} & F_{12} & \cdots & F_{1B} \\ F_{21} & & & F_{2B} \\ \cdot & & F_{ij} & \cdot \\ \cdot & & & \cdot \\ \cdot & & & \cdot \\ F_{N1} & F_{N2} & \cdots & F_{NB} \end{bmatrix},$$

where $F_{ij} = B_i^T K_j B_i/K_i$, where matrix $B_i = N_j \phi_i$, where $K_j$ is the contribution of the jth element to the primitive stiffness matrix, and where $N_j$ is a connectivity matrix indicating how element j is connected to other elements of the structure.

Matrix $\Delta F = F^* - F_o$, where matrix $F^*$ is represented as $$F_o = \begin{bmatrix} F^*_{11} & F^*_{12} & \cdots & F^*_{1B} \\ F^*_{21} & & & F^*_{2B} \\ \cdot & & F^*_{ij} & \cdot \\ \cdot & & & \cdot \\ \cdot & & & \cdot \\ F^*_{N1} & F^*_{N2} & \cdots & F^*_{NB} \end{bmatrix},$$

where $F_{ij}^* = B_i^{*T} K_j B_i^*/K_i$, and where $B_i^* = N_j (\phi_i + \Delta \phi_i)$.

Further details regarding the development of Equation (5) may be found in "A General Theory of Non-Destructive Damage Detection in Structures", *Structural Control: Proceedings of the Second International Symposium on Structural Control, University of Waterloo, Ontario, Canada*, Jul. 15-17, 1985, pp. 694-713, and in "Nondestructive Construction Error Detection in Large Space Structures", *AIAA Journal*, Vol. 28, No. 1, January, 1990, pp. 146-152, and in "Global Non-Destructive Damage Evaluation in Solids", *The International Journal of Analytical and Experimental Modal Analysis*, April, 1990, pp. 67-79, which are each hereby incorporated by reference herein.

In the preferred embodiment, all items on the left hand side of Equation (5) are obtained from pre and post-damage modal tests. In an important aspect of the preferred embodiment, the sensitivity matrix, $F_o$, is obtained from the stiffness matrix of the structure and measured undamaged modes. In an alternative embodiment, the sensitivity matrix, $F_o$, may be obtained from a dynamic finite element analysis of a theoretical model of the undamaged structure. However, by obtaining the sensitivity matrix, '$F_o$, from the stiffness matrix of the structure and measured undamaged modes rather than from a theoretical model, a more accurate determination of damage is achieved by avoiding negative effects of uncertainties regarding the theoretical model; furthermore, it becomes unnecessary to correlate actual measured data to the theoretical model.

In another important aspect of the preferred embodiment, the $\Delta F$ matrix accounts for changes in the sensitivity matrix, $F_o$, resulting from damage to the structure. Hence, a more accurate determination of damage is achieved. The matrix $\Delta F$ is obtained from measured pre-damage and post-damage modes and a stiffness matrix of the structure.

In the preferred embodiment, a variety of approaches are used to obtain a solution to Equation (5). If $N \geq B$, are used the sensitivity matrix is inverted using exact inverses or over-determined least squares approaches to give the magnitude and location of damage directly.

If $B > N$, pseudo inverse techniques in certain instances are used in certain instances to invert the sensitivity matrix.

If $B >> N$, pseudo inverse techniques may not be used to invert the sensitivity matrix. However, in an important aspect of the preferred embodiment, the problem is separated into a localization phase and a severity estimation phase. By first locating damage and then subsequently estimating its severity, damage is confidently located from among hundreds of members given only a few modes. Given the location of damage, a reduced set Equation (5) may then be used to accurately estimate the severity of damage to the structure.

Figure 5:
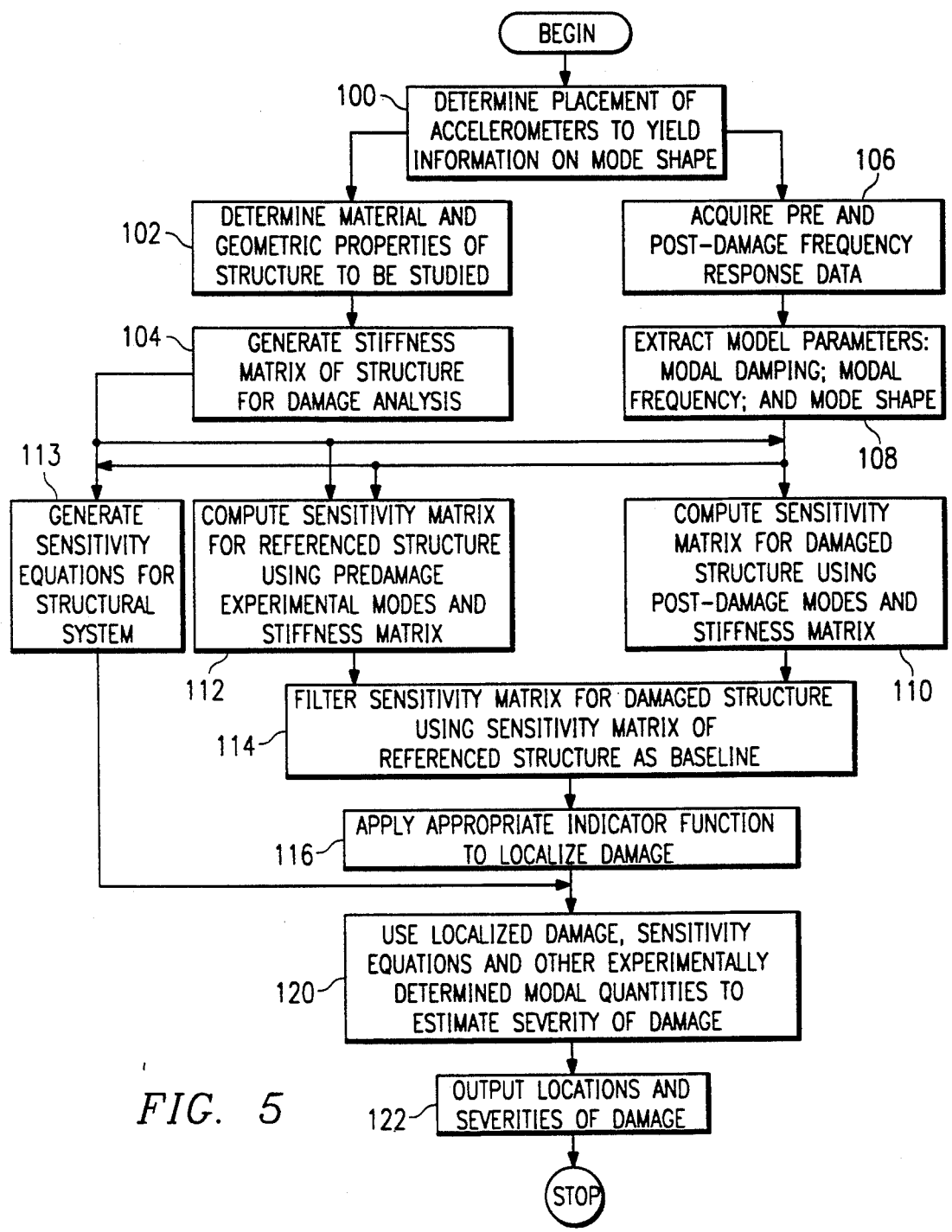
FIG. 5 is a flow diagram of steps in the preferred embodiment for determining locations and severities of damage to a structure.

FIG. 5 illustrates a flow diagram of steps in the preferred embodiment for determining locations and severities of damage to a structure. In Block 100, the placement of one or more accelerometers on a structure is determined, such that accelerometer data provides information indicating mode shapes of the structure to be analyzed. Placement of one or more accelerometers should be consistent with a mechanical damage detection model of the structure which is based upon the structure's actual mechanical behavior; elements of the damage detection model have assigned geometric and material properties. It should be noted that accelerometer readings may also be interpolated to provide pseudo-accelerometer readings as needed, based upon a determined level of specificity of damage to be detected in a particular structure. After determining placement of one or more accelerometers in Block 100, material and geometric properties of the structure are determined in Block 102. Then, in Block 104, a modal stiffness matrix of the structure is generated for damage analysis, using a decomposed stiffness matrix of the damage detection model.

After placement of one or more accelerometers in Block 100, pre-damage and post-damage frequency response data is acquired in Block 106. From the pre-damage and post-damage frequency response data, modal parameters are extracted in Block 108 to determine modal damping, modal frequency and mode shapes. The modal parameters data, along with the material and geometric properties data determined in Block 102, are preferably checked for completeness, formatting, consistency, and errors.

After the stiffness matrix is generated in Block 104, and after modal parameters are extracted in Block 108, the sensitivity matrix is computed in Block 110 for the damaged structure using post-damage experimental modes and the stiffness matrix. Moreover, in Block 112, the sensitivity matrix is computed for the referenced structure using pre-damage experimental modes and the stiffness matrix. Also, sensitivity equations are generated in Block 113 for the structural system. Hence, the sensitivity matrices depend upon the accuracy of the determined modal parameters and upon the accuracy of the determined stiffness matrix. Consequently, in an important aspect of the preferred embodiment, the modal parameters are determined directly from measurements of actual vibration frequency responses of the structure, rather than from estimates based on a theoretical model of the structure.

After computing sensitivity matrices in Blocks 110 and 112, the sensitivity matrix for the damaged structure is filtered in Block 114, using the sensitivity matrix of the referenced structure as a base line. Then, in yet another important aspect of the preferred embodiment, an appropriate indicator function is applied in Block 116 to localize damage in the structure. The indicator function utilized in Block 116 is described further hereinbelow.

After localizing damage in Block 116, the severity of damage is estimated in Block 120, based upon the localized damage, upon the sensitivity equations generated in Block 113, and upon other experimentally determined modal quantities. After severity of damage is estimated in Block 120, locations and severity of damage are output in Block 122.

Damage is localized in Block 116, based upon an appropriate indicator function. The indicator function is an important aspect of the preferred embodiment, because it allows damage to be localized in the structure prior to determining the severity of damage in the structure, thereby confidently locating damage from among hundreds of members given only a few modes. By first locating damage, the reduced set equation (5) is then used to accurately estimate the severity of the damage.

The indicator function is based upon the concept that if $F_{ij}$ and $F_{ij}^*$ are the respective pre-damage and post-damage sensitivities for mode i and member j of a structure, and if $K_j$ is the spatial stiffness, and if $\phi_i$ and $\phi_i^*$ are the respective pre-damage and post-damage modes, and if r is a real number, then real functions $f(F_{ij}, F_{ij}^*, \phi_i, \phi_i^*, K_j) > r$ exist such that j is a damaged location.

After j is identified as a damaged location, then severity of damage is determined based upon the following concept. If $F_{ij}$ and $F_{ij}^*$, $\phi_i$ and $\phi_i^*$, and $\xi_i$ and $\xi_i^*$ are the $i^{th}$ modal parameters associated with a structure damaged at location j, and if $\alpha_j$ is the severity of damage at location j, then a function $g_i(F_{ij}, F_{ij}^*, \phi_i, \phi_i^*, \xi_i, \xi_i^*, \alpha_j) = 0$ exists which can be solved to obtain $\alpha_j$ at each location j for each mode i. The indicator function indicates a change in energy stored in a location of the structure. Changes in stored energy typically occur only very near one or more locations where the structure is damaged.

The indicator function is a function of $\Delta F_{ij}$, where i is the mode shape number and j is the element number designating a location in the structure. The quantity $\Delta F_{ij} = F_{ij}^* - F_{ij}$, where $F_{ij}$ is a sensitivity element of a sensitivity matrix, $F_0$, for the undamaged structure, and where $F_{ij}^*$ is a sensitivity element of a sensitivity matrix, $F^*$, for the damaged structure.

Several indicator functions may be used to localize damage in a structure. Examples of indicator functions which relate $F_{ij}$ to $F_{ij}^*$ in some manner are:

$$I_j = F^*_{ij}/F_{ij} = 1 + \frac{\Delta F_{ij}}{F_{ij}},$$

where $F_{ij}^* = F_{ij} + \Delta F_{ij}$;

$I_j = (F_{ij}^* - F_{ij})^n$, where n is an integer and typically $8 \leq n \leq 10$;

$I_j = n \times \Delta F_{ij}$, where n is an integer; and $$I_j = \left[ \frac{\nabla F_o(x_i, Y_i)}{|\nabla F_o(x_i, y_i)|} \right] \cdot \left[ \frac{\nabla F^*(x_i, y_i)}{|\nabla F^*(x_i, y_i)|} \right]$$

where $x_i$ and $y_i$ are coordinates of a two-dimensional surface divided into gradients corresponding to mode i, such that sensitivity matrices $F_0$ and $F^*$ are represented as two-dimensional surfaces, and where $I_j$ is the cosine of the angle between outward normals of the two surfaces at coordinates $(x_i, y_i)$ on each surface corresponding to location j in the structure.

Another indicator function is $$I_k = \frac{F^*_{ik}}{F_{ik}} \cdot \frac{b_{ik}}{b^*_{ik}} \cdot \frac{K_i}{K^*_i},$$

where $K^*_i = \phi^{*T}_i[K]\phi^*_i$, $b_{ik} = (\phi_{iA} - \phi_{iC})_k^2$, $b^*_{ik} = (\phi^*_{iA} - \phi^*_{iC})_k^2$, $F^*_{ik} = F_{ik} + \Delta F_{ik}$, i is a selected mode, k is a selected element, $\phi_{iA}$ is an element of matrix $\phi_i$ corresponding to a node A of the structure, $\phi_{iC}$ is an element of matrix $\phi_i$ corresponding to a node C of the structure, $\phi^*_{iA}$ is an element of matrix $\phi^*_i$ corresponding to node A, $\phi^*_{iC}$ is an element of matrix $\phi^*_i$ corresponding to node C, and nodes A and C are nodes connected to element k. Thus, the quantity $(\phi_{iA} - \phi_{iC})_k$ is the differential displacement of element k with respect to mode i. It should be noted that N number of $\phi_i$ matrices exist, each for a particular mode i of the structure. Each matrix $\phi_i$ may be represented as $$\phi_i = \begin{bmatrix} \phi_{i1} \\ \phi_{i2} \\ \cdot \\ \cdot \\ \phi_{iz} \\ \cdot \\ \cdot \\ \phi_{iN} \end{bmatrix},$$

where N is the number of nodes, in a system where the number of nodes equals the number of degrees of freedom, which is equal to the number of modes N. Matrices $\phi^*_i$ are represented in a manner analogous to matrices $\phi_i$. If the damage detection model closely models the true structure, then $I_k \approx \alpha_k + 1$, and the indicator function $I_k$ consequently has the capability of simultaneously locating the damage and estimating its severity.

Another indicator function utilizing matrices $\phi_i$ and $\phi^*_i$ is $$I_k = \frac{(\phi^*_{iA} - \phi^*_{iC})_k}{(\phi_{iA} - \phi_{iC})_k} \left[ \frac{\Delta F_{ik}}{F_{ik}} - \right.$$

$$\frac{2[(\phi^*_{iA} - \phi^*_{iC})_k - (\phi_{iA} - \phi_{iC})_k]}{(\phi_{iA} - \phi_{iC})_k} -$$

$$\left. \frac{[(\phi^*_{iA} - \phi^*_{iC})_k - (\phi_{iA} - \phi_{iC})_k]^2}{(\phi_{iA} - \phi_{iC})_k} \right]$$

For this indicator function, if the damage detection model closely models the true structure, then $I_k \approx \alpha_k$, and the indicator function $I_k$ consequently has the capability of simultaneously locating the damage and estimating its severity.

Each of the aforementioned indicator functions indicates damage when $I_j > r$ or $I_k > r$, where r is a real number. More than one indicator function may be used in a particular situation to cross-check the likelihood that a structure is damaged at location j.

In an alternative embodiment, if pre-damage modal properties are estimated based upon a theoretical model such as a Finite Element Model (FEM), rather than being determined from the actual vibration frequency response of the pre-damage destruction, then damage may be localized based upon the indicator function $I_k = Z_i/Z_j - F_{ik}/F_{jk}$, where damage is indicated at location k when $I_k$ is a minimum, and where i and j are two separate modes of the same structure. This relationship is based upon the concept that for any two modes, i and j, the following two sensitivity equations may be written:

$$Z_i = \sum_{k=1}^{B} F_{ik} \alpha_k$$

and $$Z_j = \sum_{k=1}^{B} F_{jk} \alpha_k.$$

In the preferred embodiment, $Z_i$ and $Z_j$ are elements of the $Z_d$ matrix of Equation (5) for modes i and j, respectively, when damage is assumed to be small and when other items on the left hand side of Equation (5) are consequently assumed to be insignificant. If we assume that the structure is damaged at a single location, e.g., k=q, then on setting $$\beta_{ij} = Z_i/Z_j$$

the equations for $Z_i$ and $Z_j$ may be substituted to give $$\beta_{ij} = F_{iq}/F_{jq}$$

Thus, the location of damage, q, may be identified by that location at which for any two modes, the ratio of changes in eigenvalues equals the ratio of the sensitivities. Since $\beta_{ij}$ can be determined from experimental measurements and $F_{ik}$ are known from the sensitivity matrix of the FEM model of the structure, the indicator function $I_k$ may be utilized to locate damage.

Given that the damage is at location q in the structure, the magnitude of the damage may be estimated from the equation for $Z_i$ or for $Z_j$ (with all $\alpha_i = 0$ except i = q)

$$\alpha_q = Z_i/F_{iq}$$

where, for the linear problem, $\alpha_q$ is defined in the range $$0 \geq \alpha_q \geq -1$$

Analogous expressions can be used for a structure damaged at two or more locations.

Figure 6:
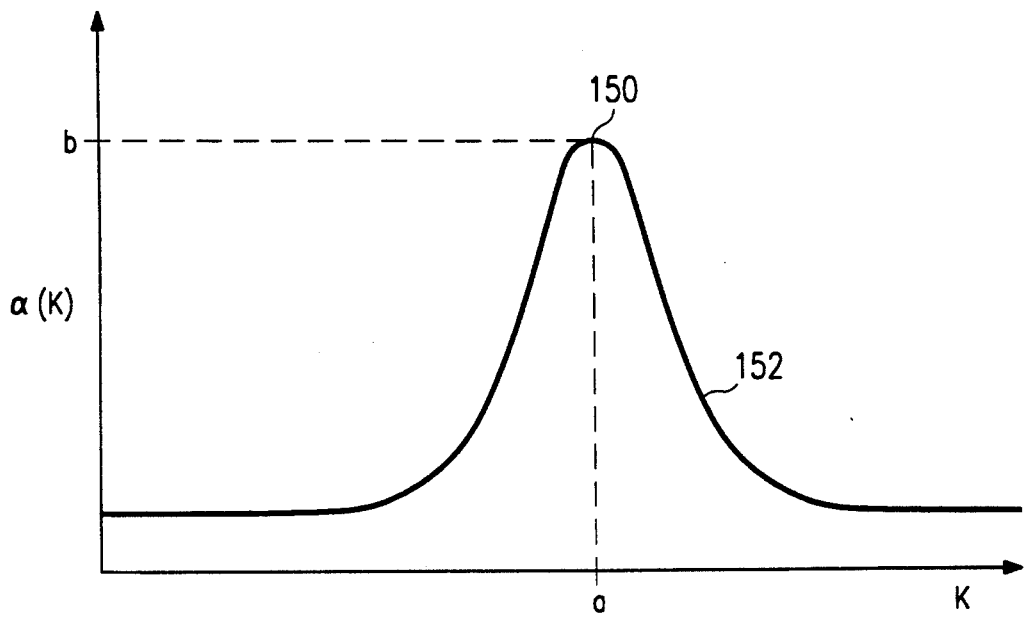
FIG. 6 is a plot of a damage intensity matrix.

FIG. 6 illustrates a plot of a damage intensity matrix $\alpha$ of Equation (5) as a function of k, where k is an element location in the structure. In FIG. 6, location a in the structure has a damage severity equal to b, which is significant damage as indicated by maximum point 150 of curve 152.

In another important aspect of the preferred embodiment, location a and severity b are assumed and then applied to Equation (5) to determine whether the assumed location a and severity b are accurate. In the preferred embodiment, location a and severity b are assumed based upon locations identified through use of one or more other indicator functions described further hereinabove. In this manner, locations identified through use of an indicator function may be cross-checked. In an alternative embodiment, location a and severity b are originally obtained by substituting the distribution given by curve 152 directly into Equation (5) and solving for a and b without first using another indicator function.

Specifically, the following indicator function is utilized to relate an assumed location a and severity b to Equation (5)

$$\alpha(k) = \frac{b}{1 + n(k-a)^2},$$

where n is some number which controls the width of curve 152 in the region near location a. Note that if a is the correct location of damage and if b is the correct severity of damage at location a, then $\alpha(k)$ equals the correct severity of damage, b, when k=a. When the correct value for $\alpha(k)$ is substituted into Equation (5), the left hand and right hand sides of Equation (5) are approximately equal. If a significant difference exists between the two sides of Equation (5), then a new value for a or b is inserted into the expression for $\alpha(k)$. In this manner, an accurate location and severity of damage to the structure may be either cross-checked or originally obtained.

For example, in applying Equation (5) for a particular mode and location, the following expression is obtained.

$$Z_i = \sum_{k=1}^{N} F_{ik} \alpha(k)$$

where i is the mode number and where k is the location of an element in the structure. In the preferred embodiment, $Z_i$ is an element of the $Z_d$ matrix of Equation (5), when damage is assumed to be small and when other items on the left hand side of Equation (5) are consequently assumed to be insignificant. Substituting the indicator function for $\alpha(k)$ gives $$Z_i = \sum_{k=1}^{N} F_{ik} \frac{b}{1 + n(k-a)^2},$$

thereby giving an equation for each mode i which incorporates the assumed location a and severity b. Consequently, in still another important aspect of the preferred embodiment, if P modes (i.e. i=1 ... P) are analyzed for the structure, then P equations are available to solve for the two unknowns, a and b, thereby solving for location and severity of damage in large structures even when B >> N.

Note also that three dimensional coordinates (x, y, z) may be used to describe the locations of elements in the structure, in which case the expression for $\alpha(x, y, z)$ is $$a(x,y,z) = \frac{q}{1 + n(x-a)^2 + n(y-b)^2 + n(z-c)^2}$$

where q is the severity of damage and where (a, b, c) are the coordinates of an assumed location of damage in the structure. In this case, P equations are available to solve four unknowns, a, b, c, and q.

Figure 7:
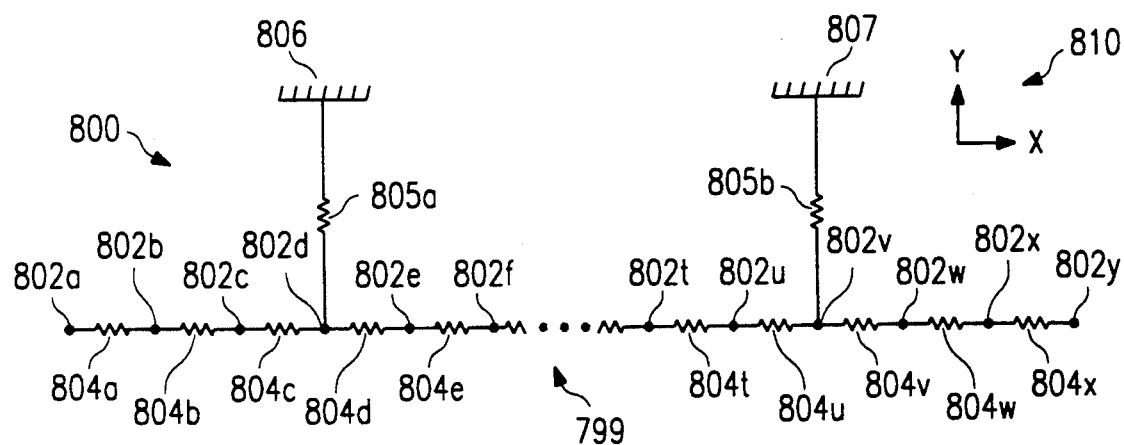
FIG. 7 is an elevational schematic view of a hanging shear beam.

With reference to FIG. 7, an application of the preferred embodiment is illustrated for a hanging shear beam 799. Shear beam 799 comprises twenty-four shear springs 804$a$-$x$. Each spring 804$a$-$x$ is assigned an element number from 1 to 24, respectively. The mass of shear beam 799 is concentrated at 25 nodal points 802$a$-$y$. Each nodal point 802$a$-$y$ is assigned a number from 1 to 25, respectively. Shear beam 799 is attached to extensional springs 805$a$-$b$ at nodes 802$d$ and 802$v$, respectively. Springs 805$a$-$b$ are attached to supports 806 and 807, respectively. Only motion in the y-direction 810 is allowed in the example. Thus, the 24×24 primitive stiffness matrix for the problem is a diagonal matrix $$K_p = \begin{bmatrix} k_1 & & & & & \\ & k_2 & & \bigcirc & & \\ & & \ddots & & & \\ & \bigcirc & & k_i & & \\ & & & & \ddots & \\ & & & & & k_{24} \end{bmatrix}$$

where $K_p$ is the primative stiffness matrix and $k_i$ is the stiffness value for the $i^{th}$ element. The 24×25 connectivity matrix N for this problem is given by $$N = \begin{bmatrix} -1 & 1 & & & & & \\ & -1 & 1 & & \bigcirc & & \\ & & -1 & 1 & & & \\ & \bigcirc & & \ddots & & & \\ & & & & -1 & 1 & \\ & & & & & -1 & 1 \end{bmatrix}$$

having a total of 25 columns and 24 rows.

The system stiffness matrix is given by $$K = N^T K_p N$$

The 25×25 mass matrix for the structure is given by $$M = \begin{bmatrix} M_1 & & & & \\ & M_2 & \bigcirc & & \\ & & \ddots & & \\ & \bigcirc & & M_{24} & \\ & & & & \ddots \\ & & & & & M_{25} \end{bmatrix}$$

Twenty-five hypothetical accelerometers (not shown) are placed at nodal points 802$a$-$y$ corresponding to the mass concentration points. An actual analysis of the response of the accelerometers would yield twenty-five mode shapes and twenty-five eigenfrequencies for each state of shear beam 799. For illustrative purposes of the present example, the modal response obtained from the accelerometers may be simulated using a dynamic analysis of shear beam 799, springs 805$a$-$b$, and supports 806 and 807, which collectively form structural system 800. Two states of structural system 800 are considered: (a) the undamaged state in which the stiffnesses of springs 804$a$-$x$ are each equal to $10^9$ N/M and the masses of nodes 802$a$-$y$ are each equal to 0.1175 kg; and (b) the damaged state in which the stiffness of spring 804$a$ (element number 1) is reduced to $0.5 \times 10^9$ N/M and the stiffness of spring 804$h$ (element number 8) is reduced to $0.5 \times 10^9$ N/M. Thus, the damage corresponds to $\alpha_1 = \alpha_8 = -0.5$.

Figure 8A:
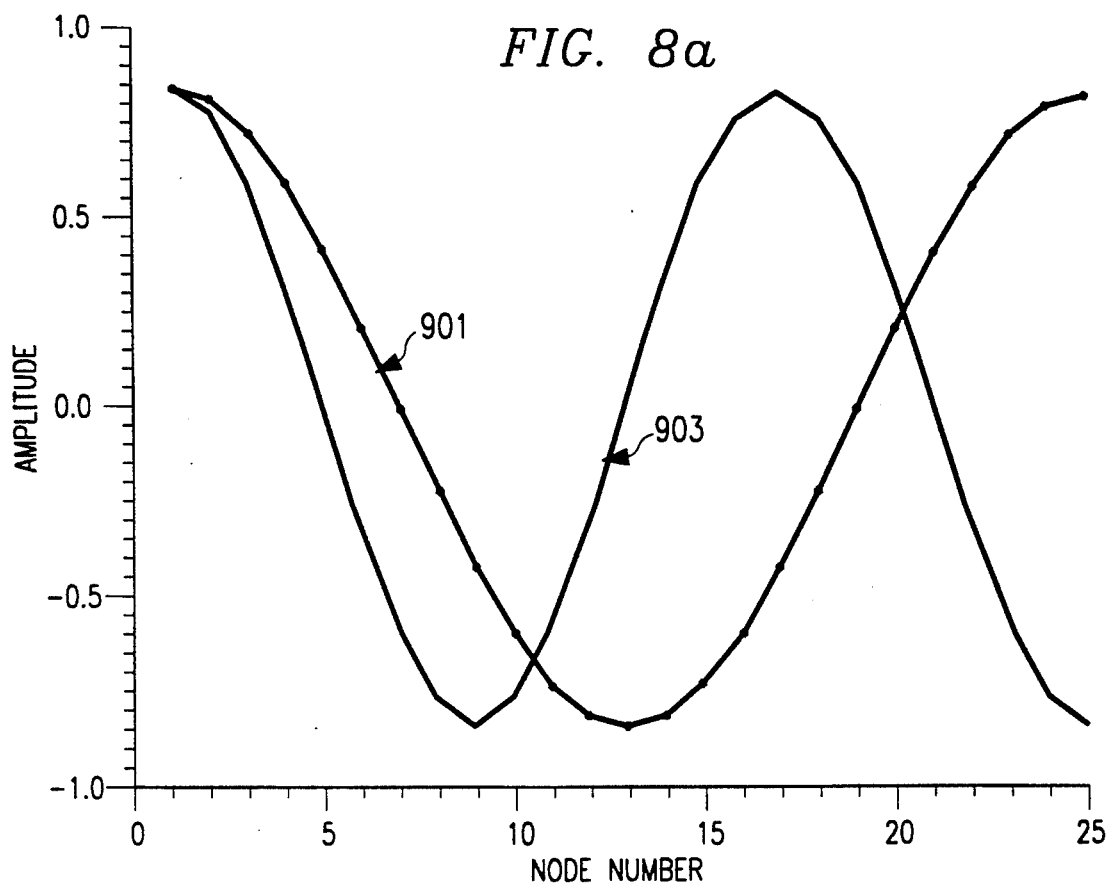
FIGS. 8a-b is a diagram of mode shapes of the hanging shear beam.
Figure 8B:
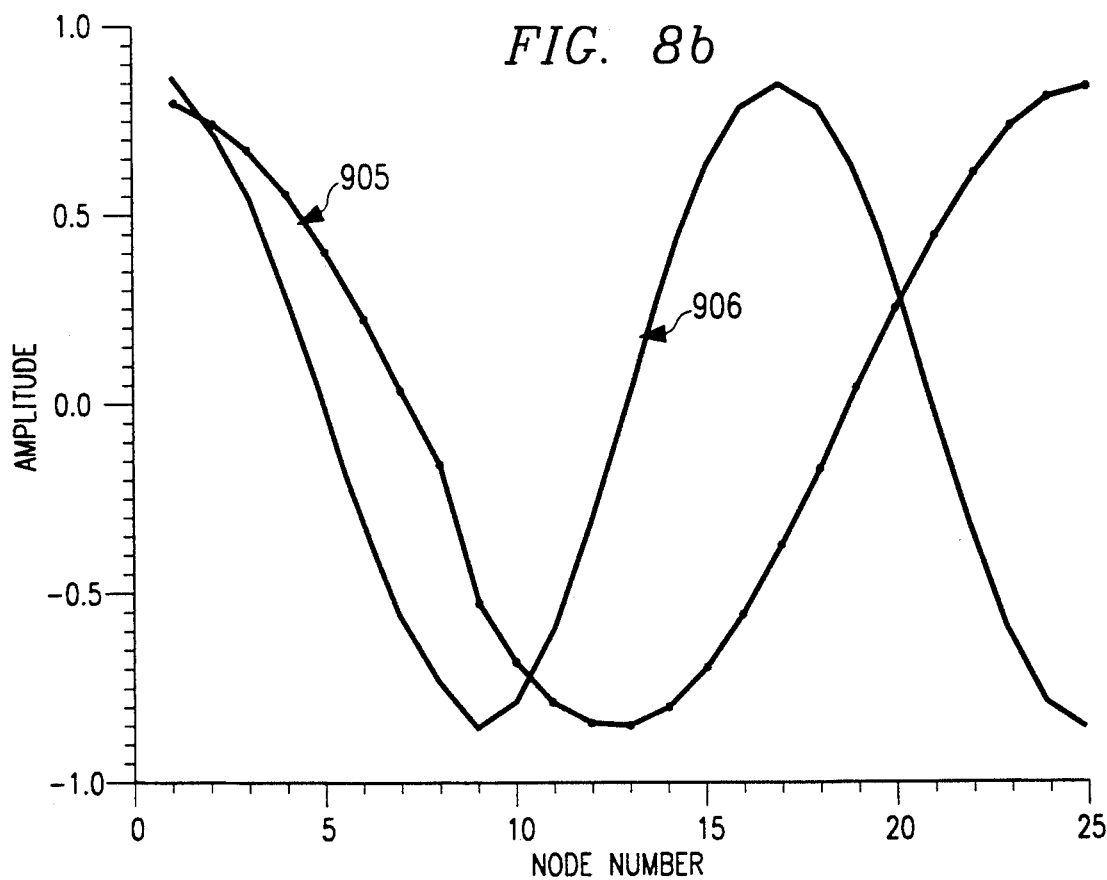

Data indicating five pre-damage and post-damage mode shapes (modes 1 to 5), non-dimensionalized with respect to modal mass, for structural system 800 are listed in Tables 2$a$ and 2$b$, respectively. FIG. 8$a$ illustrates pre-damage mode shapes 901 and 903, and FIG. 8$b$ illustrates post-damage mode shapes 905 and 906. For mode 3, the corresponding pre-damage and post-damage eigenvalues are $5.7998 \times 10^8$ and $5.4168 \times 10^8$, respectively.

For mode 4, the corresponding pre-damage and post-damage eigenvalues are $1.2956 \times 10^9$ and $1.2877 \times 10^9$, respectively.

The contribution of the $i^{th}$ mode and $k^{th}$ member to the sensitivity matrix is given by $$f_{ik} = \frac{k_k(\phi_{ik} - \phi_{ik+1})k^2}{\sum_{b=1}^{24} k_b(\phi_{ib} - \phi_{ib+1})b^2}$$

where $k_k$ is the stiffness of the $k^{th}$ element. For example, the pre-damage and post-damage contributions of the third mode (mode 3) and $k^{th}$ member to the sensitivity matrix are respectively given by $$f_{3k} = \frac{k_k(\phi_{3k} - \phi_{3k+1})k^2}{\sum_{b=1}^{24} k_b(\phi_{3b} - \phi_{3b+1})b^2}$$

and $$f_{3k}^* = \frac{k_k(\phi_{3k}^* - \phi_{3k+1}^*)k^2}{\sum_{b=1}^{24} k_b(\phi_{3b}^* - \phi_{3b+1}^*)b^2}$$

The pre-damage and post-damage sensitivities for mode 3 and mode 4 are listed in Table 2c.

The indicator function selected for this example is $I_k = f^*_{ik}/f_{ik}$. The real number r discussed further hereinabove is taken to be $\mu_I + 2\sigma_I$ where $\mu_I$ is the mean value of the indicator function for mode i and where $\sigma_I$ is the standard deviation of the indicator function for mode i. The values of the indicator function for modes 3 and 4 are listed in Table 2d, along with the means and standard deviations. Based on the indicator function values in Table 2d, the locations of damage are elements 1 and 8.

The severity of damage may now be estimated from the following equations $$F^*_{31}\alpha_1 + F^*_{48}\alpha_8 = Z_{d3} + Z_{damp3} + Z_{m3} + Z_{modes3}$$

$$F^*_{41}\alpha_1 + F^*_{48}\alpha_8 = Z_{d4} + Z_{damp4} + Z_{m4} + Z_{modes4}$$

From the third and fifth columns of Table 2c, $F^*_{31} = 0.004225$, $F^*_{38} = 0.2227$, $F^*_{41} = 0.0131159$, and $F^*_{48} = 0.0104906$. Table 2e lists the values for the sensitivities obtained by utilizing the given stiffnesses, masses, mode shapes, mode shape changes, eigenfrequencies and eigenfrequency changes presented in this example as applied to the definitions described in connection with Equation (5) discussed further hereinabove. Note that in this example $Z_{damp}=0$ and $\Delta[M]=0$.

The equations to be solved therefore reduce to $$0.004225\, \alpha_1 + 0.2227\, \alpha_8 = -0.1195$$

$$0.013116\, \alpha_1 + 0.0105\, \alpha_8 = -0.0118$$

On solving $\alpha_1 = -0.47$ and $\alpha_8 = -0.52$. Recall the inflicted levels of damage at both locations were $\alpha_1 = \alpha_8 = -0.5$. Consequently, an accurate detection of damage is obtained.

TABLE 2a

Pre-damage Mode Shapes

| Node | Mode 1 | Mode 2 | Mode 3 | Mode 4 | Mode 5 |
|---|---|---|---|---|---|
| 1 | .595491E + 00 | .842152E + 00 | .842152E + 00 | .842152E + 00 | .842152E + 00 |
| 2 | .595491E + 00 | .834947E + 00 | .813456E + 00 | .778047E + 00 | .729325E + 00 |
| 3 | .595491E + 00 | .813456E + 00 | .729325E + 00 | .595491E + 00 | .421076E + 00 |
| 4 | .595491E + 00 | .778047E + 00 | .595491E + 00 | .322278E + 00 | −.650562E − 09 |
| 5 | .595491E + 00 | .729325E + 00 | .421076E + 00 | −.128982E − 08 | −.421076E + 00 |
| 6 | .595491E + 00 | .668124E + 00 | .217965E + 00 | −.322278E + 00 | −.729325E + 00 |
| 7 | .595491E + 00 | .595491E + 00 | −.224510E − 09 | −.595491E + 00 | −.842152E + 00 |
| 8 | .595491E + 00 | .512670E + 00 | −.217965E + 00 | −.778047E + 00 | −.729325E + 00 |
| 9 | .595491E + 00 | .421076E + 00 | −.421076E + 00 | −.842152E + 00 | −.421076E + 00 |
| 10 | .595491E + 00 | .322278E + 00 | −.595491E + 00 | −.778047E + 00 | −.650561E − 09 |
| 11 | .595491E + 00 | .217965E + 00 | −.729325E + 00 | −.595491E + 00 | .421076E + 00 |
| 12 | .595491E + 00 | .109923E + 00 | −.813456E + 00 | −.322278E + 00 | .729325E + 00 |
| 13 | .595491E + 00 | −.581326E − 14 | −.842152E + 00 | .224427E − 15 | .842152E + 00 |
| 14 | .595491E + 00 | −.109923E + 00 | −.813456E + 00 | .322278E + 00 | .729325E + 00 |
| 15 | .595491E + 00 | −.217965E + 00 | −.729325E + 00 | .595491E + 00 | .421076E + 00 |
| 16 | .595491E + 00 | −.322278E + 00 | −.595491E + 00 | .778047E + 00 | −.650564E − 09 |
| 17 | .595491E + 00 | −.421076E + 00 | −.421076E + 00 | .842152E + 00 | −.421076E + 00 |
| 18 | .595491E + 00 | −.512670E + 00 | −.217965E + 00 | .778047E + 00 | −.729325E + 00 |
| 19 | .595491E + 00 | −.595491E + 00 | −.224502E − 09 | .595491E + 00 | −.842152E + 00 |
| 20 | .595491E + 00 | −.668124E + 00 | .217965E + 00 | .322278E + 00 | −.729325E + 00 |
| 21 | .595491E + 00 | −.729325E + 00 | .421076E + 00 | .128981E − 08 | −.421076E + 00 |
| 22 | .595491E + 00 | −.778047E + 00 | .595491E + 00 | −.322278E + 00 | −.650563E − 09 |
| 23 | .595491E + 00 | −.813456E + 00 | .729325E + 00 | −.595491E + 00 | .421076E + 00 |
| 24 | .595491E + 00 | −.834947E + 00 | .813456E + 00 | −.778047E + 00 | .729325E + 00 |
| 25 | .595491E + 00 | −.842152E + 00 | .842152E + 00 | −.842152E + 00 | .842152E + 00 |

TABLE 2b

Post-damage Mode Shapes

| Node | Mode 1 | Mode 2 | Mode 3 | Mode 4 | Mode 5 |
|---|---|---|---|---|---|
| 1 | .595491E + 00 | .869608E + 00 | .798332E + 00 | .864029E + 00 | .110925E + 01 |
| 2 | .595491E + 00 | .855572E + 00 | .747520E + 00 | .733294E + 00 | .827266E + 00 |
| 3 | .595491E + 00 | .834744E + 00 | .674536E + 00 | .556974E + 00 | .475971E + 00 |
| 4 | .595491E + 00 | .800442E + 00 | .558619E + 00 | .296379E + 00 | .367819E − 02 |
| 5 | .595491E + 00 | .753221E + 00 | .407148E + 00 | −.905975E − 02 | −.469550E + 00 |

TABLE 2b-continued

Post-damage Mode Shapes

| Node | Mode 1 | Mode 2 | Mode 3 | Mode 4 | Mode 5 |
|---|---|---|---|---|---|
| 6 | .595491E + 00 | .693841E + 00 | .229762E + 00 | −.313128E + 00 | −.823413E + 00 |
| 7 | .595491E + 00 | .623263E + 00 | .377531E − 01 | −.569818E + 00 | −.967953E + 00 |
| 8 | .595491E + 00 | .542624E + 00 | −.156659E + 00 | −.740290E + 00 | −.866427E + 00 |
| 9 | .595491E + 00 | .363829E + 00 | −.525542E + 00 | −.857210E + 00 | −.222862E + 00 |
| 10 | .595491E + 00 | .268560E + 00 | −.676533E + 00 | −.785968E + 00 | .155576E + 00 |
| 11 | .595491E + 00 | .168955E + 00 | −.784465E + 00 | −.595803E + 00 | .494463E + 00 |
| 12 | .595491E + 00 | .666232E − 01 | −.842468E + 00 | −.315488E + 00 | .707542E + 00 |
| 13 | .595491E + 00 | −.367840E − 01 | −.846849E + 00 | .125627E − 01 | .740947E + 00 |
| 14 | .595491E + 00 | −.139597E + 00 | −.797330E + 00 | .338712E + 00 | .585883E + 00 |
| 15 | .595491E + 00 | −.240158E + 00 | −.697063E + 00 | .613612E + 00 | .281880E + 00 |
| 16 | .595491E + 00 | −.336841E + 00 | −.552430E + 00 | .795668E + 00 | −.937803E − 01 |
| 17 | .595691E + 00 | −.428088E + 00 | −.372636E + 00 | .857333E + 00 | −.445600E + 00 |
| 18 | .595491E + 00 | −.512425E + 00 | −.169124E + 00 | .789277E + 00 | −.684143E + 00 |
| 19 | .595491E + 00 | −.588491E + 00 | .451522E − 01 | .601797E + 00 | −.748768E + 00 |
| 20 | .595491E + 00 | −.655058E + 00 | .256554E + 00 | .323260E + 00 | −.623046E + 00 |
| 21 | .595491E + 00 | −.711052E + 00 | .451628E + 00 | −.418770E − 02 | −.338938E + 00 |
| 22 | .595491E + 00 | −.755569E + 00 | .617956E + 00 | −.331002E + 00 | .313327E − 01 |
| 23 | .595491E + 00 | −.787890E + 00 | .744952E + 00 | −.607734E + 00 | .393638E + 00 |
| 24 | .595491E + 00 | −.807493E + 00 | .824534E + 00 | −.792510E + 00 | .655876E + 00 |
| 25 | .595491E + 00 | −.814063E + 00 | .851637E + 00 | −.857374E + 00 | .751381E + 00 |

TABLE 2c

Sensitivities for Modes 3 and 4
Contributions to Sensitivity Matrix

| | Mode 3 | | Mode 4 | |
|---|---|---|---|---|
| Member | Pre-damage | Post-Damage | Pre-damage | Post-Damage |
| 1 | .141976E − 02 | .422555E − 02 | .558227E − 02 | .131159E − 01 |
| 2 | .122039E − 01 | .871777E − 02 | .416667E − 01 | .511991E − 01 |
| 3 | .308825E − 01 | .219909E − 01 | .777511E − 01 | .925425E − 01 |
| 4 | .524508E − 01 | .375502E − 01 | .777511E − 01 | .929093E − 01 |
| 5 | .711294E − 01 | .514976E − 01 | .416667E − 01 | .519502E − 01 |
| 6 | .819136E − 01 | .603387E − 01 | .558227E − 02 | .866755E − 02 |
| 7 | .819136E − 01 | .618583E − 01 | .558227E − 02 | .427633E − 02 |
| 8 | .711294E − 01 | .222704E + 00 | .416667E − 01 | .104906E − 01 |
| 9 | .524508E − 01 | .373128E − 01 | .777511E − 01 | .594163E − 01 |
| 10 | .308825E − 01 | .190656E − 01 | .777511E − 01 | .476464E − 01 |
| 11 | .122039E − 01 | .550610E − 02 | .416667E − 01 | .188559E − 01 |
| 12 | .141976E − 02 | .314169E − 04 | .558227E − 02 | .459898E − 03 |
| 13 | .141976E − 02 | .401319E − 02 | .558227E − 02 | .997559E − 02 |
| 14 | .122039E − 01 | .164538E − 01 | .416667E − 01 | .383418E − 01 |
| 15 | .308825E − 01 | .342364E − 01 | .777511E − 01 | .585475E − 01 |
| 16 | .524508E − 01 | .529058E − 01 | .777511E − 01 | .513522E − 01 |
| 17 | .711294E − 01 | .677845E − 01 | .416667E − 01 | .236075E − 01 |
| 18 | .819136E − 01 | .751447E − 01 | .558227E − 02 | .173267E − 02 |
| 19 | .819136E − 01 | .731426E − 01 | .558227E − 02 | .655751E − 02 |
| 20 | .711294E − 01 | .622797E − 01 | .416667E − 01 | .334877E − 01 |
| 21 | .524508E − 01 | .452775E − 01 | .777511E − 01 | .568796E − 01 |
| 22 | .308825E − 01 | .263958E − 01 | .777511E − 01 | .544587E − 01 |
| 23 | .122039E − 01 | .103653E − 01 | .416667E − 01 | .285304E − 01 |
| 24 | .141976E − 02 | .120217E − 02 | .558227E − 02 | .378420E − 02 |

TABLE 2d

Indicator Function for Modes 3 and 4

| Location | Indicator Function $f^*_{ik}/f_{ik}$ | |
|---|---|---|
| | Mode 3 | Mode 4 |
| 1 | 2.976* | 4.134* |
| 2 | 0.714 | 0.9282 |
| 3 | 0.712 | 0.9045 |
| 4 | 0.716 | 0.8937 |
| 5 | 0.724 | 0.8851 |
| 6 | 0.737 | 0.8778 |
| 7 | 0.755 | 0.868 |
| 8 | 3.132* | 3.281* |
| 9 | 0.712 | 1.227 |
| 10 | 0.617 | 1.077 |
| 11 | 0.451 | 1.045 |
| 12 | 0.022 | 1.029 |
| 13 | 2.828 | 1.018 |
| 14 | 1.348 | 1.007 |
| 15 | 1.109 | 1.988 |
| 16 | 1.009 | 0.917 |
| 17 | 0.952 | 1.119 |
| 18 | 0.916 | 1.047 |
| 19 | 0.893 | 1.033 |
| 20 | 0.876 | 1.026 |
| 21 | 0.864 | 1.023 |
| 22 | 0.854 | 1.014 |
| 23 | 0.844 | 1.019 |
| 24 | 0.847 | 1.012 |
| Mean ($\mu$) | 1.067 | 1.223 |
| Standard Deviation ($\sigma$) | 0.76 | .763 |
| $\mu + 2\sigma$ | 2.587 | 2.782 |

*Damage Location

TABLE 2e

| Mode Num. | Modal Sensitivities | | | Left Hand Side of Equation (5) |
|---|---|---|---|---|
| | $Z_d$ | $Z_m$ | $Z_{modes}$ | |
| 3 | −0.0660 | +0.0058 | −0.0593 | −0.1195 |
| 4 | −0.0061 | 0.0010 | −0.0068 | −0.0119 |

Figure 9A:
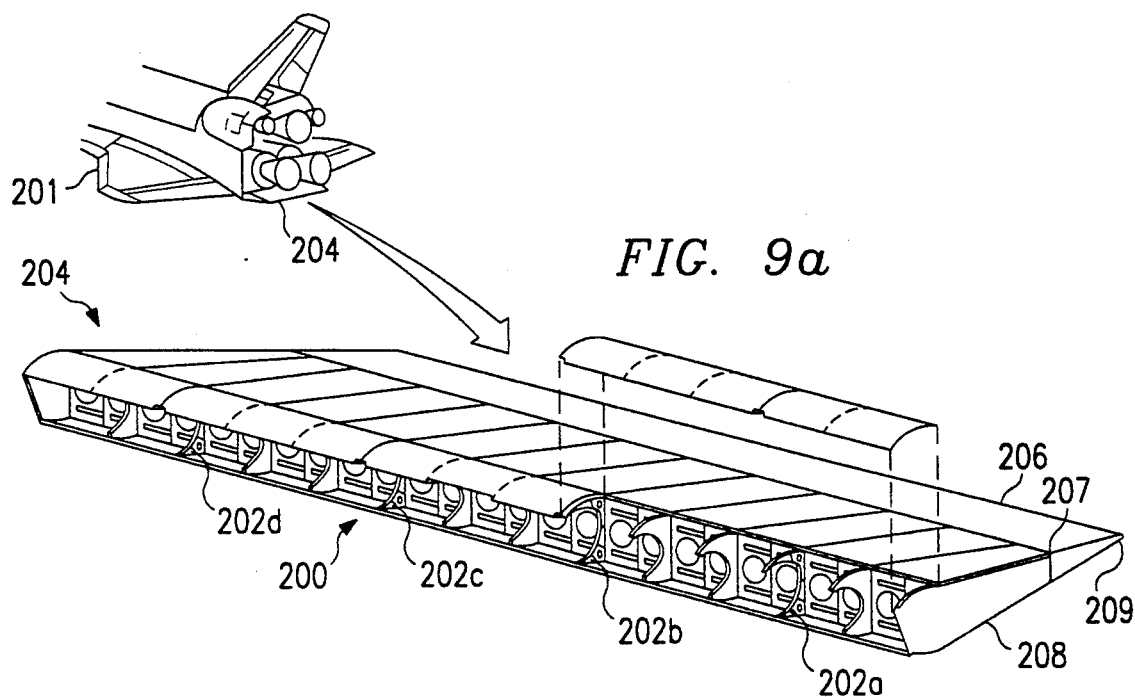
FIGS. 9a-i is an isometric view of a space shuttle body flap and diagrams of exaggerated mode shapes of the body flap.

With reference to FIG. 9a, in one experiment, the damage detection approach utilizing Equation (5) was tested to locate damage in body flap 204 of the ¼ scale model of the space shuttle orbiter 201 located at the Vibration and Acoustic Test Facility of the United States National Aeronautics and Space Administration ("NASA") Johnson Space Center ("JSC"). During modal testing, a fault simulation was introduced into the Orbiter Body Flap/Fuselage interface 200 shown in FIG. 9a. In lieu of damaging the Orbiter model, which would have resulted in a stiffness decrease, a part was added resulting in a small increase in stiffness at the port outboard rotary actuator 202a. A complete set of 51 frequency response functions were measured prior to adding the part and a complete set was also acquired subsequent to the structural modification. Two modal models were then constructed based on the measured frequency response function data sets.

The approach utilizing Equation (5) correctly established that a stiffness change had occurred, and the locale of the fault simulation was also correctly identified. In addition, the approach identified two other local areas on the quarter scale body flap 204 structure exhibiting unexpected anomalous conditions.

One of these areas was evident by the observation of unusual shear deformation across the trailing edge 206 wedge assembly interface 207 with the forward box assembly 208. The shear deformation was evident in both modal models (pre and post fault) mode shape illustrations. The second location identified as a suspected problem area was at the port outboard trailing edge corner 209.

Figure 9B:
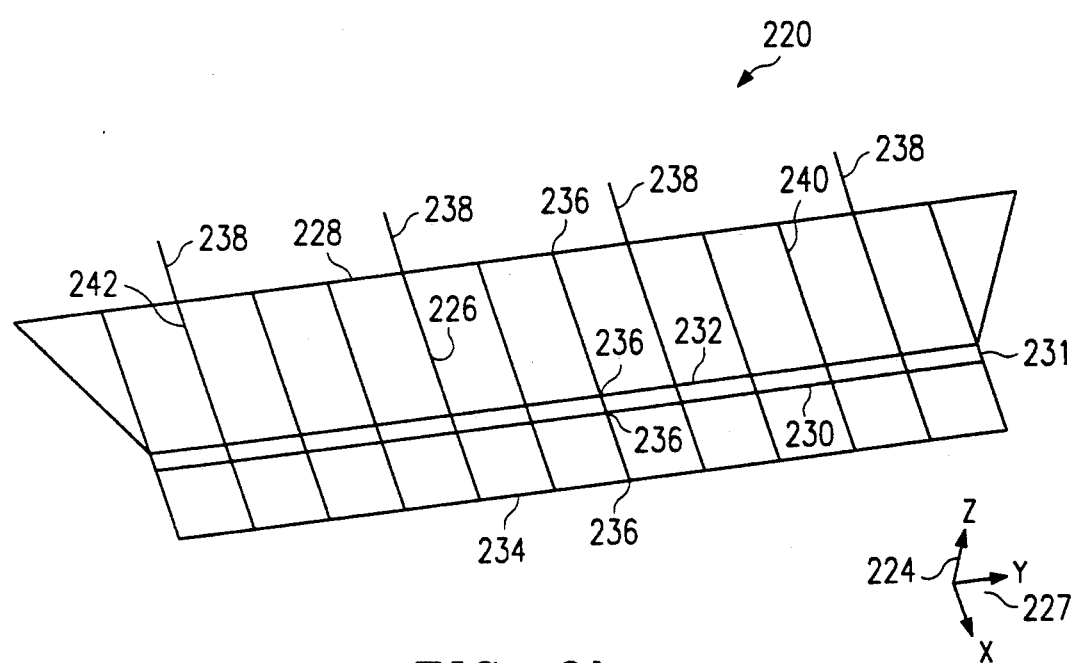
Figure 9C:
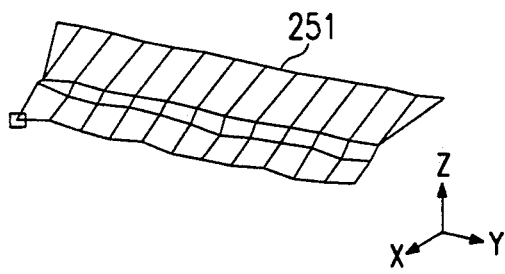
Figure 9F:
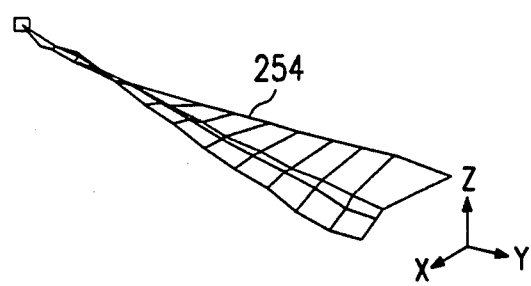
Figure 9D:
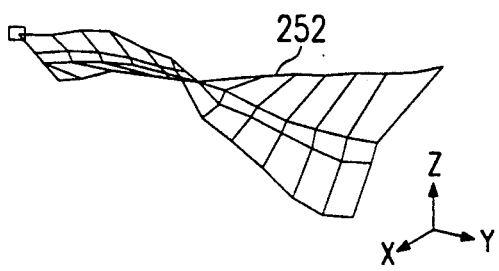
Figure 9G:
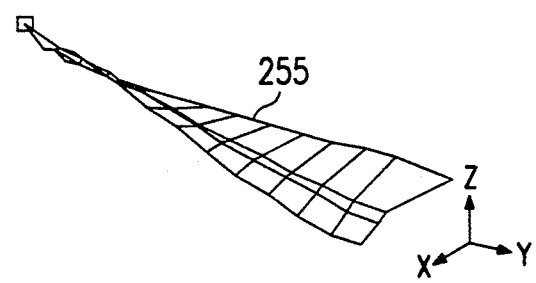
Figure 9E:
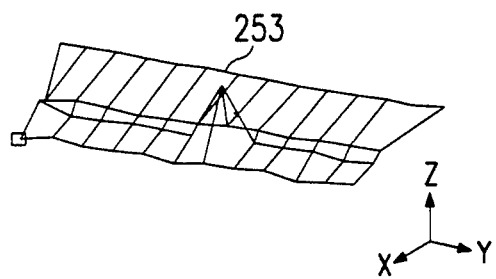
Figure 9H:
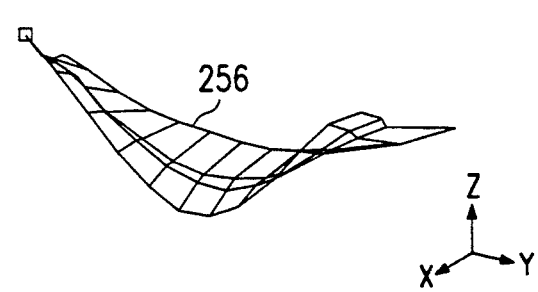

A Network diagram 220 of the body flap 204 (FIG. 9a) reflecting the model used for the modal analysis is shown in FIG. 9b. Fifty-one response acceleration measurements were located on the under side of the body flap skin at each point necessary to define network diagram 220, sensing motion normal to the skin along the z-axis 224. In general, all measurements were made in the x-y plane 227 formed by the intersection of each rib, such as rib 226, and the forward spar 228, immediately aft 230 and immediately forward 232 of the trailing edge wedge/forward box assembly joint 231 and just forward of the trailing edge 234—four measurements 236 across the chord of the body flap in the plane of each body flap actuator 238 (202 in FIG. 9a) and stability rib, such as rib 240.

Frequency response functions were obtained using burst random excitation forces input simultaneously at two locations. The two forces were applied at the port and starboard wing aft spar in a vertical direction at position between each pair of inboard and outboard elevons.

The data acquisition conditions used provided response functions having 1638 frequency lines covering a frequency range of 0 to 312 Hz. The measurement and excitation locations used during the quarter scale tests correspond exactly with planned Shuttle Modal Inspection System locations for full scale Orbiter tests.

Damage to the flap fuselage interface was simulated by attaching a 5.25×1.0×0.062 inch aluminum segment to the underside of the model using a double sided adhesive tape to make the attachment. The part was located so as to bridge between the flap and fuselage stub skins and was centered on the port outboard actuator. In FIG. 9a, four actuators 202a-d bridge the body flap 204 and fuselage 201 and in this arrangement the space between the body flap 204 and the fuselage 20 resulted in the part being unsupported over a length of 2½ inches. This arrangement resulted in a negligible addition of shear stiffness ($Z_o$ direction) and a small increase in stiffness in the fore aft direction at the port outboard body flap actuator Y station 242 (FIG. 9b).

A set of undamaged modes 251 (31.6 Hz), 252 (173.73 Hz), 253 (32.9 Hz), 254 (62.3 Hz), 255 (64.0 Hz), and 256 (119.1 Hz) is shown in FIGS. 9c-h, respectively, generally indicating maximum displacements at various points along body flap 204 in an exaggerated manner approximately three orders of magnitude greater than actual maximum displacements. The following information was used in the analysis: the modal parameters (mode shapes, damped frequency, and modal damping) for the six (6) undamaged modes 251-256 and the same set of parameters for the corresponding damaged modes.

Figure 9I:
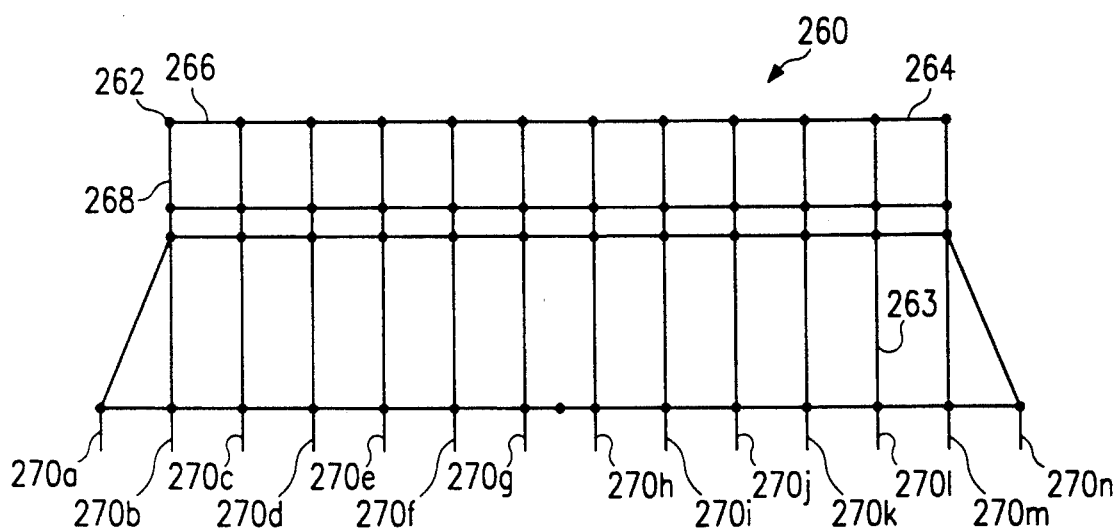

The mechanical model 260 used to represent the body flap 204 is shown in FIG. 9i. The model consists of 51 moveable nodes such as node 262 and 84 elements such as element 264. Each node is constrained to one degree of freedom corresponding to the displacement along the z-axis of FIG. 9b. Each element was modelled as a spring with element stiffness matrix given by $$K_i = \left(\frac{3EI}{L^3}\right)_i \begin{bmatrix} 1 & -1 \\ -1 & 1 \end{bmatrix}$$

where EI is the rigidity of the member and L is the length of the member. The second moment of area I was estimated from the approximate dimensions of the ribs, such as rib 226, and spar webs 228 of FIG. 9b. The material was assumed to be aluminum. The length of the element was obtained directly from the model. Masses were concentrated at the nodes. In FIG. 9i, mass magnitudes were obtained from the contribution of the appropriate tributary area, as for example the tributary area defined by elements 266 and 268 corresponding to node 262. A series of springs at members 270a–n were added to represent the attachment of the body flap 204 to the aft fuselage 201 (FIG. 9a). Since only six modes were provided and damage could occur in anyone of 84 elements, the indicator function approach was used. The indicator function used in this example was of the form:

$$I_j = f(F_{ij}, \Delta F_{ij})$$

where letters i and j refer to the mode and location, respectively, g is the function of interest, $\Delta f_{ij}$ is the change in the i,j$^{th}$ component of the sensitivity matrix due to the change in mode shape, and $I_i(j)$ is the value of the indicator function for the ith mode as a function of location.

Figure 10A:
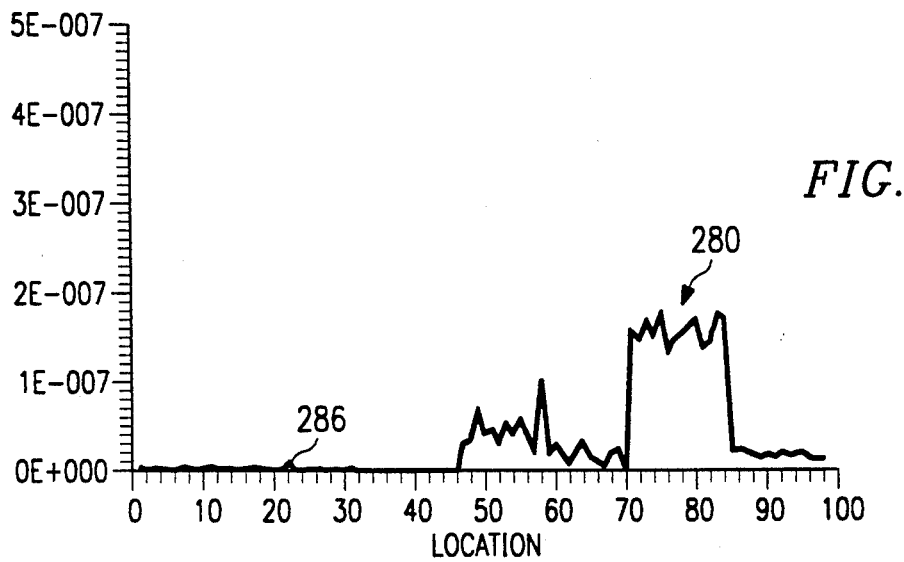
Figure 10B:
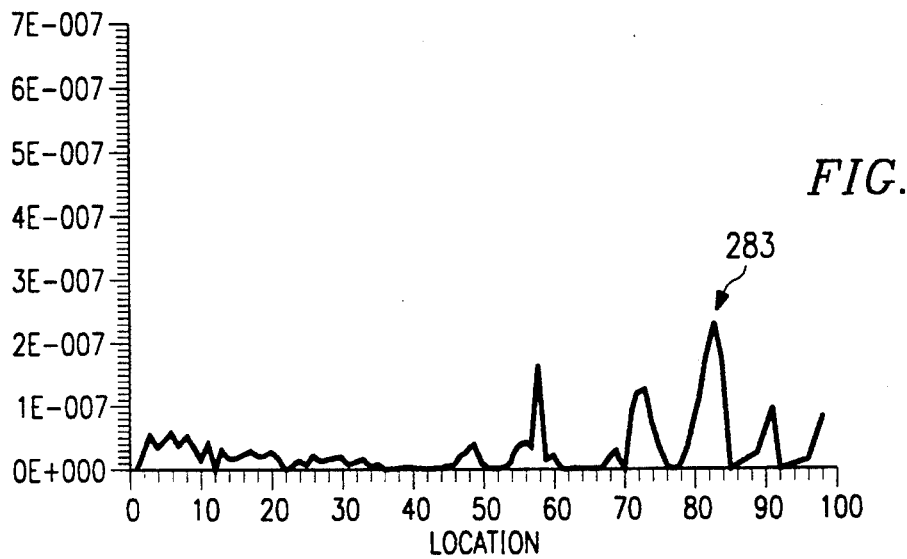
Figure 10C:
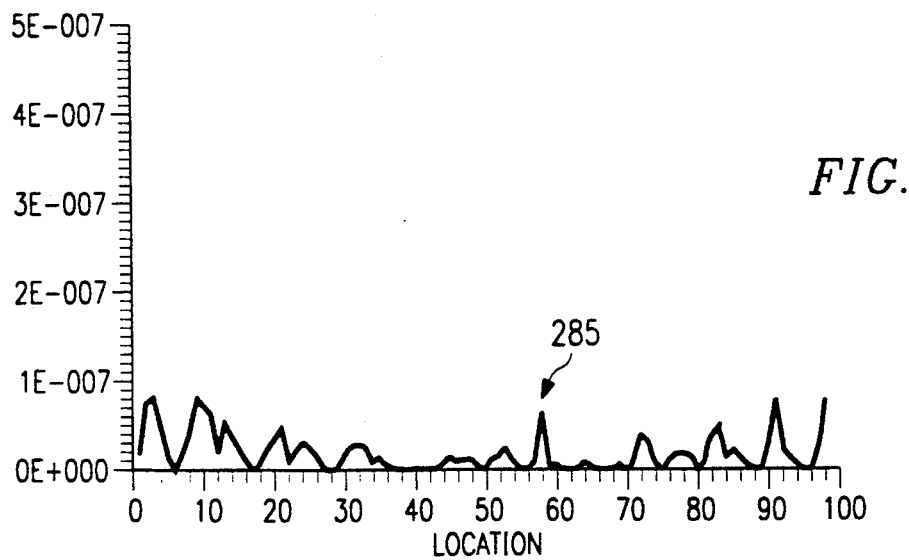
Figure 10E:
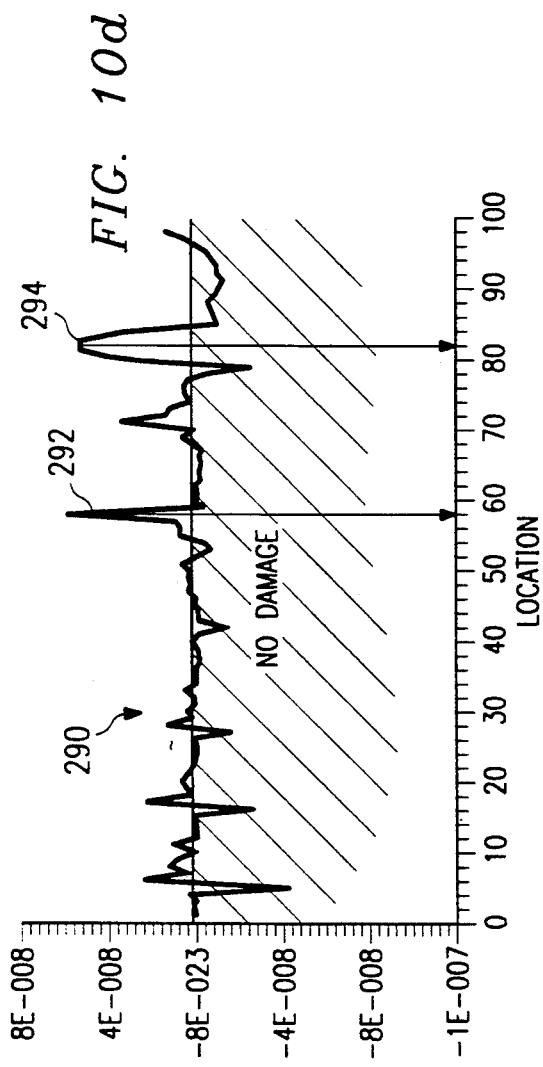
Figure 10E:
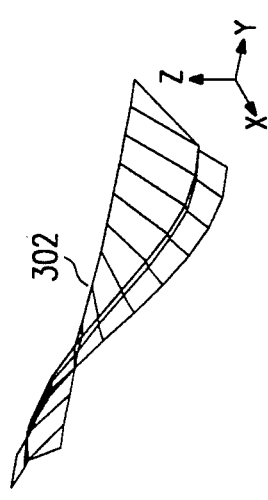
Figure 10F:
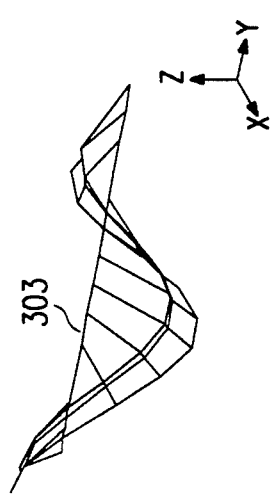
Figure 10G:
Figure 10H:
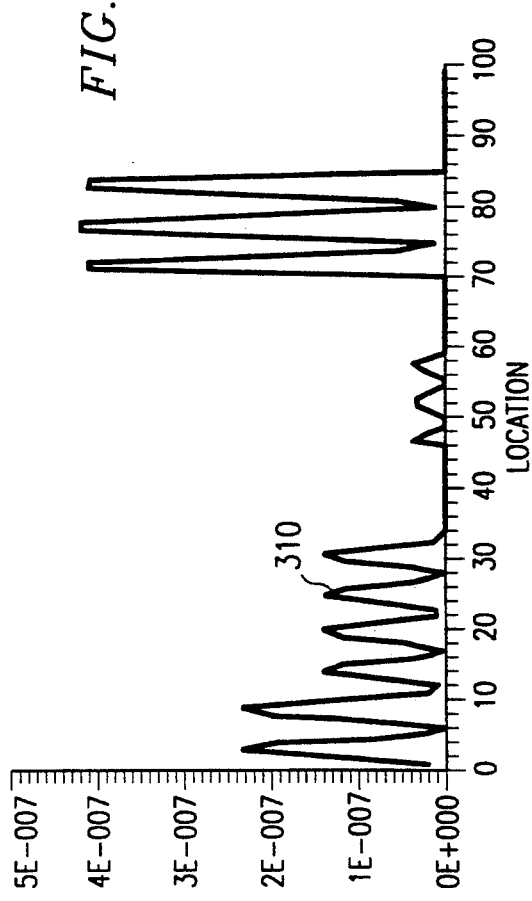
Figure 10I:
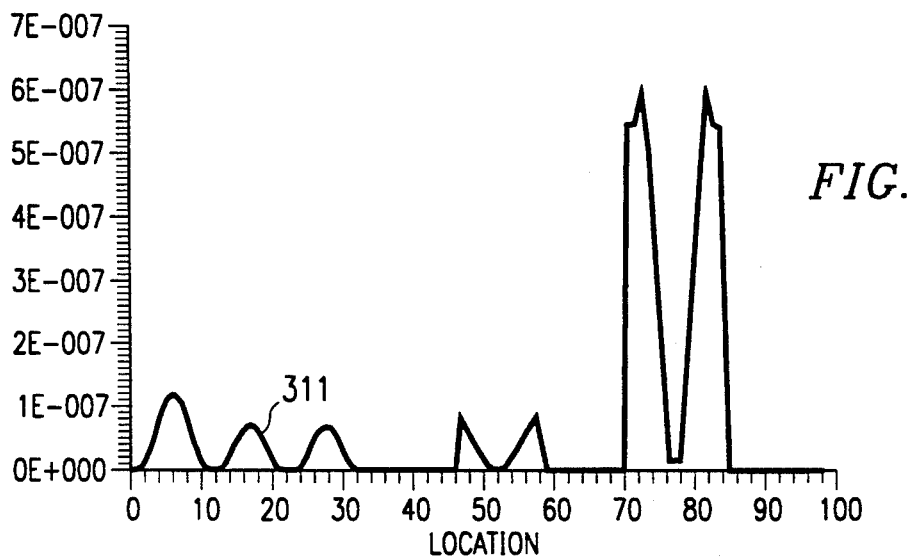
Figure 10J:
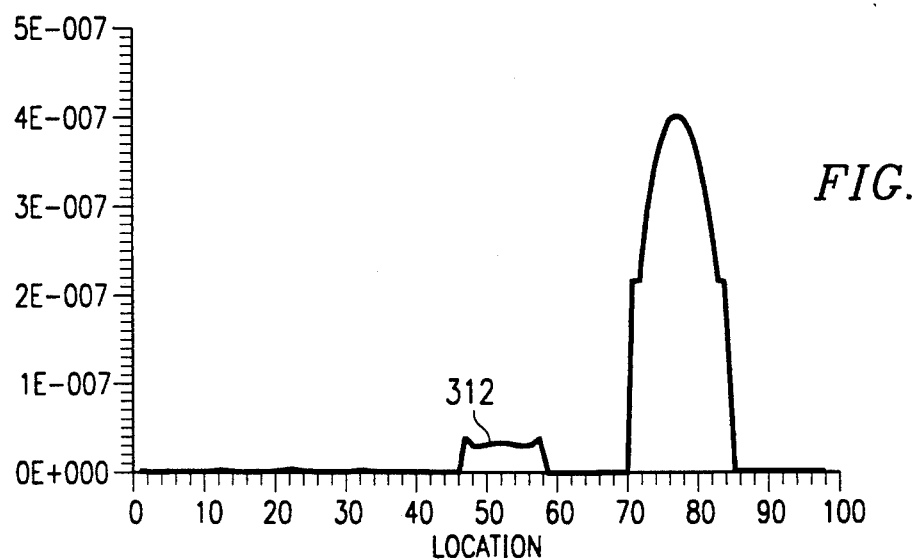
Figure 11:
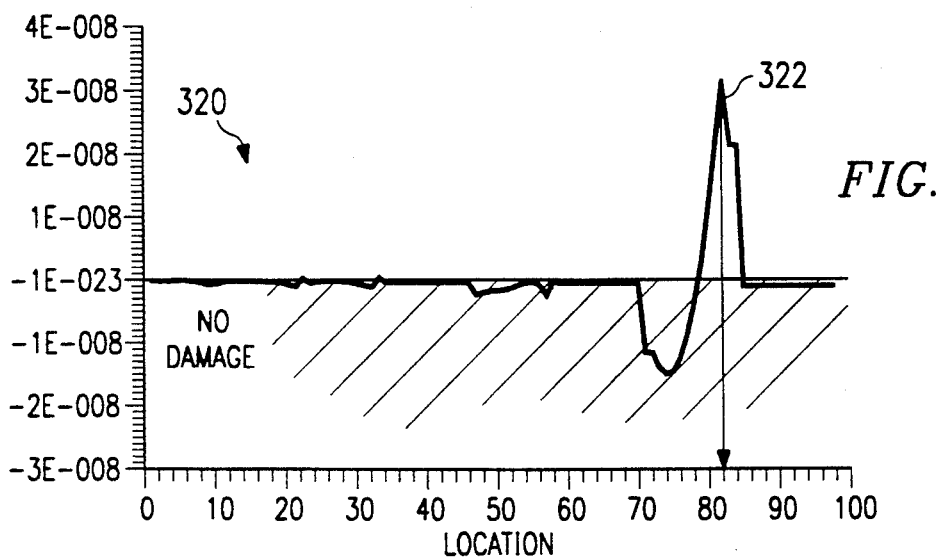
FIG. 11 is a plot of an indicator function for the space shuttle body flap.

Using the stiffness matrix defined above and the experimentally determined mode shapes, sensitivity matrices $F_o$ and $\Delta F$ were obtained. Typical sensitivities for modes 1 (280), 3 (283), and 5 (285) are shown in FIGS. 10a–c, respectively. Components such as component 286 (FIG. 10a) of the sensitivity matrices were substituted into the indicator function, and indicator functions were computed for all six modes. All six indicator functions were then averaged to give the best estimate of the modified location as shown in plot 290 of FIG. 10d. Note from FIG. 10d that two distinct peaks occur at locations 58 (292) and 82 (294), with the former location 292 being more pronounced.

To confirm the reliability of the indicator function approach, pre-damage and post-damage mode shape vectors and eigenfrequencies were generated for the numerical model 260 (FIG. 9i). Damage was simulated in the numerical model by reducing the stiffness of member location 82 (263 in FIG. 9i) by twenty percent. In the analysis, the first three theoretical modes 301 (8.8 Hz), 302 (11.7 Hz), 303 (16.39 Hz) in FIGS. 10e–g, respectively, identified with experimental modes 1 (251, FIG. 9c), 3 (254, FIG. 9f), and 5 (256, FIG. 9h). The corresponding sensitivities 310 (mode 3), 3 (mode 2), 312 (mode 1) for the theoretical modes are given in FIGS. 10h–j, respectively. A plot 320 of the indicator function, using the first theoretical mode 301 FIG. 10e, for this damage scenario is provided in FIG. 11. Clearly, location 82 (322 in FIG. 11) is the only damaged location. Thus, if the mode shapes are correct, the indicator function approach is reliable.

On the basis of the foregoing analysis, note that:

(1) The structure was modified at the location aligned with the "port outboard actuator" 202a (FIG. 9a). Referring to FIG. 9a, this location corresponds to member 82 (263) in FIG. 9i. Thus the damage detection approach correctly establishes that a stiffness change has occurred and that the location of the modification is correctly identified by location 294 of FIG. 10d.

(2) An analysis of the indicator function suggested that location 58 (292 in FIG. 10d), the port outboard trailing edge 209 (FIG. 9a), might also be a potential damage location or that the one or more sensors in the vicinity might have malfunctioned. A detailed inspection disclosed that the port outboard trailing edge corner skin 209 (FIG. 9a) was indeed debonded from the core material and was relatively flexible over a small area approximately one inch square.

Figure 12A:
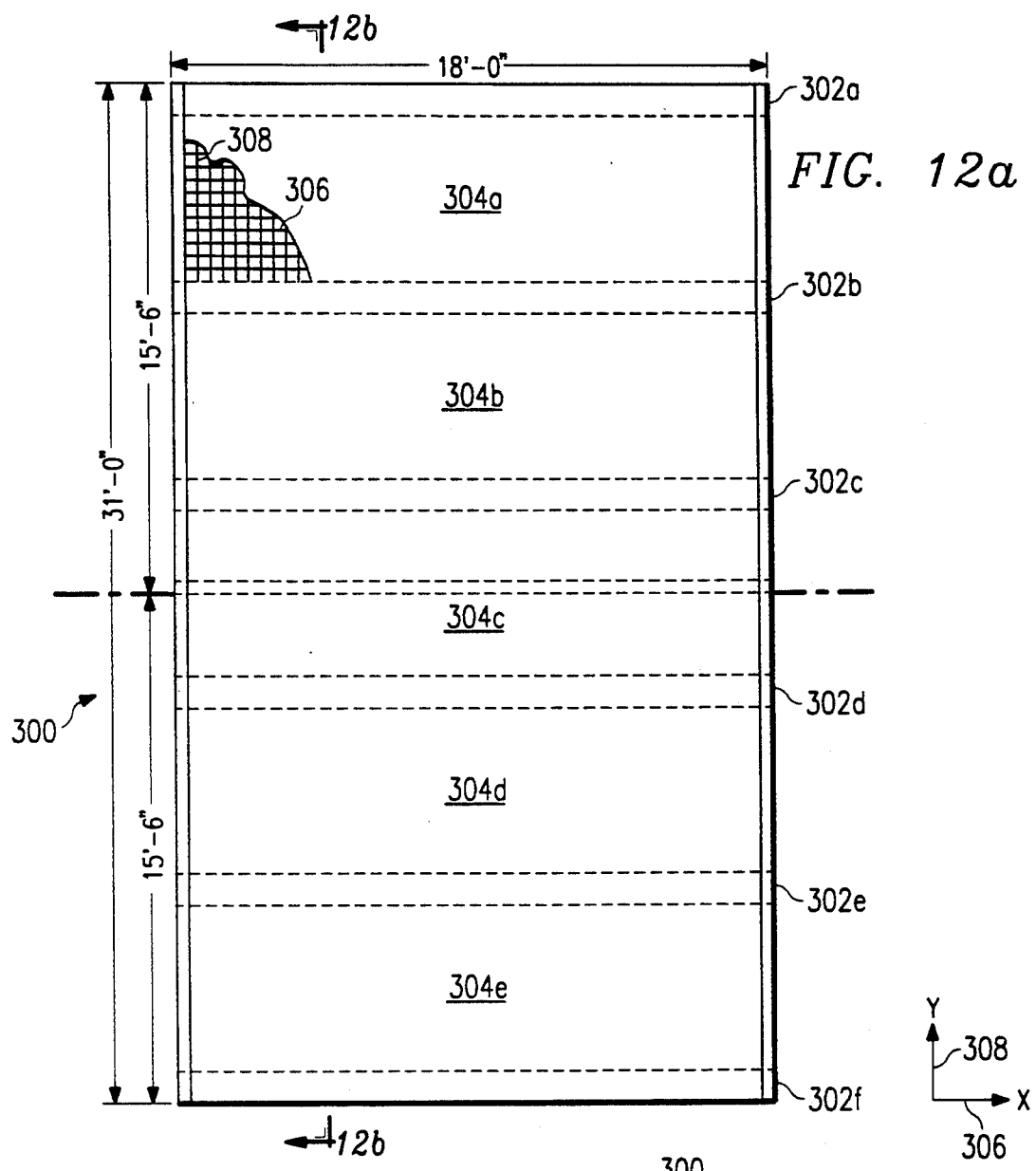
FIGS. 12a-b are schematic plan and elevational views of a concrete pier deck.
Figure 12B:
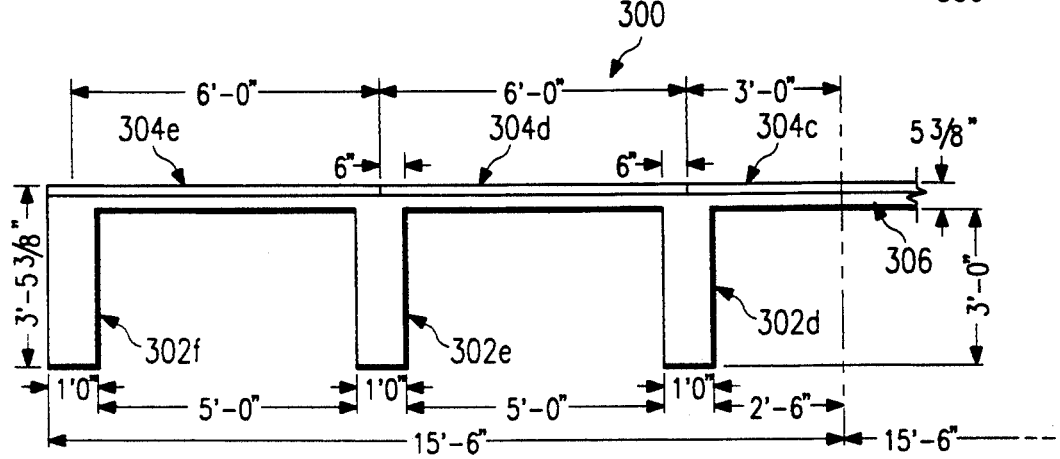

With reference to FIGS. 12a–b, in another example, the modal response was measured in a ¼ scale reinforced concrete pier deck model prior to damage. The structure was damaged and the modal response measured again. The procedure was repeated for two parts of the structure. Based upon the experimental modal responses of the structure and a structural drawing of the structure in question, the location and severity of the damage was determined.

Figure 13A:
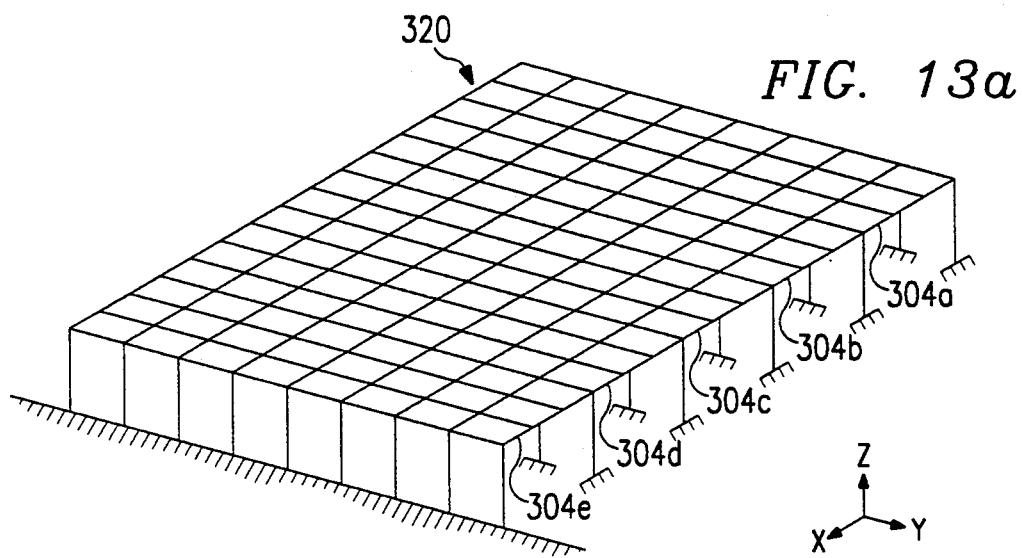
FIGS. 13a-e are diagrams of models of the concrete pier deck.
Figure 13B:
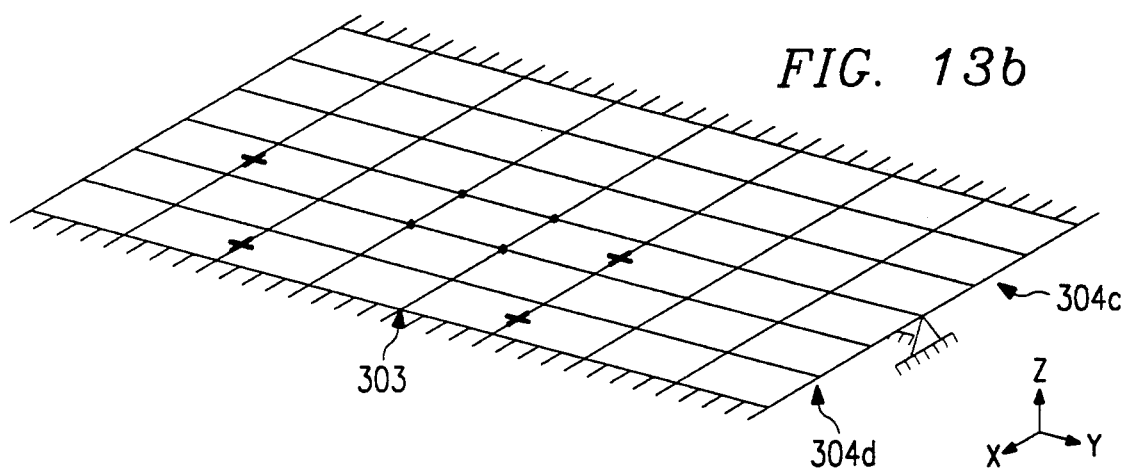
Figure 13C:
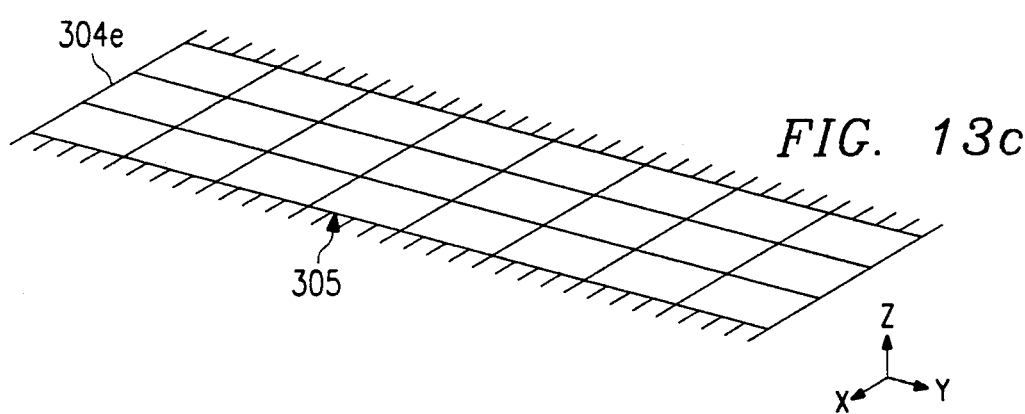

A schematic of the structure is shown in FIGS. 12a and 12b. The structure comprises a 5⅜" thick, 31×18 square foot area, slab 300 supported by six equally spaced supports 302a–f. The supports 302a–f and slab 300 form a monolithic system. Each of the five deck spans 304a–e are reinforced along the x-direction 306. Steel for temperature control is placed along the y-direction 308. Three finite element models for the structure were used: (a) a space frame model 320 of the structure as shown in FIG. 13a, (b) a grid model 303 of Spans 304c–d as shown in FIG. 13b, and (c) a grid model 305 of Span 304e as shown in FIG. 13c.

The geometry of the grid and frame elements were obtained directly from the bridge dimensions and the tributary regions of the grids. The material properties modeled in the Finite Element Model ("FEM") analysis were obtained as follows: (a) the mass density was based on concrete with a density of 150 lb ft$^{-3}$, (b) the modulus was obtained from the formula $E_c = 57,000\sqrt{f'_c}$, where $f'_c = 3,000$ psi, and (c) the shear modulus E was obtained using the relation $E/G = 2(1+v)$ where Poisson's ratio $v$ is $v = 0.2$.

The general characteristics of the three models are summarized in Table 3. An eigenanalysis was performed on each structure to provide the eigenfrequencies and mode shapes.

Experimental data for this example were collected in two sets, hereinafter referred to as Data Set A and Data Set B.

Figure 13D:
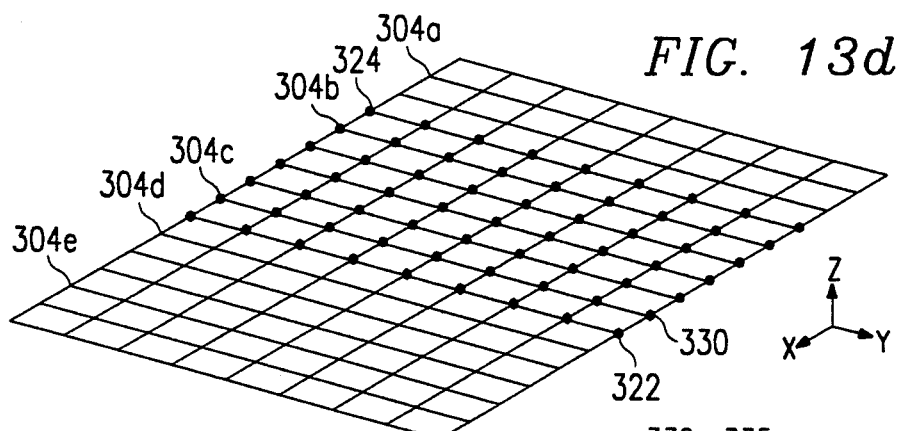

The experimental arrangement used to collect Data Set A is shown in FIG. 13d. The accelerometer was placed at Node 330 and the excitation hammer was moved from Node 322 to Node 324. Data corresponding to three damage states were taken. These states are summarized in Table 4a. The three sets of data (PIER2, PIER3, PIER4) were compiled in the form of Frequency Response Functions (Acceleration/Force vs. Frequency) to be used as input for a modal analysis software package described in STAR Reference Manual available from Structural Measurement Systems ("SMS"), 510 Cottonwood Drive, Milpitas, Calif. 95035, which is hereby incorporated by reference herein, to determine experimental mode shapes and experimental frequencies.

Figure 13E:
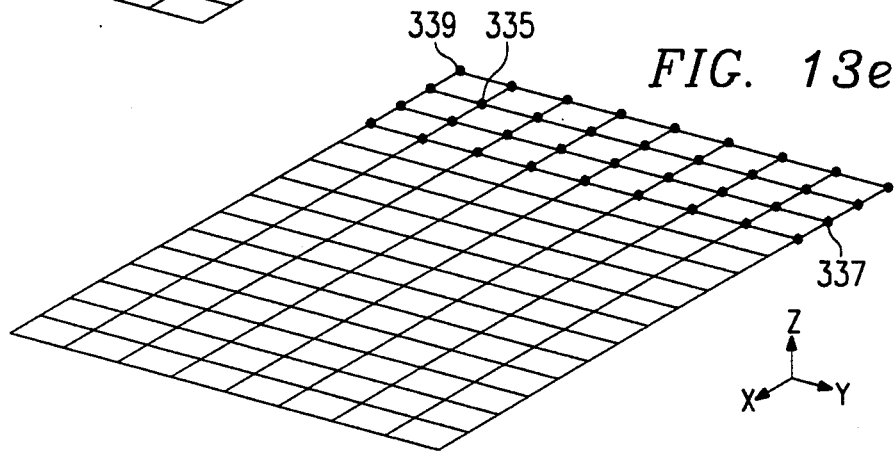

The experimental arrangement used to collect Data Set B is shown in FIG. 13e. The accelerometer was placed at location 335 and a twelve-pound impact hammer moved from Node 337 to Node 339. Again experimental data corresponding to three damage states were collected. These states are summarized in Table 4b. The data (PIER8, PIER9, PIER10, and PIER11) were compiled in the form of Frequency Response Functions.

The following steps were then performed:

(a) identifying the resonant frequencies of the structure;
(b) extracting the mode shapes associated with each frequency; and
(c) correlating the mode shapes for each data set.

Figure 14A:
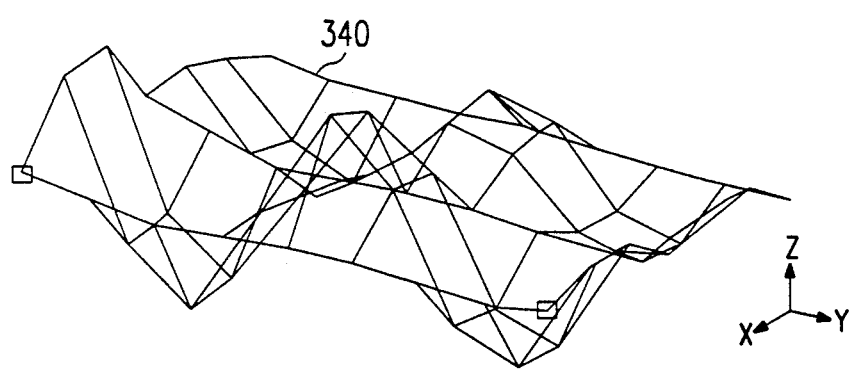
FIGS. 14a-c are diagrams of exaggerated mode shapes of the concrete pier deck.
Figure 14B:
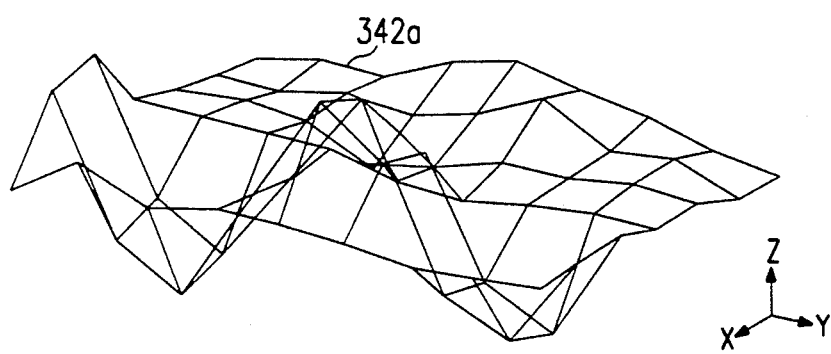
Figure 14C:
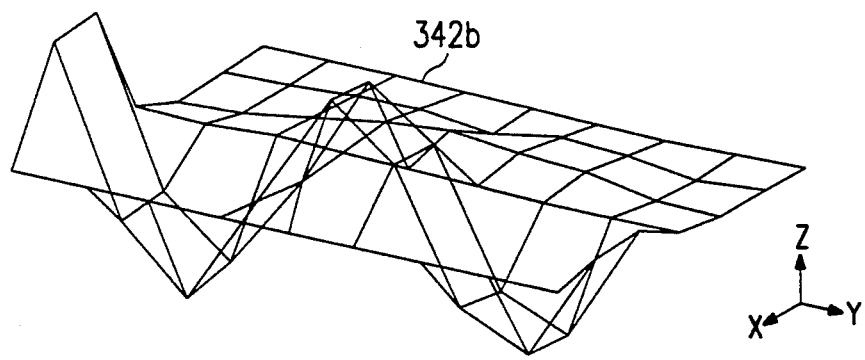
Figure 15:
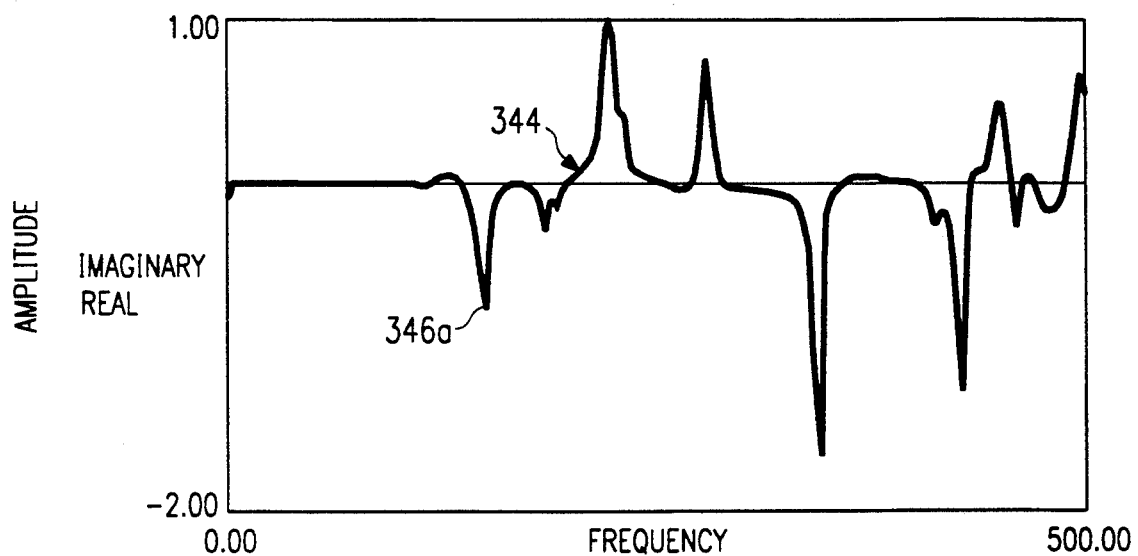
FIG. 15 is a frequency response curve of concrete pier deck.
Figure 15:
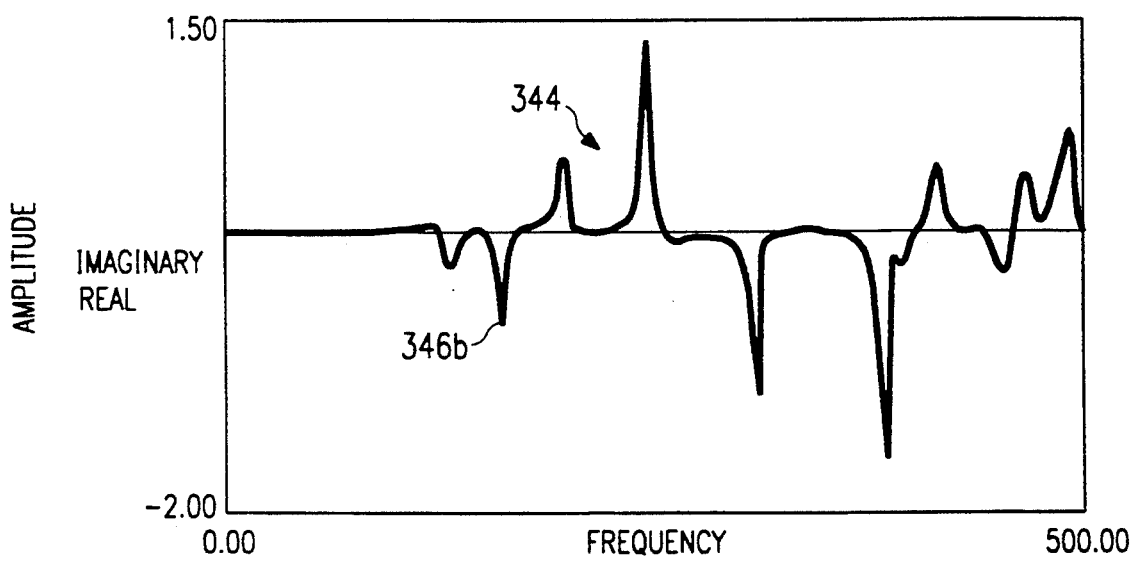

Steps (a) and (b) were accomplished routinely using an "Identify Modes" portion of the SMS Modal software package. Step (c) was achieved through a combination of visually inspecting the mode shapes at the various levels of damage, on the basis of a Modal Assurance Criteria for the modes, and on the basis of an analysis of the before and after shape of the same frequency response curve. For example, FIG. 14a illustrates a bending mode 340 (232.76 Hz) before damage. Mode shapes are generally illustrated in a manner exaggerated approximately three orders of magnitude. FIG. 14b illustrates a bending mode 342a (228.42 Hz) after moderate damage, and FIG. 14c also illustrates a bending mode 342b (224.55 Hz) after severe damage. FIG. 15 illustrates the use of the frequency response curve 344 for monitoring the mode before damage 346a and after damage 346b. The undamaged frequencies and their damaged counterparts are summarized in Table 5 and Table 6.

Joint coordinates, member connectivity, boundary conditions, and member properties were determined and input using a STRUDL software package, described in STRUDL User Manual, available from McDonnell Douglas Automation Co., P.O. Box 516, St. Louis, Mo. 63166, which is hereby incorporated by reference herein. The STRUDL software package was used to generate the stiffness and mass matrices, to perform the eigenanalysis, and to compute modal stiffnesses and modal masses. Information concerning the generation of a connectivity matrix may be found in Spillers, W. R., *Automated Structural Analysis*, Pergamon Press, Inc., New York, 1972, which is hereby incorporated by reference herein. After an FEM model of the structure was formed and the dynamic analysis completed, the elements of the sensitivity matrix were formed. In the pier deck example, the sensitivity matrix is associated with the model of the structure and not the structure itself.

Figure 16A:
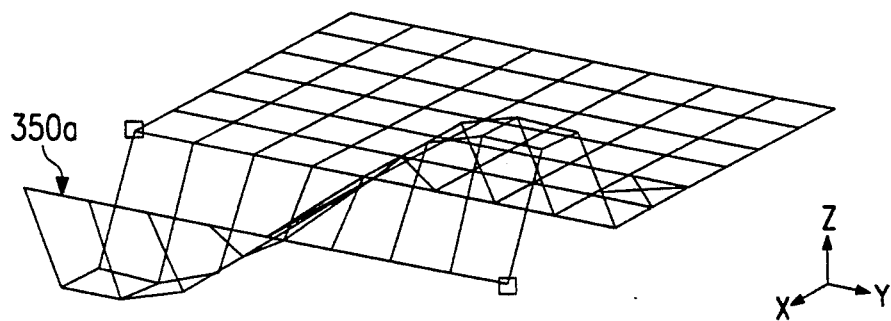
FIGS. 16a-l exaggerated diagrams of mode shapes of the concrete pier deck.
Figure 16B:
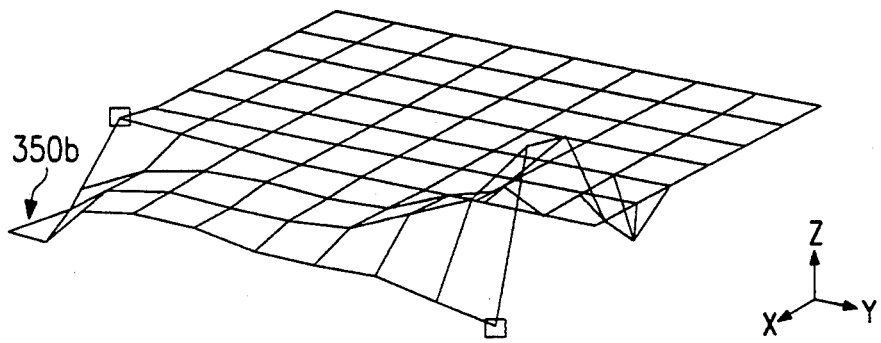
Figure 16C:
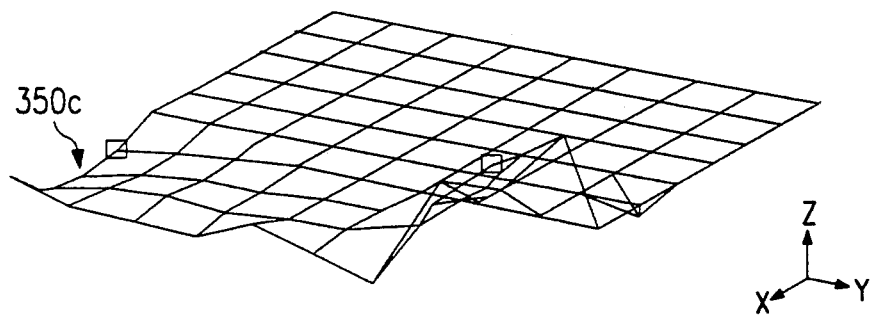

The experimentally determined modes were then related to the theoretically computed modes of an idealized model of the structure. The modal assignment may be achieved in one of three ways (or a combination thereof):

(a) On the basis of a visual comparison of the animated mode shapes 350a (113.79 HZ, STRUDL theoretical analysis), 350b (99.91 Hz, actual before damage) and 350c (98.15 Hz, actual after damage) of FIGS. 16a-c, respectively;
(b) On the basis of a modal assurance criterion between experimental and theoretical mode shapes; and
(c) On the basis of the closeness of the match between the wavelength and phase, respectively, of the two groups of mode shapes 350a-350c.

Figure 16D:
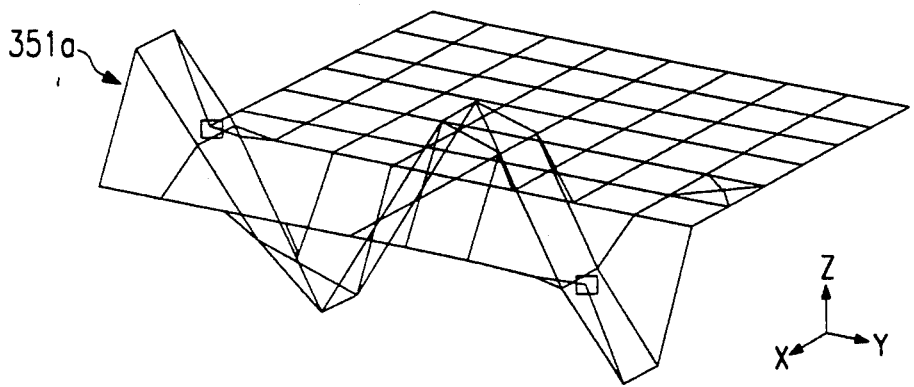
Figure 16E:
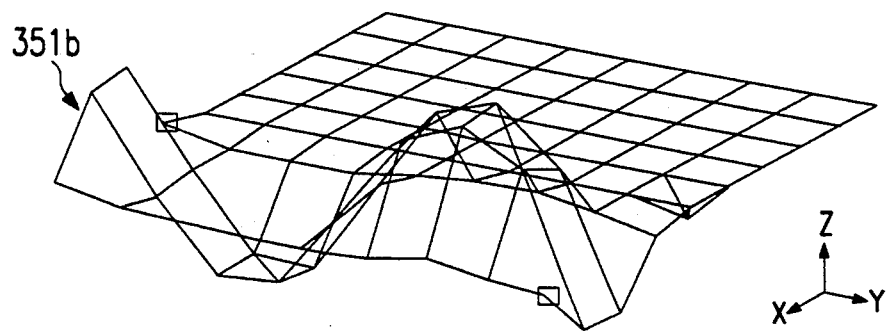
Figure 16F:
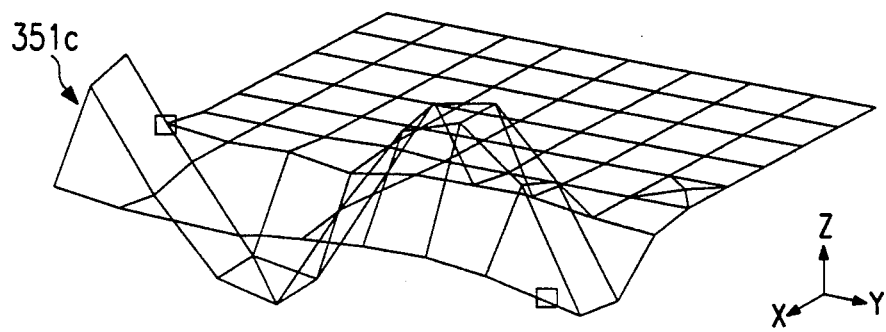
Figure 16G:
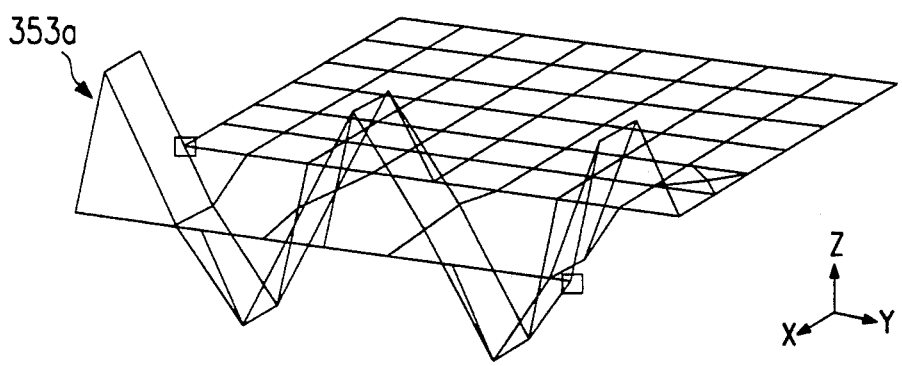
Figure 16H:
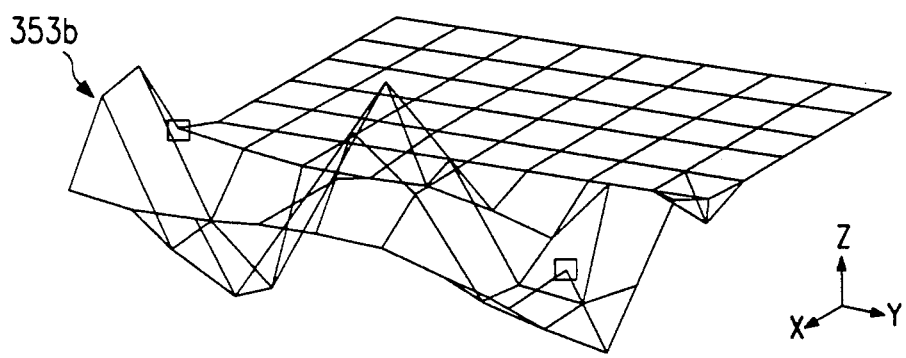
Figure 16I:
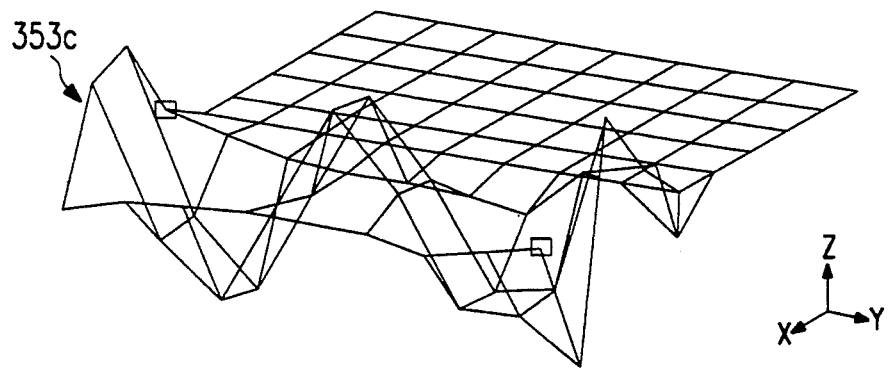
Figure 16J:
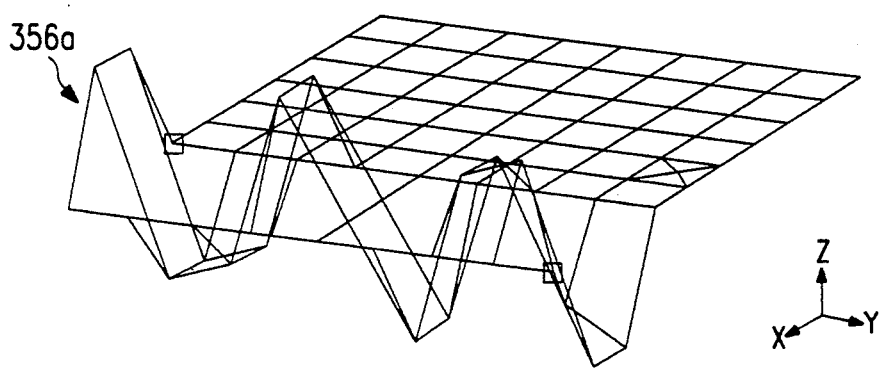
Figure 16K:
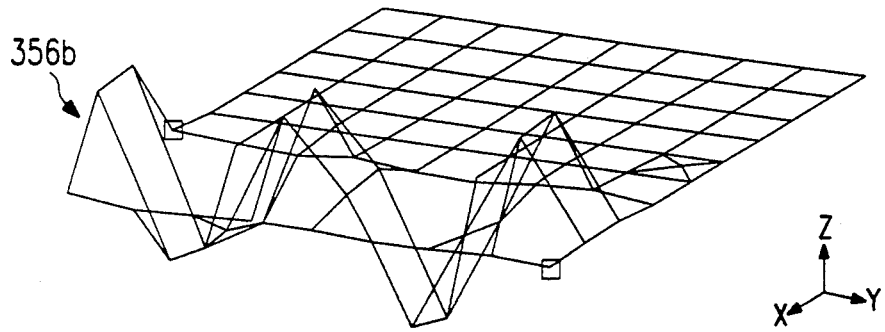
Figure 16L:
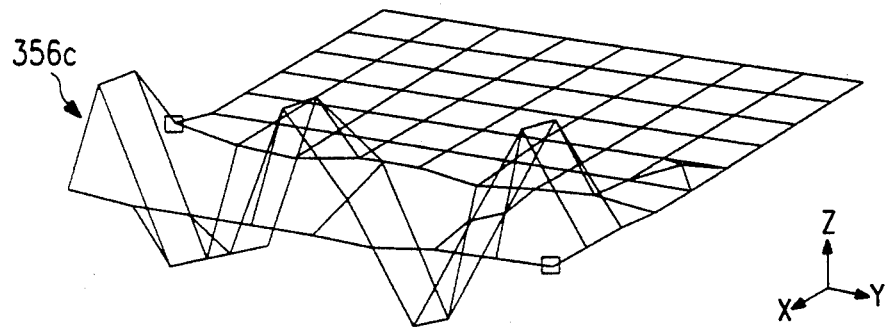

Typical results of the modal assignment are summarized in Tables 7-8 and in FIGS. 16a-l. FIGS. 16d-f respectively illustrate mode shapes 351a (170 Hz, STRUDL theoretical analysis), 351b (174.49 Hz, actual before damage), and 351c (165.9 Hz, actual after damage). FIGS. 16g-i respectively illustrate mode shapes 353a (203.29 Hz, STRUDL theoretical analysis), 353b (211.42 Hz, actual before damage) and 353c (198.87 Hz, actual after damage). FIGS. 16j-l respectively illustrate mode shapes 356a (240.58 Hz, STRUDL theoretical analysis), 356b (259.74 Hz, actual before damage), and 356c (250.51 Hz, actual after damage). The modal assurance criteria and identification of experimental modes were performed using the CORV/DCORV software package (p. 259), 1989, available from IMSL STAT/LIBRARY, 2500 Citywest Blvd., Houston, Tex. 77042, which is hereby incorporated by reference herein.

Tables 7 and 8 provide guidance in selecting the FEM model for the damage detection. Note that if the finite element model of the entire bridge is used, several modes with different frequencies but with the same mode shape in the region of measurement may be identified. This phenomenon is exemplified by the first mode in the $5^{th}$ span. For experimental frequency "a", in Data Set B (Table 8), there corresponds at least 5 modes with the same shape (and with frequencies within 5 HZ) in the region.

Figure 17A:
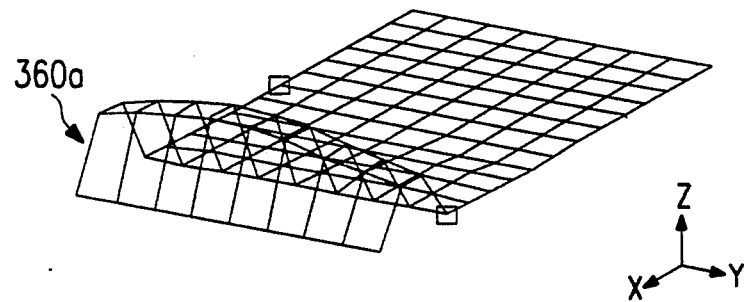
FIGS. 17a-c are diagrams of a localization phenomenon for the concrete pier deck.
Figure 17B:
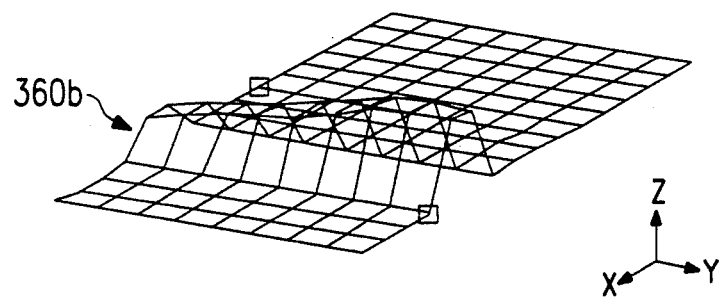
Figure 17C:
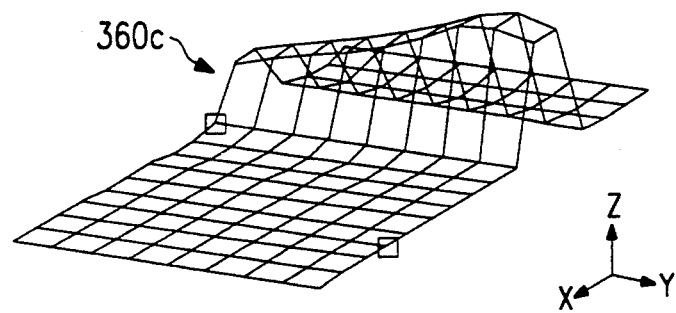

Also, not only is the structure symmetric about the x and y coordinate axes fixed at the center of the deck, the structure also exhibits translational symmetry along the x-axis. In other words, the structure is periodic in the x-direction. The geometric and material properties repeat themselves for each span. Structures with such characteristics often exhibit the phenomenon of mode localization. That is, the deformational energy of the vibrational modes are often trapped in a single cell of the structure. Furthermore, the frequency of the vibration for energy trapped in different cells is approximately the same. A further analysis of the pier presented in this study confirmed the existence of this phenomenon. FIGS. 17a-c respectively illustrate the localization phenomenon 360a (90.01 Hz, mode 1), 360b (90.13 Hz, mode 2), and 360c (93.53 Hz, mode 5) for the pier for the first five modes.

The full pier model was not used to detect damage, but rather the simplified models were used to detect damage.

The identified modes and the experimentally determined fractional changes in the eigenvalues were provided to the indicator function, $$I_k = \frac{Z_i}{Z_j} - \frac{F_{ij}}{F_{jk}},$$

described further hereinabove, to locate the damage. The data provided to the indicator function is summarized in Tables 9-10.

It should be noted that only five or six modes of vibration have been used to locate the damage. In the case of the 2-span grid 303 (FIG. 13b) and the single span grid 305 (FIG. 13c), the number of unknown locations were 94 and 43, respectively. So few modes were taken because of the tremendous difficulty encountered in identifying modes with wavelengths less than 4 ft. This limitation is directly related to the arbitrary selection of a 2 ft. grid for the placement of the accelerometers). Under such circumstances, the equivalent of aliasing in the time domain occurs in the spatial domain.

Figure 18A:
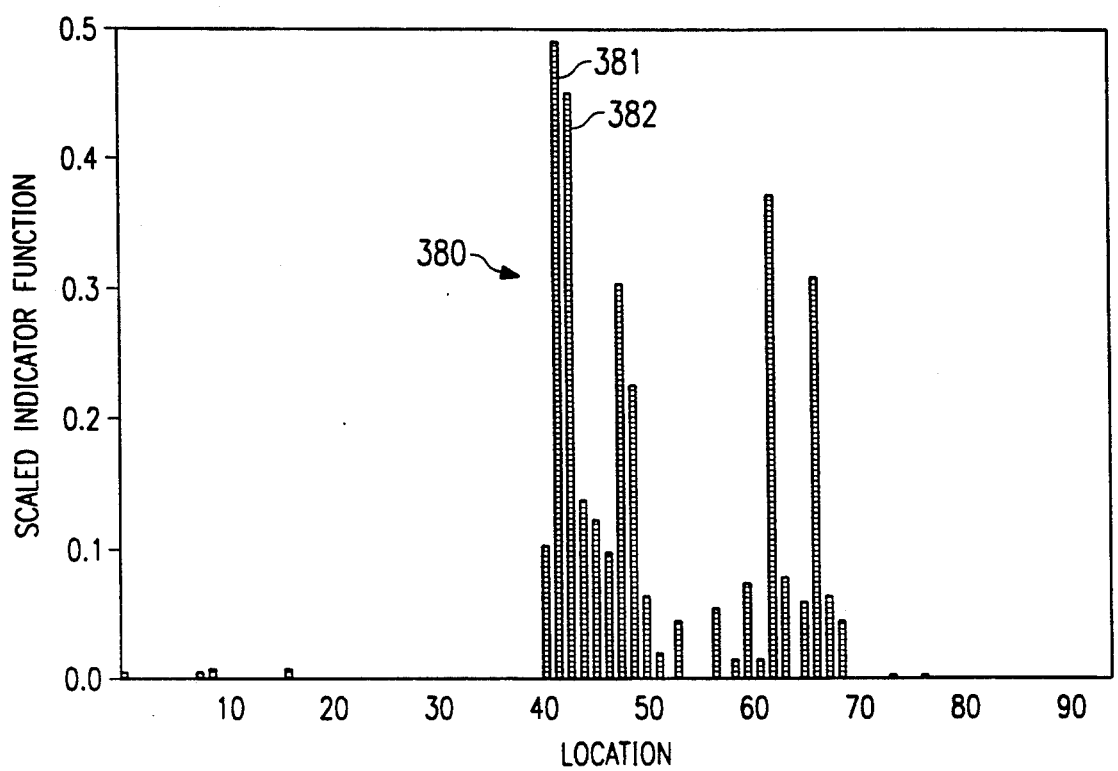
FIGS. 18a-d are bar graphs of a scaled indicator function of the concrete pier deck.

The results of the damage detection are summarized in FIGS. 18a-d, which illustrate a scaled indicator function 380 along the y-axis based upon the indicator function values of $I_k$, such that as $I_k$ approaches zero, the scaled indicator function approaches 0.5. Each location corresponds to a grid element 2 ft. long. In FIG. 18a, for Data Set A, Initial Damage (i.e., Pie2/Pier 3), the most probable location of the damage is at location 42 (381).

Figure 18B:
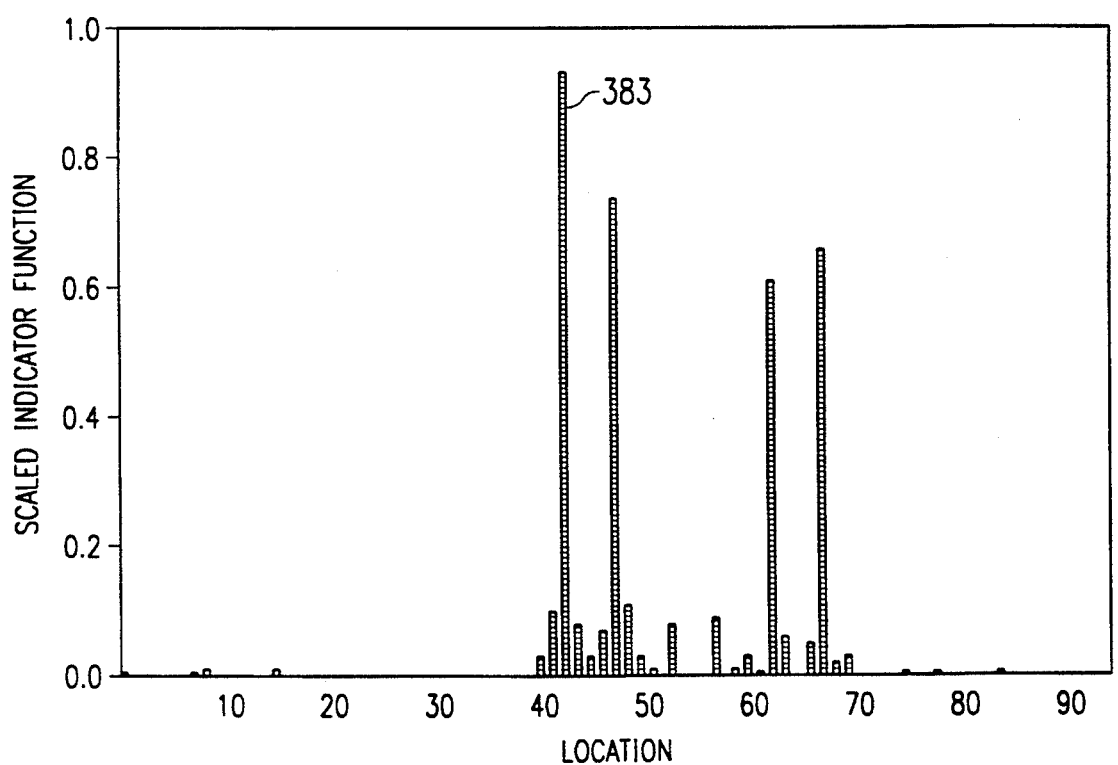

The results indicate that Location 43 (382) is also a highly likely location of damage. Moreover, these two members are contiguous. In FIG. 18b, for Data Set A, Subsequent Damage (i.e., Pier 2/Pier 4), the most probable location of damage is at Location 43 (383). This prediction does not preclude the existence of damage beyond the limits of the model which is constrained to spans 304c and 304d of FIG. 12a.

Figure 18D:
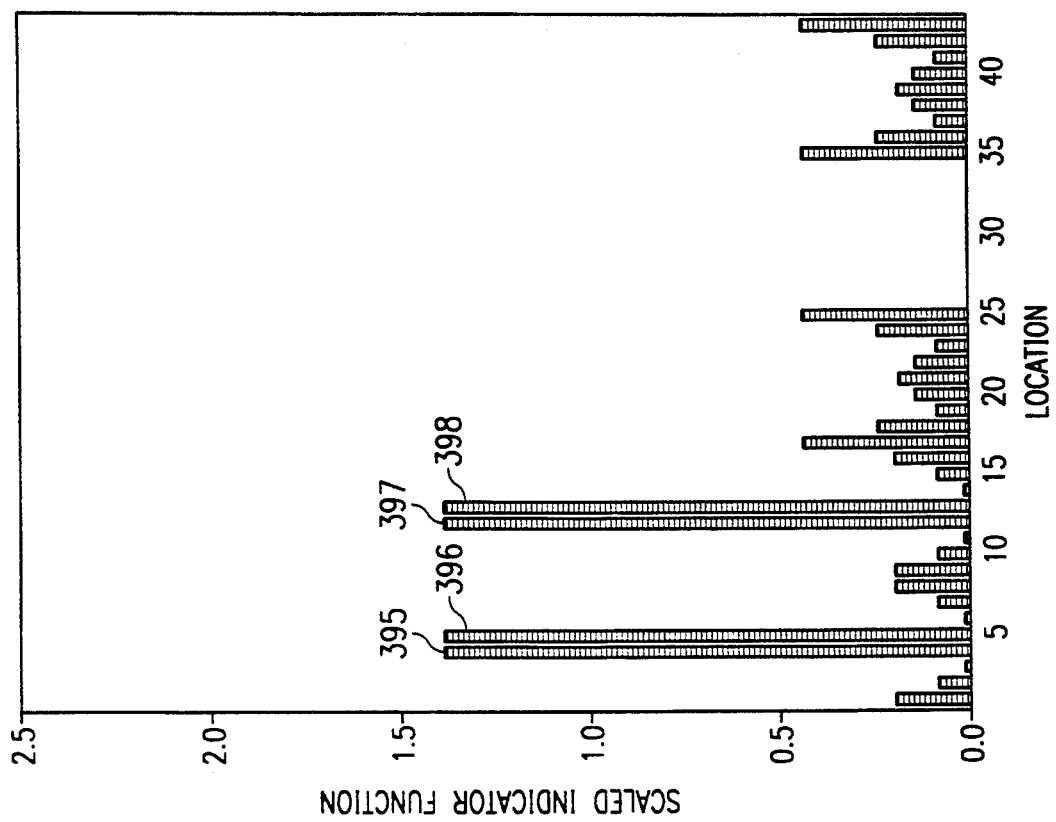
Figure 18C:
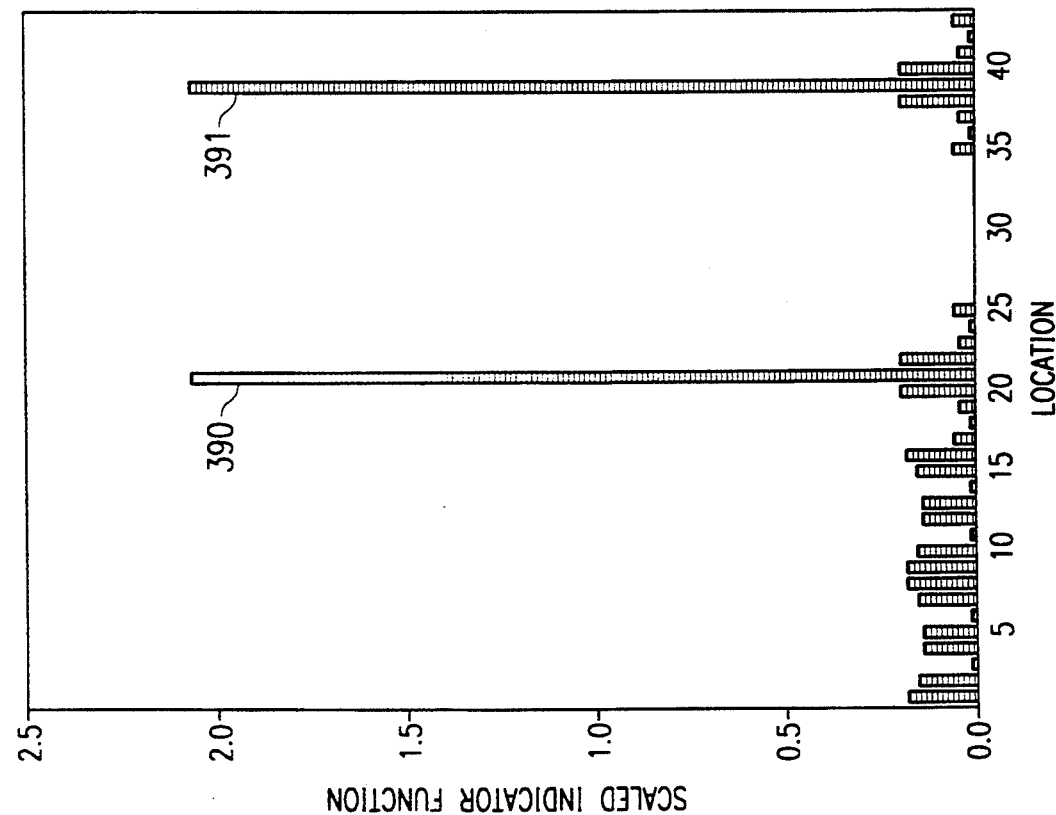

In FIG. 18c, for Data Set B, Initial Damage (i.e., Pier 9/Pier 10) damage is predicted in locations 21 (390) and 39 (391). Note, however, that two locations are predicted because of the symmetry of the problem (including the selected modes). A further piece of information is used to eliminate location 21 or 39 in the actual structure. A comparison of the mode shapes (before and after damage) suggests that Location 39 is the more probable location of damage.

In FIG. 18d, for Data Set B, Subsequent Damage (i.e., Pier 9/Pier 11), damage was predicted at locations 4 (395) and 5 (396) and locations 12 (397) and 13 (398). Again the structure is damaged at only a single location, but four locations (395-398) are indicated because of the inherent symmetry. From a comparison of the mode shapes of the undamaged and damaged structure, the probable location damage is Location 12 (397) or 13 (398).

Figure 19A:
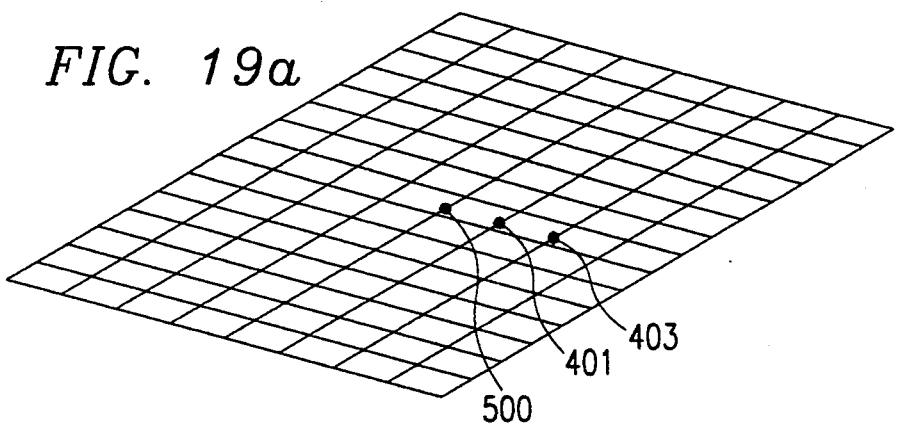
FIGS. 19a-d are diagrams of predicted locations and actual locations of damage to the concrete pier deck.
Figure 19B:
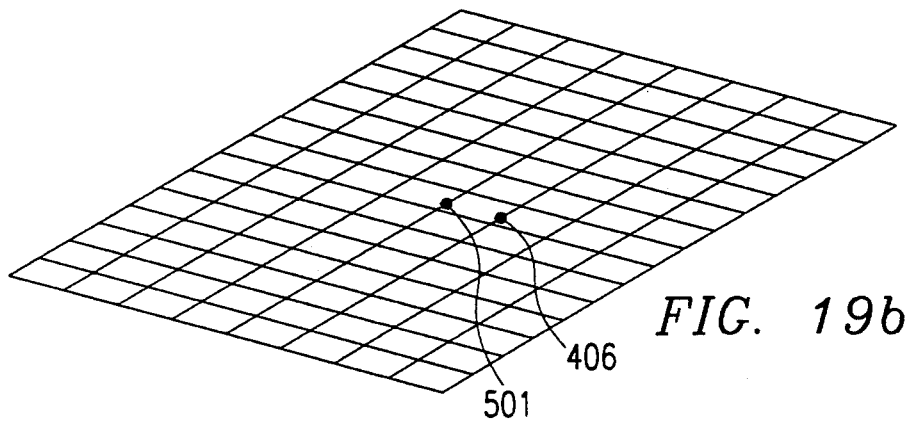
Figure 19C:
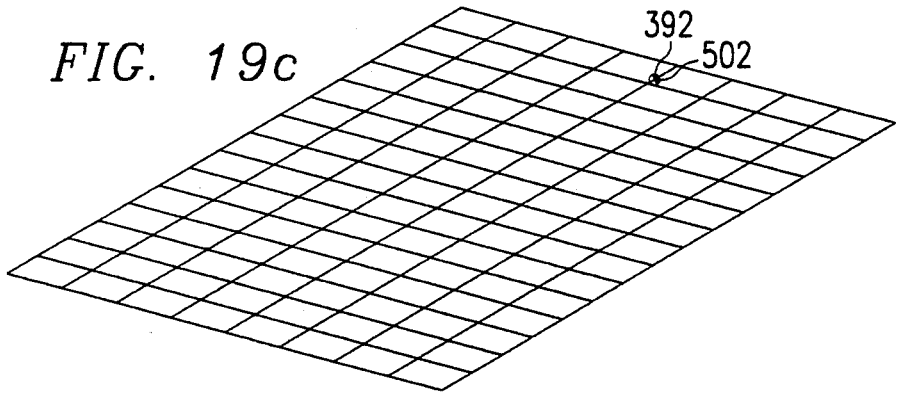
Figure 19D:
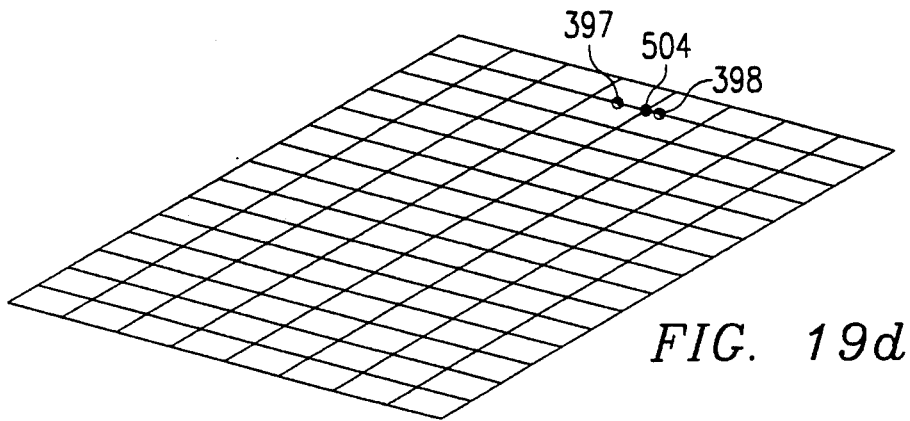

The magnitude of the damage was estimated according to the equation $a_q = Z_i/F_{iq}$ discussed further hereinabove. In every case the results indicated that the bending stiffness of the member in question was totally lost, even for the case of slight damage in Bay 304a of FIG. 12a. The predicted locations of damage are summarized in FIG. 19a (Predicted Location 401 and 403 of Initial Damage, Data Set A, FIG. 19b (Predicted Location 406 of Subsequent Damage, Data Set A), FIG. 19c (Predicted Location 392 of Initial Damage, Data Set B), and FIG. 19d (Predicted Location 397 and 398 of Subsequent Damage, Data Set B). The actual inflicted locations of damage are also shown in FIG. 19a (Location 500), FIG. 19b (Location 501), FIG. 19c (Location 502), and FIG. 19d (Location 504). As can be seen, the predicted and inflicted locations are typically very close.

TABLE 3

Summary of FEM Models

| Model No. | Description | No. of Elements | No. of Degrees of Freedom |
|---|---|---|---|
| 1 | Space Frame Model of Pier | 1263 | 1254 |
| 2 | Grid Model of Spans 3 and 4 | 94 | 225 |
| 3 | Grid Model of Span 5 | 43 | 108 |

TABLE 4a

Data Set A

| Damage State | Description of Data | Remarks |
|---|---|---|
| No damage condition to structure | PIER 2 | Reference (0-500 Hz) |
| Damage Inflicted | PIER 3 | Location and Severity of damage unknown (0-500 Hz) |
| More Damage Inflicted | PIER 4 | Location and Severity of damage unknown (0-500 Hz) |

TABLE 4b

Data Set B

| Damage State | Description of Data | Remarks |
|---|---|---|
| No damage in Span 5 | PIER 8 | Frequency Range 0-500 Hz (Reference) |
| No damage in Span 5 | PIER 9 | Frequency Range 0-1000 Hz (Reference) |
| Damage introduced in Span 5 at Single Location | PIER 10 | Location and Severity of Damage Unknown |
| More Damage in Same Vicinity | PIER 11 | Location and Severity of Damage Unknown |

TABLE 5

Referenced and Damaged Frequencies for Data Set A

| NCEL Mode # | Frequency of Mode in Hz | | |
|---|---|---|---|
| | PIER 2 | PIER 3 | PIER 4 |
| A | 117.12 | — | — |
| B | 133.18 | 131.86 | 104.46 |
| C | 150.14 | 134.01 | 132.50 |
| D | 184.56 | 162.43 | 145.80 |
| E | 193.32 | — | 185.26 |
| F | 225.10 | 199.56 | 174.15 |
| G | 232.76 | — | — |
| H | 282.07 | 249.44 | 246.28 |
| I | 346.20 | 310.88 | 297.92 |
| J | 425.88 | 385.55 | 351.53 |
| K | 452.10 | 415.00 | |
| L | 459.35 | 453.75 | |

TABLE 6

Reference and Damaged Frequencies for Data Set B

| NCEL Mode No. | Frequency of Mode in Hz | | |
|---|---|---|---|
| | PIER 8/PIER 9 | PIER 10 | PIER 11 |
| a | 99.91 | 98.15 | 90.86 |
| b | 174.49 | 165.90 | 159.62 |
| c | 211.42 | 198.87 | 197.68 |
| d | 259.74 | 250.51 | 230.09 |
| e | 321.71 | 308.61 | 286.14 |
| f | 392.45 | 384.69 | 356.13 |
| g | 409.69 | 412.08 | 411.49 |
| h | 442.63 | 444.82 | 447.91 |
| i | 479.47 | — | — |
| k | 505.74 | 497.56 | 498.27 |
| l | 551.24 | 530.13 | 535.00 |
| m | 576.42 | 559.73 | 545.00 |
| n | 681.07 | 665.71 | 647.5 |
| o | 800.89 | 785.13 | 747.22 |
| p | 902.61 | 887.34 | 852.5 |

TABLE 7

Identification of Experimental Modes for Data Set A

| Experimental Mode | FEM Full Pier | FEM 2-Bay Deck |
|---|---|---|
| A | Multiple Modes | 2 |
| B | Multiple Modes | 4 |
| C | Multiple Modes | 6 |
| D | Multiple Modes | 8 |
| E | Multiple Modes | — |
| F | Multiple Modes | — |
| G | Multiple Modes | — |
| H | Multiple Modes | — |
| I | Multiple Modes | 14 |
| J | Multiple Modes | — |
| K | Multiple Modes | |

TABLE 7-continued

Identification of Experimental Modes for Data Set A

| Experimental Mode | FEM Full Pier | FEM 2-Bay Deck |
|---|---|---|
| L | Multiple Modes | — |

TABLE 8

Identification of Experimental Modes for Data Set B

| Experimental Mode | FEM Mode Full Pier | FEM Mode Plate Model |
|---|---|---|
| a | 6,7,8,9,10 | 2 |
| b | 19,20,21,22,23 | 4 |
| c | 25,26,27,28,29 | 5 |
| d | 33,34,36,38 | 6 |
| e | 51,53,54,57 | 9 |
| f | 69,71,72 | 12 |
| g | 56,59,60,61 | 8 |

TABLE 9

Input Into Damage Detection Algorithm for 2 Span Grid Model

| FEM NCEL | Fractional Changes Pier 2/Pier 3 | Pier 2/Pier 4 |
|---|---|---|
| A | — | — |
| B | −.01972 | −0.3848 |
| C | −0.203 | −0.2212 |
| D | −0.2254 | −0.3759 |
| E | — | −0.0816 |
| F | −0.2140 | −0.4016 |
| G | −0.0369 | — |
| H | −0.2180 | −0.2377 |
| I | −0.2180 | −0.2595 |
| J | 0.1804 | −0.3187 |
| K | −0.1574 | — |
| L | −0.0242 | — |

TABLE 10

Input Into Damage Detection Algorithm for Single Span Grid Model

| FEM Mode | NCEL Mode | Pier 9/10 | Pier 9/11 |
|---|---|---|---|
| | a | 0.0349 | −0.1729 |
| | b | −0.0960 | −0.1632 |
| | c | −0.1152 | −0.1258 |
| | d | −0.0698 | −0.1527 |
| | e | −0.0798 | −0.2089 |
| | f | −0.0392 | −0.1765 |
| | g | +0.0117 | |
| | h | +0.0099 | |
| | i | — | |
| | j | −0.0321 | |
| | k | −0.0751 | |
| | l | −0.0571 | |
| | m | −0.0464 | |
| | n | −0.0390 | |
| | o | −0.0552 | |

Figure 20A:
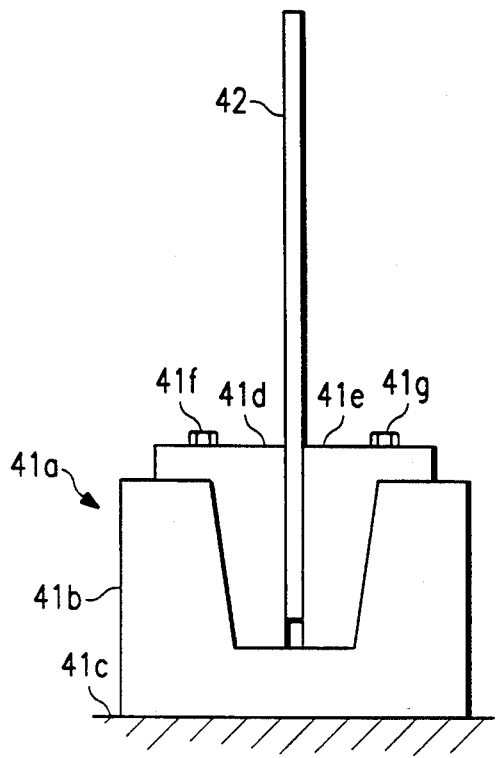
FIGS. 20a-d are elevational and schematic views of a cantilever beam before and after inflicted damage.

In another example, the apparatus of FIG. 4a was used to measure vibration frequency responses of a cantilever beam specimen 42 of FIG. 20a. Specimen 42 comprises a rectangular T6061 aluminum bar with a ½ by 1 inch cross-section. In the example, specimen 42 is cantilevered 40 inches above a support using a specially designed clamping device 41a which comprises a) a steel housing unit 41b welded to a one-inch thick plate 41c which is bolted to a reaction floor (not shown), b) two wedging blocks 41d and 41e for restraining specimen 42 and c) two ½ inch tightening bolts 41f and 41g for securing wedging blocks 41d-e and specimen 42 to housing unit 41b.

Only the bending modes about the minor axis (i.e., the z-axis shown in FIG. 20b) of specimen 42 are considered in the experiment.

For each set of frequency measurements, two types of excitations are induced on specimen 42: a) specimen 42 is displaced slightly from its tip then released and the acceleration response is sampled by waveform recorder 54 (FIG. 4a) every 0.005 sec; and b) specimen 42 is impacted by an impact hammer (not shown) at the same location and the response is sampled every 0.0005 sec. In the first case, the record length and the sampling rate yield a 100 Hz frequency window with a resolution of 0.0977 Hz. In the second case, a frequency window of 1000 Hz with a resolution of 0.4883 Hz is obtained. The slower sampling rate was utilized in order to improve the frequency resolution of the first two modes.

To improve the estimation of the peak frequency measurements, a parabola is fitted to the peak response amplitude and the two adjacent points. The maximum amplitude of the fitted curve and its respective frequency is then determined. Table 11 shows a typical set of values for the frequency peaks as determined directly from the peaks in the frequency response curves and Table 12 shows a typical set of values corresponding to the modified values obtained using the curve fitting procedure. The first six bending modes were measured for each experiment.

TABLE 11

RESONANT FREQUENCIES OBTAINED USING FFT OF ACCELERATION RESPONSE

| | $\delta f = 0.0977$ Hz Window - 100 Hz | $\delta f = 0.4883$ Hz Window - 1000 Hz |
|---|---|---|
| Bending Mode No. | Frequency (Hz) | Frequency (Hz) |
| 1 | 9.3750 | N/A |
| 2 | 58.789 | 58.594 |
| 3 | N/A | 164.04 |
| 4 | N/A | 327.64 |
| 5 | N/A | 529.30 |
| 6 | N/A | 806.16 |

TABLE 12

IMPROVED FREQUENCY MEASUREMENTS USING INTERPOLATION

| | $\delta f = 0.0977$ Hz Window - 100 Hz | $\delta f = 0.4883$ Hz Window - 1000 Hz |
|---|---|---|
| Bending Mode No. | Frequency (Hz) | Frequency (Hz) |
| 1 | 9.3757 | N/A |
| 2 | 58.774 | 58.651 |
| 3 | N/A | 165.09 |
| 4 | N/A | 327.83 |
| 5 | N/A | 529.42 |
| 6 | N/A | 805.94 |

In the experiment, the controlled variable is the damage inflicted on specimen 42 and the observed variables are the eigenfrequency changes of the damaged structure relative to the undamaged structure. The following approach is used to introduce a controlled magnitude of damage into the specimen. Assume that the cantilever specimen 42 of FIG. 20a is divided into B sections of equal length $\Delta = L/B$, where L is the length of the specimens studied here. Then, for example, the fractional change in the $j^{th}$ eigenfrequency for the cantilever damaged in Location K may be given by $$z_j = \int_{X_k}^{X_k+\Delta_k} \delta(E(x)I(x))_k [Y_j''(x)]^2 dx/K_j$$

where $\delta(E(x)I(x))_k$ is the fractional reduction in the bending stiffness in the damaged region (note that E and I are Young's modulus and the second moment of area, respectively), $Y_j(x)$ is the $j^{th}$ mode shape vector for the undamaged structure, and $K_j$ is the $j^{th}$ modal stiffness. The fractional reduction in stiffness may be rewritten in the form $$\delta(E(x)I(x))_k = \alpha(x)_k E(x)_k I(x)_k$$

where E(x) and I(x) are associated with the undamaged structure and $\alpha(x)_k$ is some fraction. Using the mean value theorem, the expression for $z_j$ may be written as $$z_j = \alpha(\zeta)_k E(\zeta)_k I(\zeta)_k [Y_j(\zeta)]^2 \Delta_k / K_j$$

where $$x_k \leq \zeta \leq x_k \Delta_k$$

Also, if E(x)I(x)=constant before and after damage, then the expression for $z_j$ becomes $$z_j = \alpha_k (EI)_k [Y_j(\zeta)]^2 \Delta_k / K_j$$

Therefore, if $\Delta_k$ is fixed and $\delta(EI)_k$ is constant in the region $x_k \leq x \leq x_k + \Delta_k$, a uniform level of damage, $\alpha_k = -\delta(EI)_k/(EI)_k$=constant, constant, has been inflicted on the specimen. Since for a beam of rectangular cross-section $$\delta EI/EI = \delta I/I = \delta(bh^3)/(bh^3)$$

Figure 20C:
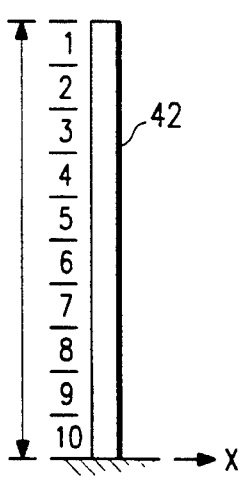
Figure 20D:
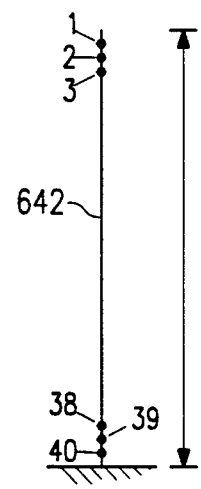
Figure 20B:
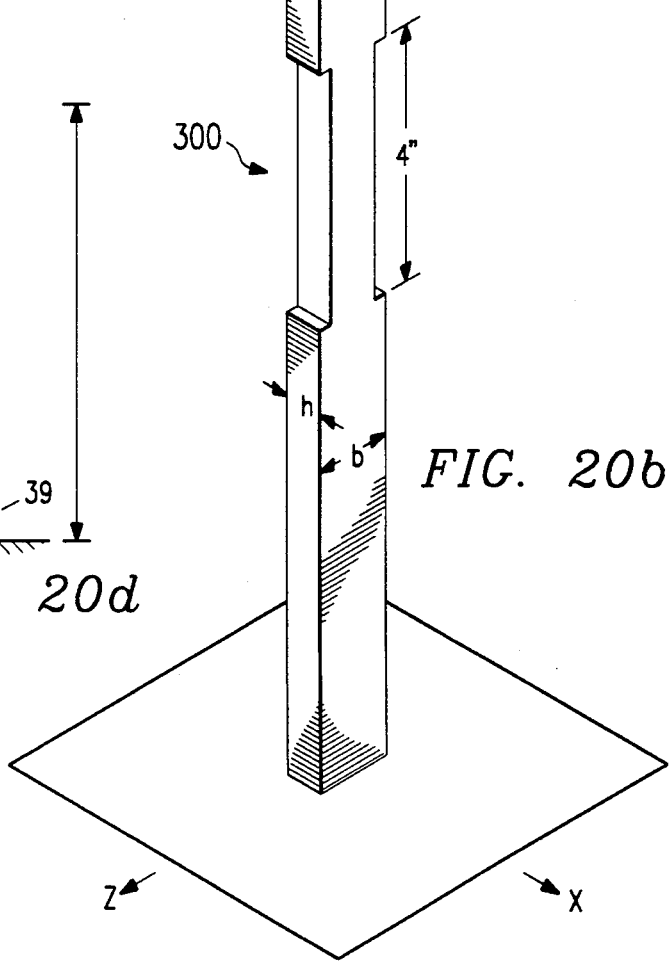

(where for the given beam width b=1.0 inches and height h=0.25 inches), a general expression for $\alpha$ is given by $\alpha = \delta b/b + 3\delta h/h$. Here, $\alpha$ is controlled by controlling the quantity $\delta b/b$. Reductions in the width of the beam 42 are accomplished by uniformly milling the specimen in the specified region 300 shown in FIG. 20b. In all subsequent tests performed in this series of experiments, B=10 and $\Delta_k$=4 inches as shown in FIG. 20c. The damage inflicted corresponded to $\delta b/b$ with values of 0.02, 0.10, and 0.30. Note that all specimens were damaged as shown in FIG. 20b.

For each specimen 42, the following procedure was used to generate the damage and frequency data. The undamaged cantilever specimen 42 was placed in the clamping device 41a and the tightening bolts 41f and 41g were both torqued to the designated amount. The set of undamaged damped frequencies were obtained and recorded as described above. The specimen 42 was then removed from the clamping device 41a, and a designated portion 300 of the specimen 42 was milled as shown in FIG. 20b. The specimen 42 was then replaced in the clamping device 41a and the securing bolts 41f and 41g tightened to the same torque as before. Nine different damage cases were tested to investigate the possibility of predicting damage at extreme locations and at different levels of magnitude. These damage cases are listed in Table 13. Four specimens were used to accommodate the nine damage cases. Since the total variability in any peak frequency will be due to a combination of the effects from the damage and the removal-replacement operation, the effect of the changing boundary conditions can be neglected if the frequency changes caused by the damage are large when compared to standard deviations of peak frequencies caused by the removal-replacement operation.

TABLE 13

DESCRIPTION OF DAMAGE CASES

Magnitude of Inflicted Damage (ΔI/I)

| Case | 1 | 2 | 3 | 4 | 5 (Tip) | 6 | 7 | 8 | 9 | 10 (Clamp) |
|------|---|---|---|---|---|---|---|---|---|---|
| 1 | | | | | | | | | | −.02 |
| 2 | | | | | −.02 | | | | | |
| 3 | | −.02 | | | | | | | | |
| 4 | | | | | | | | | | −.10 |
| 5 | | | | | −.10 | | | | | |
| 6 | | −.10 | | | | | | | | |
| 7 | | | | | | | | | | −.30 |
| 8 | | | | | | | | −.30 | | |
| 9 | | −.30 | | | | | | | | |

The results of the experiment are summarized in Tables 14 and 15 which show the peak frequencies and the modal damping ratios, respectively, for the undamaged and damaged structure. The damping ratios are estimated as follows. For each damage case, a single record length of 4096 previously stored in the waveform analyzer 54 of FIG. 4a is subdivided into four equal record lengths each containing 1024 records. Each record corresponds to a sampling time of 0.512 sec. The frequency response curve for each record is generated and corresponded to the response of the system at average times of 0.256, 0.768, 1.28, and 1.72 sec. For each peak frequency, the corresponding amplitude is obtained from the frequency response curve. The natural log of the ratio of the average amplitude at the first average time (0.256 sec) to the average amplitude at the subsequent times is plotted against the average number of cycles completed. The damping ratio is obtained from the slope of the least square line in the same manner as in the Log Decrement Method. The damping ratios obtained in this experiment are confirmed using the Bandwidth Method.

TABLE 14

FREQUENCY RESPONSE OF UNDAMAGED AND DAMAGED SPECIMENS

| Case No. | Frequency (Hz) | | | | | |
|----------|-------|-------|-------|-------|-------|-------|
| | $\omega_1$ | $\omega_2$ | $\omega_3$ | $\omega_4$ | $\omega_5$ | $\omega_6$ |
| Specimen 1 | | | | | | |
| Reference | 9.3763 | 59.066 | 165.97 | 328.90 | 531.81 | 809.09 |
| 4 | 9.1880 | 58.119 | 164.40 | 326.95 | 529.71 | 806.72 |
| 7 | 8.6908 | 56.568 | 161.56 | 232.22 | 525.68 | 803.09 |
| Specimen 2 | | | | | | |
| Reference | 9.3754 | 58.735 | 165.41 | 328.00 | 530.14 | 806.24 |
| 2 | 9.3728 | 58.657 | 163.34 | 327.58 | 529.82 | 806.19 |
| 5 | 9.3094 | 58.608 | 165.04 | 327.24 | 529.24 | 805.15 |
| 8 | 9.2759 | 58.115 | 165.08 | 325.60 | 528.21 | 803.99 |
| Specimen 3 | | | | | | |
| Reference | 9.3711 | 58.595 | 164.65 | 327.08 | 528.69 | 803.36 |
| 3 | 9.3720 | 58.526 | 164.33 | 325.35 | 526.17 | 801.56 |
| 6 | 9.4706 | 58.593 | 164.09 | 324.91 | 526.00 | 801.91 |
| 9 | 9.6940 | 58.605 | 162.14 | 319.99 | 519.68 | 795.63 |
| Specimen 4 | | | | | | |
| Reference | 9.5676 | 60.023 | 168.40 | 333.20 | N/A | 822.68 |
| 1A | 9.4827 | 59.608 | 169.04 | 332.87 | N/A | 822.58 |

TABLE 15

MODAL DAMPING RATIOS OF DAMAGED AND UNDAMAGED SPECIMENS

| Case No. | Percent of Critical Damping | | | | | |
|---|---|---|---|---|---|---|
| | $\zeta_1$ | $\zeta_2$ | $\zeta_3$ | $\zeta_4$ | $\zeta_5$ | $\zeta_6$ |
| Specimen 1 | | | | | | |
| Reference | 0.0016 | 0.0014 | 0.0014 | 0.0014 | 0.0014 | 0.0014 |
| 4 | 0.0036 | 0.0017 | 0.0018 | 0.0019 | 0.0015 | 0.0015 |
| 7 | 0.0038 | 0.0014 | 0.0014 | 0.0014 | 0.0014 | 0.0015 |
| Specimen 2 | | | | | | |
| Reference | 0.0032 | 0.0014 | 0.0015 | 0.0014 | 0.0014 | 0.0015 |
| 2 | 0.0028 | 0.0017 | 0.0017 | 0.0016 | 0.0014 | 0.0016 |
| 5 | 0.0029 | 0.0017 | 0.0018 | 0.0017 | 0.0017 | 0.0017 |
| 8 | 0.0039 | 0.0017 | 0.0019 | 0.0017 | 0.0016 | 0.0017 |
| Specimen 3 | | | | | | |
| Reference | 0.0027 | 0.0016 | 0.0017 | 0.0017 | 0.0013 | 0.0015 |
| 3 | 0.0027 | 0.0018 | 0.0019 | 0.0017 | 0.0013 | 0.0016 |
| 6 | 0.0025 | 0.0017 | 0.0019 | 0.0018 | 0.0019 | 0.0018 |
| 9 | 0.0031 | 0.0018 | 0.0019 | 0.0020 | 0.0020 | 0.0019 |

TABLE 16

EIGENVALUE RESULTS AT A DAMAGE LEVEL OF a = −0.01 USING FINITE ELEMENTS

| Damage at Location | Eigenvalue (Hz$^2$) | | | | | |
|---|---|---|---|---|---|---|
| | $^2\omega_1$ | $^2\omega_2$ | $^2\omega_3$ | $^2\omega_4$ | $^2\omega_5$ | $^2\omega_6$ |
| Baseline | 98.0225 | 3795.22 | 30180.5 | 117524. | 310497. | 737193. |
| 1 | 98.0225 | 3795.20 | 30179.4 | 117508. | 310415. | 736832. |
| 2 | 98.0219 | 3794.60 | 30159.0 | 117330. | 309919. | 735962. |
| 3 | 98.0187 | 3792.45 | 30122.1 | 117304. | 310324. | 736781. |
| 4 | 98.0097 | 3789.19 | 30125.2 | 117498. | 310082. | 736287. |
| 5 | 97.9912 | 3787.27 | 30167.5 | 117362. | 310218. | 736513. |
| 6 | 97.9596 | 3788.48 | 30170.3 | 117369. | 310188. | 736507. |
| 7 | 97.9131 | 3791.91 | 30134.9 | 117503. | 310102. | 736232. |
| 8 | 97.8506 | 3794.78 | 30140.8 | 117366. | 310340. | 736740. |
| 9 | 97.7719 | 3793.67 | 30175.2 | 117436. | 310082. | 736209. |
| 10 | 97.6774 | 37867.39 | 30127.4 | 117387. | 310182. | 736491. |

In general, the approach consists of performing a modal analysis of the undamaged structure, then repeating the analysis for the structure with a perturbation of stiffness or mass. The specimen was modeled using 40 finite beam elements and the appropriate lumped masses as shown in model 642 of FIG. 20d. The inertial contribution of the accelerometer is included by adding a lumped mass of 0.055 lb-mass at element number 17 of model 642 at a location 16 inches from the tip of model 642.

To obtain the sensitivity matrix, F, a fractional change of stiffness, $\alpha_j$, at the j$^{th}$ location is simulated by reducing the bending stiffness of the appropriate beam elements in the region. The damage influence coefficient, $f_{ij}$, for the i$^{th}$ bending mode (i.e., the ij$^{th}$ term of the sensitivity matrix) is obtained through use of the equation $$f_{ij}=(\omega^2_{di}-\omega^2_{dio})/(\omega^2_{io}\alpha_j)$$

where $\omega_{dio}$ and $\omega_{di}$ are, respectively, the undamaged and damaged i$^{th}$ bending frequencies of the structure. The frequency $\omega_{di}$ is obtained by performing a modal analysis of the model with the stiffness of the j$^{th}$ location reduced by a fraction of 0.01 ($\alpha_j = -0.01$). This procedure is repeated for each of the ten locations. The results of the analytical modal analysis are shown in Table 16, from which the damage sensitivity matrix F, is obtained and is listed in Table 17.

The mass-change sensitivity matrix, G, is obtained similarly. However, the perturbations now arise from fractional mass changes, $\beta$. The local mass of the j$^{th}$ location is increased by a fraction $\beta_j$ and the elements, $g_{ij}$, of the G matrix are computed using the expressions $$g_{ij}=-(\omega^2_{di}-\omega^2_{dio})/(\omega^2_{dio}\beta_j)$$

A value of $\beta_j=0.01$ is used to evaluate $g_{ij}$. The results obtained from modifying the model in all ten locations are shown in Table 18. The resulting G matrix is shown in Table 19.

After all terms are defined, the location and magnitude of damage may be predicted. Note that when the F matrix of Equation (5) is non-square, $F^{-1}$ may be approximated using the least-square generalized inverse $$F^{-1}=F^T(FF^T)^{-1}$$

Note that the generalized inverse only gives the best estimate of $\alpha$ in the least-square sense. Therefore, it is possible to obtain values of $\alpha_i > 0$ which indicate an increase in stiffness. But if increases in stiffness are unrealistic in a particular application, then the stiffness change at those locations may be set equal to zero and the calculation repeated for the remaining $\alpha_i$'s. This procedure is repeated until all $\alpha_i$ are non-positive.

TABLE 17

| | TRANSPOSE OF DAMAGE SENSITIVITY MATRIX, $F^T$ | | | | | |
|---|---|---|---|---|---|---|
| | Mode | | | | | |
| Location | 1 | 2 | 3 | 4 | 5 | 6 |
| 1 | 0.000000 | 0.000527 | 0.003645 | 0.013614 | 0.026409 | 0.048907 |
| 2 | 0.000612 | 0.016336 | 0.071238 | 0.0165073 | 0.186153 | 0.166985 |
| 3 | 0.003877 | 0.072987 | 0.193502 | 0.187196 | 0.055717 | 0.055888 |
| 4 | 0.013058 | 0.158884 | 0.183231 | 0.022123 | 0.133657 | 0.122899 |
| 5 | 0.031931 | 0.209474 | 0.043074 | 0.137844 | 0.089856 | 0.092242 |
| 6 | 0.064169 | 0.177592 | 0.033797 | 0.131888 | 0.099518 | 0.093056 |
| 7 | 0.111607 | 0.087215 | 0.151091 | 0.017869 | 0.127215 | 0.130359 |
| 8 | 0.175368 | 0.011594 | 0.131542 | 0.13441 | 0.050564 | 0.061449 |
| 9 | 0.255656 | 0.040841 | 0.017561 | 0.074878 | 0.133657 | 0.133479 |
| 10 | 0.352062 | 0.232661 | 0.175941 | 0.116572 | 0.101450 | 0.096583 |

The details of the numerical computations used to detect damage for a typical case (Case 4) are presented below. Note that in Case 4, a damage of $\alpha_{10} = -0.10$ is inflicted at Location 10. The elements of the $Z_d$ matrix are computed using the first and second row of Table 4. To correct for the lost mass due to the milling process, the elements of the $Z_{mass}$ matrix are computed by multiplying the G matrix with the appropriate $\beta$ matrix. In this case, $\beta_i = 0$ when $i \ne 10$, and $\beta_{10} = -0.10$. Using these values, the sum of the fractional sensitivities yields $$Z_{damp} + Z_d + G\beta = \begin{bmatrix} -0.03977 \\ -0.03789 \\ -0.01929 \\ -0.01318 \\ -0.01094 \\ -0.01143 \end{bmatrix}$$

where $Z_{mass} = G\beta$.

Employing the above values and the 6×10 F matrix (Table 17), location and severity of damage may be determined by utilizing the least-square generalized inverse iteration procedure previously described. The results are shown in Table 20. From the results of the first iteration, Locations 1 and 2 are undamaged; thus, their respective $\alpha$ values are set equal to zero. This constraint is equivalent to deleting columns 1 and 2 of the initial F matrix. In the second iteration, the resulting 6×8 system yields the results given in the second column. Again, by inspection, Locations 3, 4, 6, and 9 are undamaged. The F matrix is now reduced to a 6×4 system. In the third iteration, Locations 7 and 8 are shown to be undamaged. The F matrix at this point is further reduced to a 6×2 system. At this point only Locations 5 and 10 are unknowns. By solving the 6×2 system the non-positive results shown in the fourth column are obtained. Since all damage values are negative, no more iterations can be performed. Note that the predominant damage is predicted at Location 10 with a damage magnitude of −0.11. The actual damage inflicted on the experimental specimen is given in the fifth column.

Figure 21A:
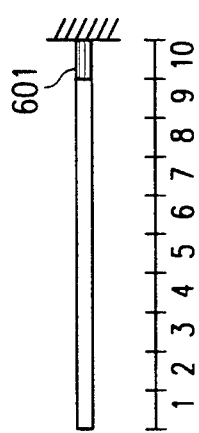
FIGS. 21a-d are diagrams of predicted and inflicted damage to the cantilever beam.
Figure 21B:
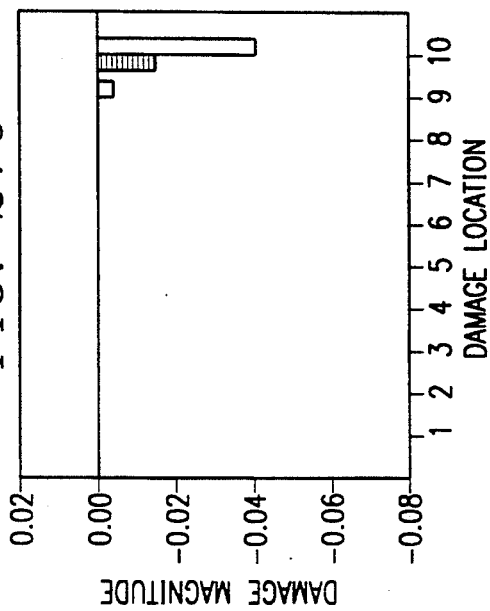
Figure 21C:
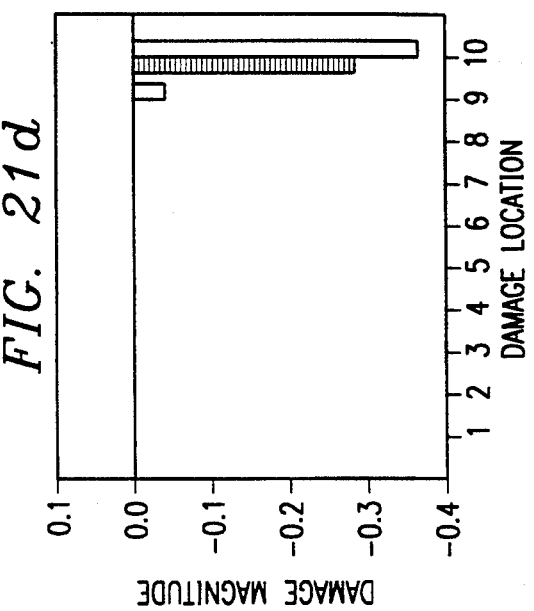
Figure 21D:
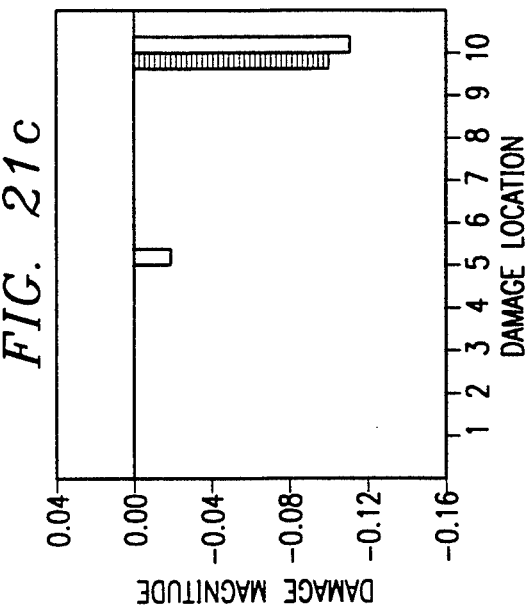
Figure 22B:
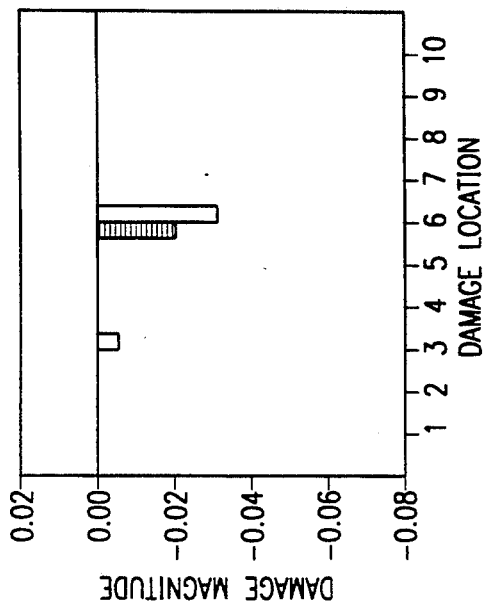
FIGS. 22a-d are diagrams of predicted and inflicted damage to the cantilever beam.
Figure 22D:
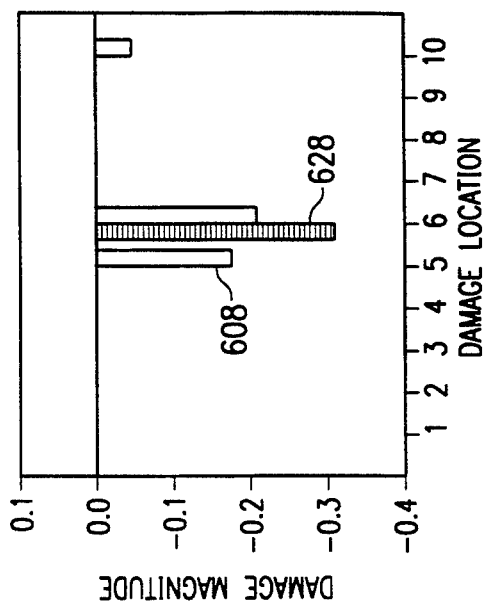
Figure 22A:
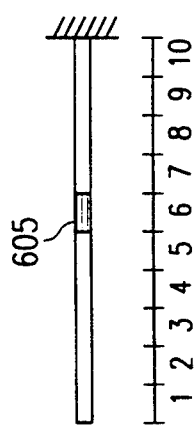
Figure 22C:
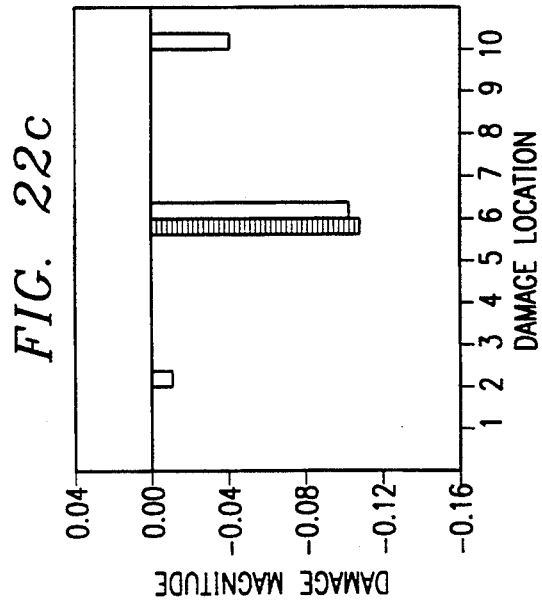

The results for all nine damage scenarios obtained as above are summarized in FIGS. 21a-d, 22a-d, and 23a-d. In FIGS. 21a-d, the predicted and inflicted damage are compared for the cases in which the damage location 601 (FIG. 21a) is at the support location 10 of specimen 42 and the inflicted damage magnitude varies between −0.02 (FIG. 21b), −0.10 (FIG. 21c) and −0.30 (FIG. 21d). FIGS. 22a-d and 23a-d present the same information for the damage at locations 605 (FIG. 22a) and 610 (FIG. 23a), respectively, corresponding to the middle and near tip portions of the beam. For the range of experiments conducted, all nine damage cases were correctly detected. It is expected, that as the magnitude of the damage decreases, the probability of detecting the damage would decrease. Although the inflicted damage was detected, the method also predicted damage at locations at which no damage existed. In FIG. 22d, predicted damage 608 at an errant location was significant when compared to the true inflicted damage 628 at the actual location 605 (FIG. 22a). However, in all other cases, the relative magnitude of damage predicted in the errant locations was small (an order of magnitude less) compared to the true damage magnitude. A summary of the performance of the present technique using four measures is listed in Table 21.

Figure 23A:
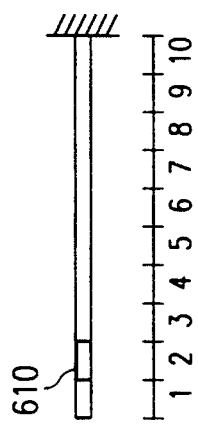
FIGS. 23a-d are diagrams of predicted and inflicted damage to the cantilever beam.
Figure 23B:
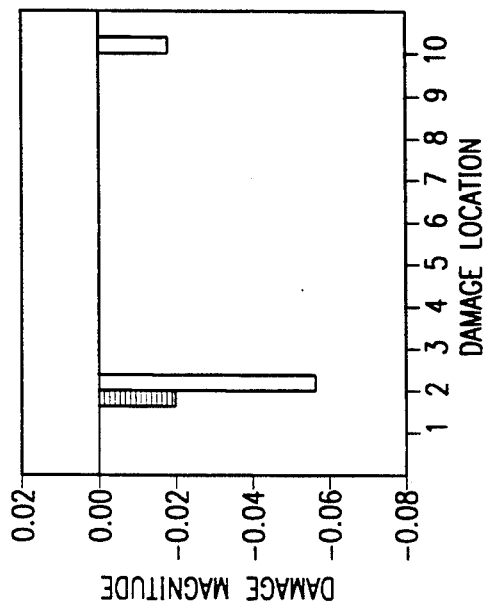
Figure 23D:
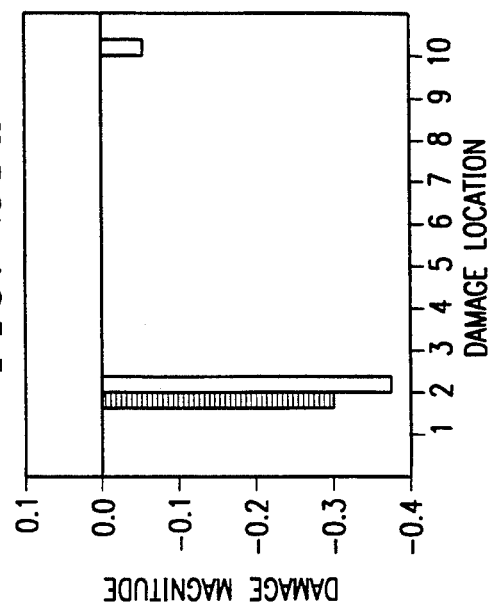
Figure 23C:
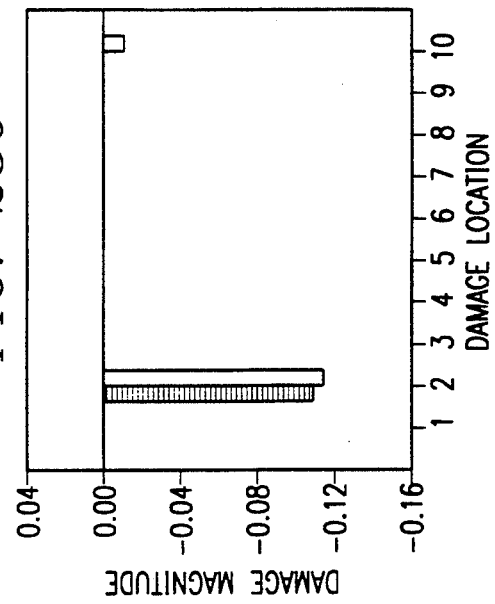

When the inflicted damage was 0.02 (i.e., a two percent reduction in bending stiffness in a location), the predicted damage ranged from a low of about 0.03 in FIG. 22b to a high of 0.05 in FIG. 23b. Although these predictions result in a large percentage error, they are of the correct order of magnitude. When the inflicted damage was 0.10, the predicted damage ranged from 0.09 in FIG. 22c to 0.11 in FIG. 23c. Finally, when the actual damage was 0.30, the predicted damage ranged from approximately 0.25 in FIG. 22d to 0.35 in FIG. 23d. The method does provide the true order of magnitude of the damage. The percentage error is greatest for the smallest damage and decrease substantially for damage magnitudes in the order of 0.1.

TABLE 18

EIGENVALUE RESULTS FOR A MASS CHANGE LEVEL OF $\beta = -0.01$ USING FINITE ELEMENTS

| Location | Eigenvalue (Hz$^2$) | | | | | |
|---|---|---|---|---|---|---|
| | $^2\omega_1$ | $^2\omega_2$ | $^2\omega_3$ | $^2\omega_4$ | $^2\omega_5$ | $^2\omega_6$ |
| 0 | 98.0225 | 3795.22 | 31380.5 | 117524. | 310497. | 737193. |
| 1 | 97.6914 | 3785.81 | 30132.6 | 117372. | 310203. | 736509. |
| 2 | 97.7813 | 3793.48 | 30175.8 | 117425. | 310114. | 736319. |
| 3 | 97.8564 | 3794.84 | 30145.8 | 117345. | 310344. | 736759. |
| 4 | 97.9162 | 3792.15 | 30141.5 | 117500. | 310174. | 736326. |
| 5 | 97.9608 | 3788.96 | 31072.6 | 117373. | 310293. | 736493. |
| 6 | 97.9912 | 3788.05 | 30166.2 | 117378. | 310177. | 736500. |
| 7 | 98.0098 | 3789.85 | 30122.5 | 117500. | 310110. | 736263. |
| 8 | 98.0186 | 3792.70 | 30117.8 | 117329. | 310308. | 736729. |
| 9 | 98.0218 | 3794.65 | 30157.2 | 117353. | 309889. | 735916. |
| 10 | 98.0224 | 3795.19 | 30179.1 | 117508. | 310402. | 736782. |

TABLE 19

TRANSPOSE OF MASS SENSITIVITY MATRIX, $G^T$

| Location | Mode | | | | | |
|---|---|---|---|---|---|---|
| | 1 | 2 | 3 | 4 | 5 | 6 |
| 1 | 0.337780 | 0.247943 | 0.158712 | 0.129335 | 0.094687 | 0.092784 |
| 2 | 0.246066 | 0.045847 | 0.015573 | 0.084238 | 0.123351 | 0.118558 |
| 3 | 0.169451 | 0.010013 | 0.114975 | 0.152309 | 0.049276 | 0.058872 |
| 4 | 0.108444 | 0.080891 | 0.129223 | 0.020421 | 0.104027 | 0.117608 |
| 5 | 0.052945 | 0.164944 | 0.026176 | 0.128484 | 0.065701 | 0.094955 |
| 6 | 0.031931 | 0.188922 | 0.047382 | 0.124230 | 0.103061 | 0.094005 |
| 7 | 0.012956 | 0.141494 | 0.192177 | 0.020421 | 0.124639 | 0.126154 |
| 8 | 0.003979 | 0.066399 | 0.207750 | 0.165924 | 0.060870 | 0.062941 |
| 9 | 0.000714 | 0.015019 | 0.077202 | 0.145502 | 0.195815 | 0.173225 |
| 10 | 0.000102 | 0.000790 | 0.004639 | 0.013614 | 0.030596 | 0.055752 |

TABLE 20

PREDICTION OF DAMAGE FOR CASE 4

| Location | Iteration Number | | | Predicted a | Actual a |
|---|---|---|---|---|---|
| | 1 | 2 | 3 | 4 | |
| 1 | 0.0004 | 0.0000 | −0.0000 | 0.0000 | 0.0000 |
| 2 | 0.0444 | 0.0000 | 0.0000 | 0.0000 | 0.0000 |
| 3 | −0.0001 | 0.0440 | 0.0000 | 0.0000 | 0.0000 |
| 4 | −0.0098 | 0.0224 | 0.0000 | 0.0000 | 0.0000 |
| 5 | −0.0294 | −0.0656 | 31 0.0140 | −0.0163 | 0.0000 |
| 6 | −0.0231 | 0.0196 | 0.0000 | 0.0000 | 0.0000 |
| 7 | −0.0125 | −0.0389 | 0.0070 | 0.0000 | 0.0000 |
| 8 | −0.0168 | −0.0358 | 0.0251 | 0.0000 | 0.0000 |
| 9 | −0.0175 | 0.0435 | 0.0000 | 0.0000 | 0.0000 |
| 10 | −0.0808 | −0.1133 | −0.1272 | −0.1111 | −0.1000 |

TABLE 21
SUMMARY OF EFFECTIVENESS OF PROPOSED TECHNIQUE

| Measure Number | Description of Measure | Numerical Value |
|---|---|---|
| 1 | Number of Correct Damage Locations Predicted | 9 |
|   | Total Number of Damage Locations | 9 |
| 2 | Number of Undamaged Locations Predicted | 71 |
|   | Total Number of Undamaged Locations | 81 |
| 3 | Number of Incorrect Damage Locations Predicted | 10 |
|   | Total Number of Undamaged Locations | 81 |
| 4 | Number of Damage Locations Not Predicted | 0 |
|   | Total Number of Damage Locations | 9 |

Although the present invention and its advantages have been described in detail, it should be understood that various changes, substitutions and alterations can be made herein without departing from the spirit and scope of the invention as defined by the appended claims.

What is claimed is:

1. A method for detecting damage in a structure, comprising the steps of:
   applying a first excitation force to the structure;
   measuring with a transducer a first signal set in response to said first excitation force;
   converting said first signal set to first data indicative of pre-damage modal parameters of the structure, said pre-damage modal parameters including at least one measured mode shape;
   applying a second excitation force to the structure;
   measuring with said transducer a second signal set in response to said second excitation force;
   converting said second signal set to second data indicative of post-damage modal parameters of the structure, said post-damage modal parameters including at least one measured mode shape; and
   identifying at least one location of the damage based upon said first and second data applied to an indicator function.

2. The method of claim 1, wherein said indicator function indicates a change in energy stored in each said location.

3. The method of claim 1, wherein said indicator function comprises a function of a pre-damage sensitivity matrix, $F_0$, and of a post-damage sensitivity matrix, $F^*$, wherein said pre-damage sensitivity matrix relates changes in said pre-damage modal parameters to a fractional change in stiffness of one or more elements of the structure, and wherein said post-damage sensitivity matrix relates changes in said post-damage modal parameters to each said fractional change.

4. The method of claim 3, wherein said indicator function comprises a function of a difference between a first element of said pre-damage sensitivity matrix and a corresponding first element of said post-damage sensitivity matrix, wherein said first and corresponding first elements correspond to a particular mode shape and location in the structure.

5. The method of claim 4, wherein said indicator function comprises said difference raised to a power of N, where N is a real number.

6. The method of claim 4, wherein said indicator function comprises said difference multiplied by N, where N is a real number.

7. The method of claim 3, wherein said indicator function comprises a function of a ratio between a first element, $F_{ik}$, of said pre-damage sensitivity matrix and a corresponding first element, $F^*_{ik}$, of said post-damage sensitivity matrix, wherein said first and corresponding first elements correspond to a particular mode shape i and location k in the structure.

8. The method of claim 7 wherein said indicator function further comprises a function of a ratio between (a) a pre-damage differential displacement $(\Phi_{iA} - \Phi_{iC})_k$ of said location k with respect to said particular mode shape i, where said location k is connected to a first node A and to a second node C, and where $\Phi_{iA}$ and $\Phi_{iC}$ are elements of a pre-damage modal quantities mode shape vectors matrix $\Phi$, for said particular mode shape i and (b) a post-damage differential displacement $(\Phi_{iA}^* - \Phi_{iC}^*)_k$ of said location k with respect to said particular mode shape i, where $\Phi_{iA}^*$ and $\Phi_{iC}^*$ are elements of a post-damage modal quantities mode shape vectors matrix $\Phi_i^*$ for said particular mode shape i.

9. The method of claim 8, wherein said indicator function further comprises a function of a ratio between a pre-damage modal stiffness, $K_i$, for said particular mode shape i and a post-damage modal stiffness, $K^*_i$, for said particular mode shape i.

10. The function of claim 9 wherein said indicator function is a function of $$\frac{F_{ik}^*}{F_{ik}} \cdot \frac{(\Phi_{iA} - \Phi_{iC})_k^2}{(\Phi_{iA}^* - \Phi_{iC}^*)_k^2} \cdot \frac{K_i}{K_i^*}.$$

11. The method of claim 8 wherein said indicator function is a function of $$I_k = \frac{(\phi_{iA}^* - \phi_{iC}^*)_k}{(\phi_{iA} - \phi_{iC})_k} \left[ \frac{\Delta F_{ik}}{F_{ik}} - \frac{2[(\phi_{iA}^* - \phi_{iC}^*)_k - (\phi_{iA} - \phi_{iC})_k]}{(\phi_{iA} - \phi_{iC})_k} - \frac{[(\phi_{iA}^* - \phi_{iC}^*)_k - (\phi_{iA} - \phi_{iC})_k]^2}{(\phi_{iA} - \phi_{iC})_k} \right].$$

12. The method of claim 3 wherein said indicator function is a function of an angle between a first mathematical surface and a second mathematical surface, wherein said first and second surfaces correspond respectively to said pre-damage and said post-damage sensitivity matrices, and wherein said angle is determined at a first point on said first surface corresponding to a particular mode shape and location in the structure and at a corresponding first point on said second surface corresponding to said particular mode shape and said location.

13. The method of claim 12, wherein said angle is a function of gradient responses of said first and second surfaces at said first and corresponding first points, respectively.

14. The method of claim 1, wherein said indicator function is a function of a difference between (a) a first ratio between a first fractional change in modal parameters corresponding to a first mode shape and a second fractional change in modal parameters corresponding to a second mode shape, and (b) a second ratio between a first element of a pre-damage sensitivity matrix corresponding to said first mode shape and a second element of said pre-damage sensitivity matrix corresponding to said second mode shape, wherein said pre-damage sensitivity matrix relates changes in said pre-damage modal parameters to a fractional change in stiffness of one or more elements of the structure.

15. The method of claim 1, wherein said indicator function is a function of a difference between (a) a first ratio between a first fractional change in modal parameters corresponding to a first mode shape and a second fractional change in modal parameters corresponding to a second mode shape, and (b) a second ratio between a first element of a post-damage sensitivity matrix corresponding to said first mode shape and a second element of said post-damage sensitivity matrix corresponding to said second mode shape, wherein said post-damage sensitivity matrix relates changes in said post-damage modal parameters to a fractional change in stiffness of one or more elements of the structure.

16. The method of claim 15, wherein said first and second fractional changes in modal parameters comprise fractional changes in damped eigenvalue frequencies.

17. The method of claim 1, wherein said first data comprise data indicative of theoretical modal parameters of the structure.

18. The method of claim 17, and further comprising the step of adapting said theoretical modal parameters to correspond with said second data.

19. The method of claim 1, and further comprising the step of determining a magnitude of the damage at each said location based upon each said identified location and upon said first and second data.

20. The method of claim 1, wherein said second data determining step comprises the step of measuring a post-damage vibration frequency response of the structure.

21. The method of claim 1, wherein said pre-damage and post-damage modal parameters respectively comprise at least one pre-damage resonant frequency and at least one post-damage resonant frequency.

22. The method of claim 1, wherein said pre-damage and post-damage mode shapes each comprise at least one maximum deflection of at least one location of the structure.

23. The method of claim 22, wherein said pre-damage and post-damage modal parameters respectively comprise at least one pre-damage damping value and at least one post-damage damping value.

24. The method of claim 1, wherein said indicator function is a function of a pre-damage sensitivity and of a post-damage sensitivity.

25. The method of claim 24, wherein said indicator function is a function of a difference between said pre-damage sensitivity and said post-damage sensitivity.

26. The method of claim 24, wherein said indicator function is a function of a gradient response of said pre-damage sensitivity and of said post-damage sensitivity.

27. The method of claim 1 wherein said identifying step comprises the step of determining one or more Z matrices of fractional changes in modal parameters for one or more vibrational modes, based upon said first and second data.

28. The method of claim 27 wherein one of said Z matrices comprises a matrix of fractional changes in damped eigenvalue frequencies $Z_d$.

29. The method of claim 27 wherein one of said Z matrices comprises a matrix of fractional changes in modal masses $Z_m$.

30. The method of claim 27 wherein one of said Z matrices comprises a matrix of fractional changes in modal damping ratios $Z_{damp}$.

31. The method of claim 27 wherein one of said Z matrices comprises a matrix of fractional changes in the norm of mode shapes $Z_{modes}$.

32. The method of claim 27 and further comprising the steps of:
generating a stiffness matrix of the structure based on one or more material and geometric properties of the structure;
using said stiffness matrix and said first data, computing a pre-damage sensitivity matrix $F_o$ which relates said Z matrices to a fractional change in stiffness of one or more elements of the structure; and
using said stiffness matrix and said second data, computing a sensitivity change matrix $\Delta F$ which accounts for changes in said pre-damage sensitivity matrix $F_o$ resulting from damage to the structure.

33. The method of claim 32 wherein said indicator function relates an assumed location of damage and an assumed severity of damage to a damage detection equation.

34. The method of claim 33 wherein said indicator function is given by $$\alpha(k) = \frac{b}{1 + n(k - a)^2},$$

wherein a represents said assumed location, b represents said assumed severity, $\alpha$ represents a matrix of fractional changes in stiffness of one or more elements in the structure, k represents one of said elements, n is a real number, and wherein said damage detection equation is given by $$\Sigma Z\ matrices = (F_o + \Delta F)\alpha(k).$$

35. A method for detecting damage in a structure, comprising the steps of:
applying a first excitation force to the structure;
measuring with a transducer a pre-damage vibration frequency response of the structure in response to said first excitation force;
converting said pre-damage frequency response to first data indicative of pre-damage modal parameters of the structure, said pre-damage modal parameters including at least one measured mode shape;
applying a second excitation force to the structure;
measuring with said transducer a post-damage vibration frequency response of the structure in response to said second excitation force;
converting said post-damage frequency response to second data indicative of post-damage modal parameters of the structure, said post-damage modal parameters including at least one measured mode shape; and
identifying at least one location of the damage based upon said first and second data.

36. A method for detecting damage in a structure, comprising the steps of:
applying a first excitation force to the structure;
measuring with a transducer a first signal set in response to said first excitation force;
converting said first signal set to first data indicative of pre-damage modal parameters of the structure, said pre-damage modal parameters including at least one measure mode shape;

applying a second excitation force to the structure;

measuring with said transducer a second signal set in response to said second excitation force from the structure;

converting said second signal set to second data indicative of post-damage modal parameters of the structure, said post-damage modal parameters including at least one measured mode shape;

identifying at least one location of the damage based upon said first and second data; and determining a magnitude of the damage at each said location based upon each said identified location and upon said first and second data.

37. The method of claim 36, wherein said location identifying step comprises the step of applying said first and second data to an indicator function.

38. A method for detecting damage in a structure, comprising the steps of:

applying a first excitation force to the structure;

acquiring with a transducer a pre-damage vibration frequency response for the structure in response to said first excitation force;

converting said pre-damage frequency response to first data indicative of said pre-damage vibration frequency response of the structure;

applying a second excitation force to the structure;

acquiring with said transducer a post-damage vibration frequency response for the structure as damaged in response to said second excitation force;

converting said pre-damage frequency response to second data indicative of said post-damage vibration frequency response;

generating a stiffness matrix fo the structure based on one or more material and geometric properties of the structure;

from the pre-damage and post-damage frequency response data, extracting a plurality of $N \times 1$ matrices of modal parameters for one or more vibrational modes, the parameters including fractional changes in damped eigenvalue frequencies $Z_d$, fractional changes in modal masses $Z_m$, fractional changes in modal damping ratios $Z_{damp}$, and fractional changes in the norm of mode shapes $Z_{modes}$, N being selected as a number of said vibrational modes;

using the stiffness matrix and the pre-damage frequency response data, computing an $N \times B$ pre-damage sensitivity matrix $F_0$ which relates changes in said modal parameters to a fractional change in stiffness of one or more elements of the structure, B being selected as a number of said elements;

using the stiffness matrix and the post-damage frequency response data computing an $N \times B$ sensitivity change matrix $\Delta F$, which accounts for changes in the sensitivity matrix $F_0$ resulting from damage to the structure; and using a damage detection equation:

$$Z_d + Z_m + Z_{damp} + Z_{modes} = (F_0 + \Delta F)\alpha$$

solving for $\alpha$, a $B \times 1$ matrix containing the fractional change in stiffness of each said element.

39. The method of claim 38 wherein the number of elements B exceeds the number of vibrational modes N, the method further comprising the steps of:

identifying at least one location of the damage using an indicator function;

eliminating elements of the damage detection equation based upon each said location to form a reduced set damage detection equation; and solving for an element of $\alpha$ corresponding to each said location using the reduced set damage detection equation.

40. The method of claim 38, wherein said element of $\alpha$ is solved for by dividing an element of said quantity $F_0 + \Delta F$ into an element of at least one said matrix of modal parameters, wherein said element of said matrix $F_0 + \Delta F$ corresponds to a particular mode and to a particular location, wherein said element of each said matrix of modal parameters corresponds to said particular mode, and wherein said element of α corresponds said particular location.

41. The method of claim 38, wherein the number of elements B exceeds the number of vibrational modes N, the method further comprising the steps of:

inverting the matrix $F_0 + \Delta F$ using one or more pseudo inverse techniques; and solving for $\alpha$ using the damage detection equation.

42. The method of claim 38, wherein the number of vibrational modes N exceeds the number of elements B, the method further comprising the steps of:

inverting the matrix $F_0 + \Delta F$ using one or more exact inverses; and solving for $\alpha$ using the damage detection equation.

43. The method of claim 38, wherein the number of vibrational modes N exceeds the number of elements B, the method further comprising the steps of:

inverting the matrix $F_0 + \Delta F$ using at least one overdetermined least squares approach; and solving for $\alpha$ using the damage detection equation.

44. The method of claim 43, wherein said least squares approach is performed according to the expression:

$$F^1 = F^T(FF^T)^{-1}.$$

45. The method of claim 38, wherein at least one element of the matrix $F_0 + \Delta F$ is eliminated if, after inverting the matrix $F_0 + \Delta F$, a corresponding element of $\alpha$ has a value outside a predetermined range.

46. The method of claim 45, and further comprising the step of inverting the matrix $F_0 + \Delta F$ after eliminating each said element of the quantity matrix $F_0 + \Delta F$.

47. The method of claim 38, wherein each of the B elements is modelled as a spring with element stiffness matrix given by $$K_i = \left(\frac{3EI}{L^3}\right)_i \begin{bmatrix} 1 & -1 \\ -1 & 1 \end{bmatrix}$$

wherein i is an element number, E is Young's modulus of elasticity, I is a second moment of area, and L is a length of element number i.

48. Apparatus for detecting damage in a structure, comprising:

an exciter operable to provide an excitation force to the structure;

a transducer operable to measure a first signal set indicative of pre-damage modal parameters of the structure in response to a first excitation force, said transducer further operable to determine a second signal set indicative of post-damage modal parameters of the structure in response to a second excitation force;

a converter operable to convert said first signal set to first data indicative of pre-damage modal parameters of the structure, said pre-damage modal parameters including at least one measured mode shape, said converter further operable to convert said second signal set to second data indicative of post-damage modal parameters of the structure, said post-damage modal parameters including at least one measured mode shape; and means coupled to said converter operable to identify at least one location of the damage based upon said first and second data applied to an indicator function.

49. The apparatus of claim 28, wherein said indicator function indicates a change in energy stored in each said location.

50. The apparatus of claim 48, wherein said indicator function comprises a function of a pre-damage sensitivity matrix, $F_0$, and of a post-damage sensitivity matrix, $F^*$, wherein said pre-damage sensitivity matrix relates changes in said pre-damage modal parameters to a fractional change in stiffness of one or more elements of the structure, and wherein said post-damage sensitivity matrix relates changes in said post-damage modal parameters to each said fractional change.

51. The apparatus of claim 50, wherein said indicator function comprises a function of a difference between a first element of said pre-damage sensitivity matrix and a corresponding first element of said post-damage sensitivity matrix, wherein said first and corresponding first elements correspond to a particular mode shape and location in the structure.

52. The apparatus of claim 51, wherein said indicator function comprises said difference raised to a power of N, where N is a real number.

53. The apparatus of claim 51, wherein said indicator function comprises said difference multiplied by N, where N is a real number.

54. The apparatus of claim 50, wherein said indicator function comprises a function of a ratio between a first element, $F_{ik}$, of said pre-damage sensitivity matrix and a corresponding first element, $F^*_{ik}$, of said post-damage sensitivity matrix, wherein said first and corresponding first elements correspond to a particular mode shape i and location k in the structure.

55. The apparatus of claim 54, wherein said indicator function further comprises a function of a ratio between (a) a pre-damage differential displacement $(\Phi_u - \Phi_{iC})_k$ of said location k with respect to said particular mode shape i, where said location k is connected to a first node A and to a second node C, and where $\Phi_u$ and $\Phi_{iC}$ are elements of a pre-damage modal quantities mode shape vectors matrix $\Phi_i$ for said particular mode shape i and (b) a post-damage differential displacement $(\Phi_u^* - \Phi_{iC}^*)_k$ of said location k with respect to said particular mode shape i, where $\Phi_u^*$ and $\Phi_{iC}^*$ are elements of a post-damage modal quantities mode shape vectors matrix $\Phi_i^*$ for said particular mode shape i.

56. The apparatus of claim 55, wherein said indicator function further comprises a function of a ratio between a pre-damage modal stiffness, $K_i$, for said particular mode shape i and a post-damage modal stiffness, $K^*_i$, for said particular mode shape i.

57. The apparatus of claim 56, wherein said indicator function is a function of $$\frac{F_{ik}^*}{F_{ik}} \cdot \frac{(\Phi_{iA} - \Phi_{iC})_k^2}{(\Phi_{iA}^* - \Phi_{iC}^*)_k^2} \cdot \frac{K_i}{K_i^*}.$$

58. The apparatus of claim 55 wherein said indicator function is a function of $$I_k = \frac{(\phi_{iA}^* - \phi_{iC}^*)_k}{(\phi_{iA} - \phi_{iC})_k} \left[ \frac{\Delta F_{ik}}{F_{ik}} - \frac{2[(\phi_{iA}^* - \phi_{iC}^*)_k - (\phi_{iA} - \phi_{iC})_k]}{(\phi_{iA} - \phi_{iC})_k} - \frac{[(\phi_{iA}^* - \phi_{iC}^*)_k - (\phi_{iA} - \phi_{iC})_k]^2}{(\phi_{iA} - \phi_{iC})_k} \right].$$

59. The apparatus of claim 50 wherein said indicator function is a function of an angle between a first mathematical surface and a second mathematical surface, wherein said first and second surfaces correspond respectively to said pre-damage and said post-damage sensitivity matrices, and wherein said angle is determined at a first point on said first surface corresponding to a particular mode shape and location in the structure and at a corresponding first point on said second surface corresponding to said particular mode shape and said location.

60. The apparatus of claim 59, wherein said angle is a function of gradient responses of said first and second surfaces at said first and corresponding first points, respectively.

61. The apparatus of claim 48, wherein said indicator function is a function of a difference between (a) a first ratio between a first fractional change in modal parameters corresponding to a first mode shape and a second fractional change in modal parameters corresponding to a second mode shape, and (b) a second ratio between a first element of a pre-damage sensitivity matrix corresponding to said first mode shape and a second element of said pre-damage sensitivity matrix corresponding to said second mode shape, wherein said pre-damage sensitivity matrix relates changes in said pre-damage modal parameters to a fractional change in stiffness of one or more elements of the structure.

62. The apparatus of claim 48, wherein said indicator function is a function of a difference between (a) a first ratio between a first fractional change in modal parameters corresponding to a first mode shape and a second fractional change in modal parameters corresponding to a second mode shape, and (b) a second ratio between a first element of a post-damage sensitivity matrix corresponding to said first mode shape and a second element of said post-damage sensitivity matrix corresponding to said second mode shape, wherein said post-damage sensitivity matrix relates changes in said post-damage modal parameters to a fractional change in stiffness of one or more elements of the structure.

63. The apparatus of claim 62, wherein said first and second fractional changes in modal parameters comprise fractional changes in damped eigenvalue frequencies.

64. The apparatus of claim 48, wherein said identifying means comprises means for determining one or more Z matrices of fractional changes in modal parameters for one or more vibrational modes, based upon said first and second data.

65. The apparatus of claim 64, wherein one of said Z matrices comprises a matrix of fractional changes in damped eigenvalue frequencies $Z_d$.

66. The apparatus of claim 64, wherein one of said Z matrices comprises a matrix of fractional changes in modal masses $Z_m$.

67. The apparatus fo claim 64, wherein one of said Z matrices comprises a matrix of fractional changes in modal damping ratios $Z_{damp}$.

68. The apparatus of claim 64, wherein one of said Z matrices comprises a matrix of fractional changes in the form of mode shapes $Z_{modes}$.

69. The apparatus of claim 64, and further comprising:
- means for generating a stiffness matrix of the structure based on one or more material and geometric properties of the structure;
- means coupled to said stiffness matrix generating means and to said first data determining means for using said stiffness matrix and said first data to compute a pre-damage sensitivity matrix $F_o$ which relates said Z matrices to a fractional change in stiffness of one or more elements of the structure; and
- means coupled to said stiffness matrix generating means and to said second data determining means for using said stiffness matrix and said second data to compute a sensitivity change matrix $\Delta F$ which accounts for changes in said pre-damage sensitivity matrix $F_o$ resulting from damage to the structure.

70. The apparatus of claim 69, wherein said indicator function relates an assumed location of damage and an assumed severity of damage to a damage detection equation.

71. The apparatus of claim 70, wherein said indicator function is given by $$\alpha(k) = \frac{b}{1 + n(k - a)^2},$$

wherein a represents said assumed location, b represents said assumed severity, $\alpha$ represents a matrix of fractional changes in stiffness of one or more elements in the structure, k represents one of said elements, n is a real number, and wherein said damage detection equation is given by $$\Sigma Z \; matrices = (Fo + \Delta F)\alpha(k).$$

72. The apparatus of claim 48, wherein said first data comprise data indicative of theoretical modal parameters of the structure.

73. The apparatus of claim 72, and further comprising means for adapting said theoretical modal parameters to correspond with said second data.

74. The apparatus of claim 48, and further comprising means coupled to said identifying means for determining a magnitude of the damage at each said location based upon each said identified location and upon said first and second data.

75. The apparatus of claim 48, wherein said transducer is operable to measure a post-damage vibration frequency response of the structure.

76. The apparatus of claim 48, wherein said pre-damage and post-damage modal parameters respectively comprise at least one pre-damage resonant frequency and at least one post-damage resonant frequency.

77. The apparatus of claim 34, wherein said pre-damage and post-damage mode shapes each comprise at least one maximum deflection of at least one location of the structure.

78. The apparatus of claim 77, wherein said pre-damage and post-damage modal parameters respectively comprise at least one pre-damage damping value and at least one post-damage damping value.

79. The apparatus fo claim 48, wherein said indicator function is a function of a pre-damage sensitivity and of a post-damage sensitivity.

80. The apparatus of claim 79, wherein said indicator function is a function of a difference between said pre-damage sensitivity and said post-damage sensitivity.

81. The apparatus of claim 79, wherein said indicator function is a function of a gradient response of said pre-damage sensitivity and of said post-damage sensitivity.

82. Apparatus for detecting damage in a structure, comprising:
- an exciter operable to provide an excitation force to the structure;
- a transducer coupled to the structure operable to measure a pre-damage vibration frequency response of the structure in response to a first excitation force, said transducer further operable to measure a post-damage vibration frequency response of the structure in response to a second excitation force;
- a converter operable to convert said pre-damage vibration frequency response to a first data indicative of pre-damage modal parameters of the structure, said pre-damage modal parameters including at least one measured mode shape, said converter further operable to convert said post-damage vibration frequency response to second data indicative of post-damage modal parameters of the structure, said post-damage modal parameters including at least one measured mode shape; and
- means coupled to said converter for identifying at least one location of the damage based upon said first and second data.

83. Apparatus for detecting damage in a structure, comprising:
- an exciter operable to provide an excitation force to the structure;
- a transducer operable to measure a first signal set in response to a first excitation force, said transducer further operable to measure a second signal set in response to a second excitation force;
- a converter operable to convert said first signal set to first data indicative of pre-damage modal parameters of the structure, said pre-damage modal parameters including at least one measured mode shape, said converter further operable to convert said second signal; set to second data indicative of post-damage modal parameters of the structure, said post-damage modal parameters including at least one measured mode shape;
- means coupled to said converter for identifying at least one location of the damage based upon said first and second data; and
- means coupled to said location identifying means for determining a magnitude of the damage at each said location based upon each said identified location and upon said first and second data.

84. The apparatus of claim 83, wherein said location identifying means comprises means for applying said first and second data to an indicator function.

85. Apparatus for detecting damage in a structure, comprising:
- an exciter operable to provide an excitation force to the structure;
- a transducer coupled to the structure operable to acquire a pre-damage vibration frequency response for the structure;
- in response to a first excitation force, said transducer further operable to determine a post-damage vibration frequency response for the structure as damaged;
- a converter operable to convert said pre-damage vibration frequency response to first data indicative of pre-damage modal parameters of the structure, said converter further operable to convert said post-damage vibration frequency response to second data indicative of post-damage modal parameters of the structure;
- means for generating a stiffness matrix of the structure based on one or more material and geometric properties of the structure;
- means coupled to said converter for extracting from the pre-damage and post-damage frequency response data a plurality of $N \times 1$ matrices of modal parameters for one or more vibrational modes, the parameters including fractional changes in damped eigenvalue frequencies $Z_d$, fractional changes in modal masses $Z_m$, fractional changes in modal damping ratios $Z_{damp}$, and fractional changes in the norm of mode shapes $Z_{modes}$, N being selected as a number of said vibrational modes;
- means coupled to said stiffness matrix generating means and to said converter for computing an $N \times B$ pre-damage sensitivity matrix $F_0$ using the stiffness matrix and the pre-damage frequency response data, wherein said sensitivity matrix relates changes in said modal parameters to a fractional change in stiffness of one or more elements of the structure, B being selected as a number of said elements;
- means coupled to said stiffness matrix generating means and to said converter for computing an $N \times B$ sensitivity change matrix $\Delta F$ using the stiffness matrix and the post-damage frequency response data, wherein said sensitivity change matrix accounts for changes in the sensitivity matrix $F_0$ resulting from damage to the structure; and
- means coupled to said extracting means, to said sensitivity matrix computing means and to said sensitivity change matrix computing means for using a damage detection equation:

$$Z_d + Z_m + Z_{damp} + Z_{modes} = (F_0 + \Delta F)\alpha$$

to solve for $\alpha$, a $B \times 1$ matrix containing the fractional change in stiffness of each said element.

86. The apparatus fo claim 85, wherein the number of elements B exceeds the number of vibrational modes N, the apparatus further comprising:
- means coupled to said converter for identifying at least one location of the damage using an indicator function;
- means coupled to said identifying means and to said damage detection equation means for eliminating elements of the damage detection equation based upon each said location to form a reduced set damage detection equation, wherein said damage detection equation means comprises means for solving for an element of $\alpha$ corresponding to each said location using the reduced set damage detection equation.

87. The apparatus of claim 85, wherein said damage detection equation means comprises means for solving for said element of $\alpha$ by dividing an element of said quantity $F_0 + \Delta F$ into an element of at least one said matrix of modal parameters, wherein said element of said matrix $F_0 + \Delta F$ corresponds to a particular mode and to a particular location, wherein said element of each said matrix of modal parameters corresponds to said particular mode, and wherein said element of $\alpha$ corresponds said particular location.

88. The apparatus of claim 85, wherein the number of elements B exceeds the number of vibrational modes N, said damage detection equation means further comprising:
- means for inverting the matrix $F_0 + \Delta F$ using one or more pseudo inverse techniques; and
- means coupled to said inverting means for solving for $\alpha$ using the damage detection equation.

89. The apparatus of claim 85, wherein the number of vibrational modes N exceeds the number of elements B, said damage detection equation means further comprising:
- means for inverting the matrix $F_0 + \Delta F$ using one or more exact inverses; and
- means coupled to said inverting means for solving for $\alpha$ using the damage detection equation.

90. The apparatus of claim 85, wherein the number of vibrational modes N exceeds the number of elements B, said damage detection equation means further comprising:
- means for inverting the matrix $F_0 + \Delta F$ using at least one over-determined least squares approach; and
- means coupled to said inverting means for solving for $\alpha$ using the damage detection equation.

91. The apparatus of claim 90, wherein said inverting means comprises means for performing said least squares approach according to the expression:

$$F^{-1} = F^T(FF^T)^{-1}.$$

92. The apparatus of claim 85, wherein said damage detection equation means comprises means for eliminating at least one element of the matrix $F_0 + \Delta F$ if, after inverting the matrix $F_0 + \Delta F$, a corresponding element of $\alpha$ has a value outside a predetermined range.

93. The apparatus of claim 92, wherein said damage detection equation means comprises means coupled to said eliminating means for inverting the matrix $F_0 + \Delta F$ after each said element of the quantity matrix $F_0 + \Delta F$ is eliminated.

94. The apparatus of claim 85 and further comprising means for modelling each of the B elements as a spring with element stiffness matrix given by $$K_i = \left(\frac{3EI}{L^3}\right)_i \begin{bmatrix} 1 & -1 \\ -1 & 1 \end{bmatrix}$$

wherein i is an element number, E is Young's modulus of elasticity, I is a second moment of area, and L is a length of element number i.

* * * * *